(12) United States Patent  (10) Patent No.: US 8,452,906 B2
Grohman  (45) Date of Patent: May 28, 2013

(54) COMMUNICATION PROTOCOL SYSTEM AND METHOD FOR A DISTRIBUTED-ARCHITECTURE HEATING, VENTILATION AND AIR CONDITIONING NETWORK

(75) Inventor: Wojciech Grohman, Little Elm, TX (US)

(73) Assignee: Lennox Industries, Inc., Richardson, TX (US)

( * ) Notice: Subject to any disclaimer, the term of this patent is extended or adjusted under 35 U.S.C. 154(b) by 668 days.

(21) Appl. No.: 12/603,532

(22) Filed: Oct. 21, 2009

(65) Prior Publication Data

US 2010/0106322 A1    Apr. 29, 2010

Related U.S. Application Data

(63) Continuation-in-part of application No. 12/258,659, filed on Oct. 27, 2008.

(60) Provisional application No. 61/167,135, filed on Apr. 6, 2009.

(51) Int. Cl.
G06F 13/42    (2006.01)

(52) U.S. Cl.
USPC ........................................ 710/105; 700/276

(58) Field of Classification Search
USPC ........................................ 710/105; 700/276
See application file for complete search history.

(56) References Cited

U.S. PATENT DOCUMENTS

| | | |
|---|---|---|
| 4,048,491 A | 9/1977 | Wessman |
| 4,262,736 A | 4/1981 | Gilkeson et al. |
| 4,296,464 A | 10/1981 | Woods et al. |
| 4,381,549 A | 4/1983 | Stamp et al. |
| 4,464,543 A | 8/1984 | Kline et al. |
| 4,482,785 A | 11/1984 | Finnegan et al. |
| 4,501,125 A | 2/1985 | Han |
| 4,606,042 A | 8/1986 | Kahn et al. |
| 4,616,325 A | 10/1986 | Heckenbach et al. |
| 4,694,394 A | 9/1987 | Costantini |
| 4,698,628 A | 10/1987 | Herkert et al. |
| 4,703,325 A | 10/1987 | Chamberlin et al. |

(Continued)

FOREIGN PATENT DOCUMENTS

| EP | 0980165 A2 | 2/2000 |
|---|---|---|
| EP | 1956311 A2 | 8/2008 |

(Continued)

OTHER PUBLICATIONS

Related case U.S. Appl. No. 12/603,534, filed Oct. 21, 2009 to Timothy Wallaert et al., entitled "Flush Wall Mount Thermostat and In-Set Mounting Plate for a Heating, Ventilation and Air Conditioning System".

(Continued)

*Primary Examiner* — Nimesh G Patel

(57) ABSTRACT

The disclosure provides an HVAC data processing and communication network and a method of manufacturing the same. In an embodiment, the network includes a system device and a subnet controller. The system device is adapted to provide a service and publish a message including a device status vector representing an availability of the system device to provide the service. The subnet controller is adapted to receive the message from the system device including the device status vector via a data bus.

16 Claims, 26 Drawing Sheets

U.S. PATENT DOCUMENTS

| | | |
|---|---|---|
| 4,706,247 A | 11/1987 | Yoshioka |
| 4,723,239 A | 2/1988 | Schwartz |
| 4,829,447 A | 5/1989 | Parker et al. |
| 4,841,450 A | 6/1989 | Fredriksson |
| 4,843,084 A | 6/1989 | Parker et al. |
| 4,873,649 A | 10/1989 | Grald et al. |
| 4,884,214 A | 11/1989 | Parker et al. |
| 4,887,262 A | 12/1989 | van Veldhuizen |
| 4,888,728 A | 12/1989 | Shirakawa et al. |
| 4,889,280 A | 12/1989 | Grald et al. |
| 4,931,948 A | 6/1990 | Parker et al. |
| 4,941,143 A | 7/1990 | Twitty et al. |
| 4,942,613 A | 7/1990 | Lynch |
| 4,947,484 A | 8/1990 | Twitty et al. |
| 4,947,928 A | 8/1990 | Parker et al. |
| 4,953,083 A | 8/1990 | Takata et al. |
| 4,955,018 A | 9/1990 | Twitty et al. |
| 4,967,567 A | 11/1990 | Proctor et al. |
| 4,978,896 A | 12/1990 | Shah |
| 4,991,770 A | 2/1991 | Bird et al. |
| 4,996,513 A | 2/1991 | Mak et al. |
| 5,006,827 A | 4/1991 | Brueton et al. |
| 5,018,138 A | 5/1991 | Twitty et al. |
| 5,039,980 A | 8/1991 | Aggers et al. |
| 5,042,997 A | 8/1991 | Rhodes |
| 5,058,388 A | 10/1991 | Shaw et al. |
| 5,061,916 A | 10/1991 | French et al. |
| 5,065,813 A | 11/1991 | Berkeley et al. |
| 5,086,385 A | 2/1992 | Launey et al. |
| 5,103,896 A | 4/1992 | Saga |
| 5,105,366 A | 4/1992 | Beckey |
| 5,115,967 A | 5/1992 | Wedekind |
| 5,128,855 A | 7/1992 | Hilber et al. |
| 5,165,465 A | 11/1992 | Kenet |
| 5,170,935 A | 12/1992 | Federspiel et al. |
| 5,180,102 A | 1/1993 | Gilbert et al. |
| 5,181,653 A | 1/1993 | Foster et al. |
| 5,184,122 A | 2/1993 | Decious et al. |
| 5,191,643 A | 3/1993 | Alsenz |
| 5,195,327 A | 3/1993 | Kim |
| 5,197,666 A | 3/1993 | Wedekind |
| 5,197,668 A | 3/1993 | Ratz et al. |
| 5,203,497 A | 4/1993 | Ratz et al. |
| 5,220,260 A | 6/1993 | Schuler |
| 5,230,482 A | 7/1993 | Ratz et al. |
| 5,259,553 A | 11/1993 | Shyu |
| 5,274,571 A | 12/1993 | Hessee et al. |
| 5,276,630 A | 1/1994 | Baldwin et al. |
| 5,277,036 A | 1/1994 | Dieckmann et al. |
| 5,278,957 A | 1/1994 | Chan |
| 5,279,458 A | 1/1994 | DeWolf et al. |
| 5,297,143 A | 3/1994 | Fridrich et al. |
| 5,314,004 A | 5/1994 | Strand et al. |
| 5,323,385 A | 6/1994 | Jurewicz et al. |
| 5,323,619 A | 6/1994 | Kim |
| 5,327,426 A | 7/1994 | Dolin, Jr. et al. |
| 5,329,991 A | 7/1994 | Mehta et al. |
| 5,337,952 A | 8/1994 | Thompson |
| 5,341,988 A | 8/1994 | Rein et al. |
| 5,355,323 A | 10/1994 | Bae |
| 5,361,982 A | 11/1994 | Liebi et al. |
| 5,374,200 A | 12/1994 | Giroux |
| 5,383,116 A | 1/1995 | Lennartsson |
| 5,384,697 A | 1/1995 | Pascucci |
| 5,414,337 A | 5/1995 | Schuler |
| 5,417,368 A | 5/1995 | Jeffery et al. |
| 5,420,572 A | 5/1995 | Dolin, Jr. et al. |
| 5,434,965 A | 7/1995 | Matheny et al. |
| 5,440,895 A | 8/1995 | Bahel et al. |
| 5,444,626 A | 8/1995 | Schenk |
| 5,444,851 A | 8/1995 | Woest |
| 5,448,180 A | 9/1995 | Kienzler et al. |
| 5,448,561 A | 9/1995 | Kaiser et al. |
| 5,449,047 A | 9/1995 | Schivley, Jr. |
| 5,450,570 A | 9/1995 | Richek et al. |
| 5,452,201 A | 9/1995 | Pieronek et al. |
| 5,460,327 A | 10/1995 | Hill et al. |
| 5,463,735 A | 10/1995 | Pascucci et al. |
| 5,469,150 A | 11/1995 | Sitte |
| 5,475,364 A | 12/1995 | Kenet |
| 5,481,481 A | 1/1996 | Frey et al. |
| 5,481,661 A | 1/1996 | Kobayashi |
| 5,488,834 A | 2/1996 | Schwarz |
| 5,491,649 A | 2/1996 | Friday, Jr. et al. |
| 5,502,818 A | 3/1996 | Lamberg |
| 5,511,188 A | 4/1996 | Pascucci et al. |
| 5,513,324 A | 4/1996 | Dolin, Jr. et al. |
| 5,515,267 A | 5/1996 | Alsenz |
| 5,520,328 A | 5/1996 | Bujak, Jr. |
| 5,522,044 A | 5/1996 | Pascucci et al. |
| 5,530,643 A | 6/1996 | Hodorowski |
| 5,537,339 A | 7/1996 | Naganuma et al. |
| 5,539,778 A | 7/1996 | Kienzler et al. |
| 5,544,036 A | 8/1996 | Brown et al. |
| 5,544,809 A | 8/1996 | Keating et al. |
| 5,550,980 A | 8/1996 | Pascucci et al. |
| 5,551,053 A | 8/1996 | Nadolski et al. |
| 5,555,269 A | 9/1996 | Friday, Jr. et al. |
| 5,555,509 A | 9/1996 | Dolan et al. |
| 5,559,407 A | 9/1996 | Dudley et al. |
| 5,559,412 A | 9/1996 | Schuler |
| 5,566,879 A | 10/1996 | Longtin |
| 5,572,658 A | 11/1996 | Mohr et al. |
| 5,574,848 A | 11/1996 | Thomson |
| 5,579,221 A | 11/1996 | Mun |
| 5,581,478 A | 12/1996 | Cruse et al. |
| 5,592,058 A | 1/1997 | Archer et al. |
| 5,592,059 A | 1/1997 | Archer |
| 5,592,628 A | 1/1997 | Ueno et al. |
| 5,596,437 A | 1/1997 | Heins |
| 5,598,566 A | 1/1997 | Pascucci et al. |
| 5,600,782 A | 2/1997 | Thomson |
| 5,613,157 A | 3/1997 | Davidson et al. |
| 5,613,369 A | 3/1997 | Sato et al. |
| 5,617,282 A | 4/1997 | Rall et al. |
| 5,621,662 A | 4/1997 | Humphries et al. |
| 5,628,201 A | 5/1997 | Bahel et al. |
| 5,630,325 A | 5/1997 | Bahel et al. |
| 5,631,825 A | 5/1997 | van Weele et al. |
| 5,634,590 A | 6/1997 | Gorski et al. |
| 5,675,756 A | 10/1997 | Benton et al. |
| 5,675,830 A | 10/1997 | Satula |
| 5,684,463 A | 11/1997 | Diercks et al. |
| 5,684,717 A | 11/1997 | Beilfuss et al. |
| 5,699,243 A | 12/1997 | Eckel et al. |
| 5,706,190 A | 1/1998 | Russ et al. |
| 5,711,480 A | 1/1998 | Zepke et al. |
| 5,720,604 A | 2/1998 | Kelly et al. |
| 5,722,822 A | 3/1998 | Wilson et al. |
| 5,726,900 A | 3/1998 | Walter et al. |
| 5,729,442 A | 3/1998 | Frantz |
| 5,737,529 A | 4/1998 | Dolin, Jr. et al. |
| 5,748,923 A | 5/1998 | Eitrich |
| 5,751,572 A | 5/1998 | Maciulewicz |
| 5,751,948 A | 5/1998 | Dolan et al. |
| 5,754,779 A | 5/1998 | Dolin, Jr. et al. |
| 5,761,083 A | 6/1998 | Brown, Jr. et al. |
| 5,764,146 A | 6/1998 | Baldwin et al. |
| 5,772,326 A | 6/1998 | Batko et al. |
| 5,772,732 A | 6/1998 | James et al. |
| 5,774,322 A | 6/1998 | Walter et al. |
| 5,774,492 A | 6/1998 | Orlowsik, Jr. et al. |
| 5,774,493 A | 6/1998 | Ross |
| 5,777,837 A | 7/1998 | Eckel et al. |
| 5,782,296 A | 7/1998 | Mehta |
| 5,784,647 A | 7/1998 | Sugimoto |
| 5,786,993 A | 7/1998 | Frutiger et al. |
| 5,787,027 A | 7/1998 | Dolan et al. |
| 5,791,332 A | 8/1998 | Thompson et al. |
| 5,793,646 A | 8/1998 | Hibberd et al. |
| 5,801,942 A | 9/1998 | Nixon et al. |
| 5,802,485 A | 9/1998 | Koelle et al. |
| 5,803,357 A | 9/1998 | Lakin |
| 5,809,063 A | 9/1998 | Ashe et al. |
| 5,809,556 A | 9/1998 | Fujisawa et al. |
| 5,816,492 A | 10/1998 | Charles et al. |
| 5,818,347 A | 10/1998 | Dolan et al. |

| | | | | | | |
|---|---|---|---|---|---|---|
| 5,819,845 A | 10/1998 | Ryu et al. | | 6,208,905 B1 | 3/2001 | Giddings et al. |
| 5,822,512 A | 10/1998 | Goodrum et al. | | 6,208,924 B1 | 3/2001 | Bauer |
| 5,826,038 A | 10/1998 | Nakazumi | | 6,211,782 B1 | 4/2001 | Sandelman et al. |
| 5,829,674 A | 11/1998 | Vanostrand et al. | | 6,216,066 B1 | 4/2001 | Goebel et al. |
| 5,841,654 A | 11/1998 | Verissimo et al. | | 6,227,191 B1 | 5/2001 | Garloch |
| 5,848,887 A | 12/1998 | Zabielski et al. | | 6,232,604 B1 | 5/2001 | McDaniel et al. |
| 5,854,744 A | 12/1998 | Zeng et al. | | 6,237,113 B1 | 5/2001 | Daiber |
| 5,856,972 A | 1/1999 | Riley et al. | | 6,240,326 B1 | 5/2001 | Gloudeman et al. |
| 5,860,411 A | 1/1999 | Thompson et al. | | 6,241,156 B1 | 6/2001 | Kline et al. |
| 5,860,473 A | 1/1999 | Seiden | | 6,252,890 B1 | 6/2001 | Alger-Meunier et al. |
| 5,862,052 A | 1/1999 | Nixon et al. | | 6,254,009 B1 | 7/2001 | Proffitt et al. |
| 5,862,411 A | 1/1999 | Kay et al. | | 6,266,205 B1 | 7/2001 | Schreck et al. |
| 5,864,581 A | 1/1999 | Alger-Meunier et al. | | 6,269,127 B1 | 7/2001 | Richards |
| 5,873,519 A | 2/1999 | Beilfuss | | 6,271,845 B1 | 8/2001 | Richardson |
| 5,878,236 A | 3/1999 | Kleineberg et al. | | 6,282,454 B1 | 8/2001 | Papadopoulos et al. |
| 5,883,627 A | 3/1999 | Pleyer | | 6,285,912 B1 | 9/2001 | Ellison et al. |
| 5,884,072 A | 3/1999 | Rasmussen | | 6,292,518 B1 | 9/2001 | Grabb et al. |
| 5,892,690 A | 4/1999 | Boatman et al. | | 6,298,376 B1 | 10/2001 | Rosner et al. |
| 5,896,304 A | 4/1999 | Tiemann et al. | | 6,298,454 B1 | 10/2001 | Schleiss et al. |
| 5,900,674 A | 5/1999 | Wojnarowski et al. | | 6,298,551 B1 | 10/2001 | Wojnarowski et al. |
| 5,903,454 A | 5/1999 | Hoffberg et al. | | 6,304,557 B1 | 10/2001 | Nakazumi |
| 5,912,877 A | 6/1999 | Shirai et al. | | 6,307,331 B1 | 10/2001 | Bonasia et al. |
| 5,914,453 A | 6/1999 | James et al. | | 6,324,008 B1 | 11/2001 | Baldwin et al. |
| 5,915,101 A | 6/1999 | Kleineberg et al. | | 6,324,854 B1 | 12/2001 | Jayanth |
| 5,924,486 A | 7/1999 | Ehlers et al. | | 6,336,065 B1 | 1/2002 | Gibson et al. |
| 5,927,398 A | 7/1999 | Maciulewicz | | 6,343,236 B1 | 1/2002 | Gibson et al. |
| 5,930,249 A | 7/1999 | Stademann et al. | | 6,349,306 B1 | 2/2002 | Malik et al. |
| 5,933,655 A | 8/1999 | Vrabec et al. | | 6,349,883 B1 | 2/2002 | Simmons et al. |
| 5,934,554 A | 8/1999 | Charles et al. | | 6,353,775 B1 | 3/2002 | Nichols |
| 5,937,942 A | 8/1999 | Bias et al. | | 6,359,220 B2 | 3/2002 | Schiedegger et al. |
| 5,946,209 A | 8/1999 | Eckel et al. | | 6,370,037 B1 | 4/2002 | Schoenfish |
| 5,971,597 A | 10/1999 | Baldwin et al. | | 6,374,373 B1 | 4/2002 | Helm et al. |
| 5,973,594 A | 10/1999 | Baldwin et al. | | 6,377,283 B1 | 4/2002 | Thomas |
| 5,974,554 A | 10/1999 | Oh | | 6,385,510 B1 | 5/2002 | Hoog et al. |
| 5,983,353 A * | 11/1999 | McHann, Jr. ............... 713/310 | | 6,390,806 B1 | 5/2002 | Dempsey et al. |
| 5,983,646 A | 11/1999 | Grothe et al. | | 6,393,023 B1 | 5/2002 | Shimizu et al. |
| 5,993,195 A | 11/1999 | Thompson | | 6,400,996 B1 | 6/2002 | Hoffberg et al. |
| 6,006,142 A | 12/1999 | Seem et al. | | 6,405,104 B1 | 6/2002 | Dougherty |
| 6,011,821 A | 1/2000 | Sauer et al. | | 6,408,228 B1 | 6/2002 | Seem et al. |
| 6,021,252 A | 2/2000 | Faris et al. | | 6,411,701 B1 | 6/2002 | Stademann |
| 6,028,864 A | 2/2000 | Marttinen et al. | | 6,411,857 B1 | 6/2002 | Flood |
| 6,032,178 A | 2/2000 | Bacigalupo et al. | | 6,412,435 B1 | 7/2002 | Timmons, Jr. |
| 6,035,024 A | 3/2000 | Stumer | | 6,415,395 B1 | 7/2002 | Varma et al. |
| 6,046,410 A | 4/2000 | Wojnarowski et al. | | 6,418,507 B1 | 7/2002 | Fackler |
| 6,049,817 A | 4/2000 | Schoen et al. | | 6,423,118 B1 | 7/2002 | Becerra et al. |
| 6,052,525 A | 4/2000 | Carlson et al. | | 6,424,872 B1 | 7/2002 | Glanzer et al. |
| 6,053,416 A | 4/2000 | Specht et al. | | 6,424,874 B1 | 7/2002 | Cofer |
| 6,061,600 A | 5/2000 | Ying | | 6,427,454 B1 | 8/2002 | West |
| 6,061,603 A | 5/2000 | Papadopoulos et al. | | 6,429,845 B1 | 8/2002 | Unseld et al. |
| 6,078,660 A | 6/2000 | Burgess | | 6,430,953 B2 | 8/2002 | Roh |
| 6,082,894 A | 7/2000 | Batko et al. | | 6,434,715 B1 | 8/2002 | Andersen |
| 6,092,280 A | 7/2000 | Wojnarowski | | 6,435,418 B1 | 8/2002 | Toth et al. |
| 6,095,674 A | 8/2000 | Verissimo et al. | | 6,437,691 B1 | 8/2002 | Sandelman et al. |
| 6,098,116 A | 8/2000 | Nixon et al. | | 6,437,805 B1 | 8/2002 | Sojoodi et al. |
| 6,101,824 A | 8/2000 | Meyer et al. | | 6,441,723 B1 | 8/2002 | Mansfield et al. |
| 6,110,260 A | 8/2000 | Kubokawa | | 6,442,952 B2 | 9/2002 | Roh et al. |
| 6,115,713 A | 9/2000 | Pascucci et al. | | 6,448,896 B1 | 9/2002 | Bankus et al. |
| 6,138,227 A | 10/2000 | Thewes et al. | | 6,449,315 B2 | 9/2002 | Richards |
| 6,141,595 A | 10/2000 | Gloudeman et al. | | 6,450,409 B1 | 9/2002 | Rowlette et al. |
| 6,145,501 A | 11/2000 | Manohar et al. | | 6,453,374 B1 | 9/2002 | Kovalan et al. |
| 6,145,751 A | 11/2000 | Ahmed | | 6,454,177 B1 | 9/2002 | Sasao et al. |
| 6,147,601 A | 11/2000 | Sandelman et al. | | 6,462,654 B1 | 10/2002 | Sandelman et al. |
| 6,151,298 A | 11/2000 | Bernhardsson et al. | | 6,478,084 B1 | 11/2002 | Kumar et al. |
| 6,151,529 A | 11/2000 | Batko | | 6,493,661 B1 | 12/2002 | White et al. |
| 6,151,625 A | 11/2000 | Swales et al. | | 6,497,570 B1 | 12/2002 | Sears et al. |
| 6,151,650 A | 11/2000 | Birzer | | 6,498,844 B1 | 12/2002 | Stademann |
| 6,155,341 A | 12/2000 | Thompson et al. | | 6,501,995 B1 | 12/2002 | Kinney et al. |
| 6,160,477 A | 12/2000 | Sandelman et al. | | 6,504,338 B1 | 1/2003 | Eichorn |
| 6,160,484 A | 12/2000 | Spahl et al. | | 6,505,087 B1 | 1/2003 | Lucas et al. |
| 6,160,795 A | 12/2000 | Hosemann | | 6,508,407 B1 | 1/2003 | Lefkowitz et al. |
| 6,167,338 A | 12/2000 | De Wille et al. | | 6,526,122 B2 | 2/2003 | Matsushita et al. |
| 6,169,937 B1 | 1/2001 | Peterson | | 6,535,123 B2 | 3/2003 | Sandelman et al. |
| 6,169,964 B1 | 1/2001 | Alsa et al. | | 6,535,138 B1 | 3/2003 | Dolan et al. |
| 6,170,044 B1 | 1/2001 | McLaughlin et al. | | 6,539,489 B1 | 3/2003 | Reinert |
| 6,177,945 B1 | 1/2001 | Pleyer | | 6,540,148 B1 | 4/2003 | Salsbury et al. |
| 6,179,213 B1 | 1/2001 | Gibino et al. | | 6,542,462 B1 | 4/2003 | Sohraby et al. |
| 6,182,130 B1 | 1/2001 | Dolin, Jr. et al. | | 6,543,007 B1 | 4/2003 | Bliley et al. |
| 6,188,642 B1 | 2/2001 | Schoniger et al. | | 6,545,660 B1 | 4/2003 | Shen et al. |
| 6,190,442 B1 | 2/2001 | Redner | | 6,546,008 B1 | 4/2003 | Wehrend |

| Patent No. | Date | Inventor |
|---|---|---|
| 6,552,647 B1 | 4/2003 | Thiessen et al. |
| 6,554,198 B1 | 4/2003 | Hull et al. |
| 6,560,976 B2 | 5/2003 | Jayanth |
| 6,564,348 B1 | 5/2003 | Barenys et al. |
| 6,567,476 B2 | 5/2003 | Kohl et al. |
| 6,572,363 B1 | 6/2003 | Virgil, Jr. et al. |
| 6,574,215 B2 | 6/2003 | Hummel |
| 6,574,234 B1 | 6/2003 | Myer et al. |
| 6,574,581 B1 | 6/2003 | Bohrer et al. |
| 6,575,233 B1 | 6/2003 | Krumnow |
| 6,580,950 B1 | 6/2003 | Johnson et al. |
| 6,587,039 B1 | 7/2003 | Woestemeyer et al. |
| 6,587,739 B1 | 7/2003 | Abrams et al. |
| 6,587,884 B1 | 7/2003 | Papadopoulos et al. |
| 6,594,272 B1 | 7/2003 | Ketcham et al. |
| 6,595,430 B1 | 7/2003 | Shah |
| 6,600,923 B1 | 7/2003 | Dzuban |
| 6,608,560 B2 | 8/2003 | Abrams |
| 6,609,127 B1 | 8/2003 | Lee et al. |
| 6,615,088 B1 | 9/2003 | Myer et al. |
| 6,615,594 B2 | 9/2003 | Jayanth et al. |
| 6,618,394 B1 | 9/2003 | Hilleary |
| 6,619,555 B2 | 9/2003 | Rosen |
| 6,621,507 B1 | 9/2003 | Shah |
| 6,622,926 B1 | 9/2003 | Sartain et al. |
| 6,628,993 B1 | 9/2003 | Bauer |
| 6,633,781 B1 | 10/2003 | Lee et al. |
| 6,636,771 B1 | 10/2003 | Varma et al. |
| 6,639,939 B1 | 10/2003 | Naden et al. |
| 6,640,145 B2 | 10/2003 | Hoffberg et al. |
| 6,640,890 B1 | 11/2003 | Dage et al. |
| 6,643,689 B2 | 11/2003 | Rode et al. |
| 6,644,557 B1 | 11/2003 | Jacobs |
| 6,647,317 B2 | 11/2003 | Takai et al. |
| 6,650,949 B1 | 11/2003 | Reichenbach et al. |
| 6,651,034 B1 | 11/2003 | Pander et al. |
| 6,658,373 B2 | 12/2003 | Rossi et al. |
| RE38,406 E | 1/2004 | Faris et al. |
| 6,681,215 B2 | 1/2004 | Jammu |
| 6,688,387 B1 | 2/2004 | Wellington et al. |
| 6,704,688 B2 | 3/2004 | Aslam et al. |
| 6,708,239 B1 | 3/2004 | Ellerbrock et al. |
| 6,715,120 B1 | 3/2004 | Hladik et al. |
| 6,715,302 B2 | 4/2004 | Ferragut, II |
| 6,715,690 B2 | 4/2004 | Hull et al. |
| 6,717,513 B1 | 4/2004 | Sandelman et al. |
| 6,717,919 B1 | 4/2004 | Ketcham et al. |
| 6,718,384 B2 | 4/2004 | Linzy |
| 6,722,143 B2 | 4/2004 | Moon et al. |
| 6,725,180 B2 | 4/2004 | Mayer et al. |
| 6,725,398 B1 | 4/2004 | Varma et al. |
| 6,728,369 B2 | 4/2004 | Burgess |
| 6,732,191 B1 | 5/2004 | Baker et al. |
| 6,735,196 B1 | 5/2004 | Manzardo |
| 6,735,282 B2 | 5/2004 | Matsushita et al. |
| 6,735,965 B2 | 5/2004 | Moon et al. |
| 6,738,676 B2 | 5/2004 | Hirayama |
| 6,741,915 B2 | 5/2004 | Poth |
| 6,744,771 B1 | 6/2004 | Barber et al. |
| 6,745,106 B2 | 6/2004 | Howard et al. |
| 6,747,888 B2 | 6/2004 | Klein |
| 6,758,050 B2 | 7/2004 | Jayanth et al. |
| 6,758,051 B2 | 7/2004 | Jayanth et al. |
| 6,763,040 B1 | 7/2004 | Hite et al. |
| 6,763,272 B2 | 7/2004 | Knepper |
| 6,765,993 B2 | 7/2004 | Cueman |
| 6,768,732 B2 | 7/2004 | Neuhaus |
| 6,774,786 B1 | 8/2004 | Havekost et al. |
| 6,779,176 B1 | 8/2004 | Chambers, II et al. |
| 6,783,079 B2 | 8/2004 | Carey et al. |
| 6,789,739 B2 | 9/2004 | Rosen |
| 6,791,530 B2 | 9/2004 | Vernier et al. |
| 6,795,935 B1 | 9/2004 | Unkle et al. |
| 6,798,341 B1 | 9/2004 | Eckel et al. |
| 6,801,524 B2 | 10/2004 | Eteminan |
| 6,804,564 B2 | 10/2004 | Crispin et al. |
| 6,810,333 B2 | 10/2004 | Adedeji et al. |
| 6,814,299 B1 | 11/2004 | Carey |
| 6,814,660 B1 | 11/2004 | Cavett |
| 6,816,071 B2 | 11/2004 | Conti |
| 6,817,757 B1 | 11/2004 | Wallace |
| 6,819,802 B2 | 11/2004 | Higgs et al. |
| 6,822,202 B2 | 11/2004 | Atlas |
| 6,823,680 B2 | 11/2004 | Jayanth |
| 6,824,069 B2 | 11/2004 | Rosen |
| 6,826,454 B2 | 11/2004 | Sulfstede |
| 6,826,590 B1 | 11/2004 | Glanzer et al. |
| 6,832,118 B1 | 12/2004 | Heberlein et al. |
| 6,833,787 B1 | 12/2004 | Levi |
| 6,833,844 B1 | 12/2004 | Shiota et al. |
| 6,840,052 B2 | 1/2005 | Smith et al. |
| 6,842,117 B2 | 1/2005 | Keown |
| 6,842,808 B2 | 1/2005 | Weigl et al. |
| 6,845,918 B2 | 1/2005 | Rotondo |
| 6,850,992 B2 | 2/2005 | Heinrich et al. |
| 6,851,948 B2 | 2/2005 | Dempsey et al. |
| 6,853,291 B1 | 2/2005 | Aisa |
| 6,854,444 B2 | 2/2005 | Plagge et al. |
| 6,865,449 B2 | 3/2005 | Dudley |
| 6,865,596 B1 | 3/2005 | Barber et al. |
| 6,865,898 B2 | 3/2005 | Yamanashi et al. |
| 6,866,375 B2 | 3/2005 | Phillips et al. |
| 6,868,292 B2 | 3/2005 | Ficco et al. |
| 6,868,900 B2 | 3/2005 | Dage et al. |
| 6,874,693 B2 | 4/2005 | Readio et al. |
| 6,876,891 B1 | 4/2005 | Schuler et al. |
| 6,879,881 B1 | 4/2005 | Attridge, Jr. |
| 6,888,441 B2 | 5/2005 | Carey |
| 6,892,121 B2 | 5/2005 | Schmidt |
| 6,894,703 B2 | 5/2005 | Vernier et al. |
| 6,900,808 B2 | 5/2005 | Lassiter et al. |
| 6,901,316 B1 | 5/2005 | Jensen et al. |
| 6,901,439 B1 | 5/2005 | Bonasia et al. |
| 6,907,329 B2 | 6/2005 | Junger et al. |
| 6,909,948 B2 | 6/2005 | Mollmann et al. |
| 6,914,893 B2 | 7/2005 | Petite |
| 6,918,064 B2 | 7/2005 | Mueller et al. |
| 6,920,318 B2 | 7/2005 | Brooking et al. |
| 6,925,360 B2 | 8/2005 | Yoon et al. |
| 6,931,645 B2 | 8/2005 | Murching et al. |
| 6,938,106 B2 | 8/2005 | Ellerbrock et al. |
| 6,941,193 B2 | 9/2005 | Frecska et al. |
| 6,944,785 B2 | 9/2005 | Gadir et al. |
| 6,954,680 B2 | 10/2005 | Kreidler et al. |
| 6,955,060 B2 | 10/2005 | Homan et al. |
| 6,955,302 B2 | 10/2005 | Erdman, Jr. |
| 6,956,424 B2 | 10/2005 | Hohnel |
| 6,957,696 B1 | 10/2005 | Krumnow |
| 6,963,288 B1 | 11/2005 | Sokol et al. |
| 6,963,922 B2 | 11/2005 | Papadopoulos et al. |
| 6,965,802 B2 | 11/2005 | Sexton |
| 6,967,565 B2 | 11/2005 | Lingemann |
| 6,968,295 B1 | 11/2005 | Carr |
| 6,973,366 B2 | 12/2005 | Komai |
| 6,975,219 B2 | 12/2005 | Eryurek et al. |
| 6,975,913 B2 | 12/2005 | Kreidler et al. |
| 6,975,958 B2 | 12/2005 | Bohrer et al. |
| 6,980,796 B1 | 12/2005 | Cuellar et al. |
| 6,981,266 B1 | 12/2005 | An et al. |
| 6,983,271 B2 | 1/2006 | Morrow et al. |
| 6,983,889 B2 | 1/2006 | Alles |
| 6,988,011 B2 | 1/2006 | Varma et al. |
| 6,988,671 B2 | 1/2006 | DeLuca |
| 6,990,381 B2 | 1/2006 | Nomura et al. |
| 6,990,540 B2 | 1/2006 | Dalakuras et al. |
| 6,993,414 B2 | 1/2006 | Shah |
| RE38,985 E | 2/2006 | Boatman et al. |
| 6,994,620 B2 | 2/2006 | Mills |
| 6,999,473 B2 | 2/2006 | Windecker |
| 6,999,824 B2 | 2/2006 | Glanzer et al. |
| 7,000,849 B2 | 2/2006 | Ashworth et al. |
| 7,002,462 B2 | 2/2006 | Welch |
| 7,003,378 B2 | 2/2006 | Poth |
| 7,006,460 B1 | 2/2006 | Vollmer et al. |
| 7,006,881 B1 | 2/2006 | Hoffberg et al. |
| 7,013,239 B2 | 3/2006 | Hedlund et al. |
| 7,017,827 B2 | 3/2006 | Shah et al. |
| 7,020,798 B2 | 3/2006 | Meng et al. |

| | | |
|---|---|---|
| 7,022,008 B1 | 4/2006 | Crocker |
| 7,024,282 B2 | 4/2006 | Coogan et al. |
| 7,024,283 B2 | 4/2006 | Bicknell |
| 7,025,281 B2 | 4/2006 | DeLuca |
| 7,027,808 B2 | 4/2006 | Wesby |
| 7,029,391 B2 | 4/2006 | Nagaya et al. |
| 7,031,880 B1 | 4/2006 | Seem et al. |
| 7,032,018 B2 | 4/2006 | Lee et al. |
| 7,035,719 B2 | 4/2006 | Howard et al. |
| 7,035,898 B1 | 4/2006 | Baker |
| 7,036,743 B2 | 5/2006 | Shah |
| 7,043,339 B2 | 5/2006 | Maeda et al. |
| 7,044,397 B2 | 5/2006 | Bartlett et al. |
| 7,047,092 B2 | 5/2006 | Wimsatt |
| 7,051,282 B2 | 5/2006 | Marcjan |
| 7,055,759 B2 | 6/2006 | Wacker et al. |
| 7,058,459 B2 | 6/2006 | Weiberle et al. |
| 7,058,477 B1 | 6/2006 | Rosen |
| 7,058,693 B1 | 6/2006 | Baker, Jr. |
| 7,058,737 B2 | 6/2006 | Ellerbrock et al. |
| 7,062,927 B2 | 6/2006 | Kwon et al. |
| 7,068,612 B2 | 6/2006 | Berkcan et al. |
| 7,076,962 B2 | 7/2006 | He et al. |
| 7,082,339 B2 | 7/2006 | Murray et al. |
| 7,082,352 B2 | 7/2006 | Lim |
| 7,083,109 B2 | 8/2006 | Pouchak |
| 7,085,626 B2 | 8/2006 | Harrod et al. |
| 7,085,814 B1 | 8/2006 | Gandhi et al. |
| 7,089,087 B2 | 8/2006 | Dudley |
| 7,089,088 B2 | 8/2006 | Terry et al. |
| 7,089,530 B1 | 8/2006 | Dardinski et al. |
| 7,092,768 B1 | 8/2006 | Labuda |
| 7,092,772 B2 | 8/2006 | Murray et al. |
| 7,092,794 B1 | 8/2006 | Hill et al. |
| 7,096,078 B2 | 8/2006 | Burr et al. |
| 7,096,285 B2 | 8/2006 | Ellerbrock et al. |
| 7,096,465 B1 | 8/2006 | Dardinski et al. |
| 7,099,965 B2 | 8/2006 | Ellerbrock et al. |
| 7,100,382 B2 | 9/2006 | Butler et al. |
| 7,103,000 B1 | 9/2006 | Rode et al. |
| 7,103,016 B1 | 9/2006 | Duffy et al. |
| 7,103,420 B2 | 9/2006 | Brown et al. |
| 7,110,835 B2 | 9/2006 | Blevins et al. |
| 7,114,088 B2 | 9/2006 | Horbelt |
| 7,114,554 B2 | 10/2006 | Bergman et al. |
| 7,117,050 B2 | 10/2006 | Sasaki et al. |
| 7,117,051 B2 | 10/2006 | Landry et al. |
| 7,117,395 B2 | 10/2006 | Opaterny |
| 7,120,036 B2 | 10/2006 | Kyono |
| 7,123,428 B2 | 10/2006 | Yeo et al. |
| 7,123,774 B2 | 10/2006 | Dhavala et al. |
| 7,127,305 B1 | 10/2006 | Palmon |
| 7,127,327 B1 | 10/2006 | O'Donnell |
| 7,130,409 B2 | 10/2006 | Beyda |
| 7,130,719 B2 | 10/2006 | Ehlers et al. |
| 7,133,407 B2 | 11/2006 | Jinzaki et al. |
| 7,133,748 B2 | 11/2006 | Robinson |
| 7,133,749 B2 | 11/2006 | Goldberg et al. |
| 7,135,982 B2 | 11/2006 | Lee |
| 7,139,550 B2 | 11/2006 | Cuellar et al. |
| 7,142,948 B2 | 11/2006 | Metz |
| 7,146,230 B2 | 12/2006 | Glanzer et al. |
| 7,146,231 B2 | 12/2006 | Schleiss et al. |
| 7,146,253 B2 | 12/2006 | Hoog et al. |
| 7,150,408 B2 | 12/2006 | DeLuca |
| 7,155,318 B2 | 12/2006 | Sharma et al. |
| 7,155,499 B2 | 12/2006 | Soemo et al. |
| 7,156,316 B2 | 1/2007 | Kates |
| 7,162,512 B1 | 1/2007 | Amit et al. |
| 7,162,883 B2 | 1/2007 | Jayanth et al. |
| 7,163,156 B2 | 1/2007 | Kates |
| 7,163,158 B2 | 1/2007 | Rossi et al. |
| 7,167,762 B2 | 1/2007 | Glanzer et al. |
| 7,168,627 B2 | 1/2007 | Kates |
| 7,171,579 B2 | 1/2007 | Weigl et al. |
| 7,172,132 B2 | 2/2007 | Proffitt et al. |
| 7,172,160 B2 | 2/2007 | Piel et al. |
| 7,174,239 B2 | 2/2007 | Butler et al. |
| 7,174,728 B2 | 2/2007 | Jayanth |
| 7,175,086 B2 | 2/2007 | Gascoyne et al. |
| 7,175,098 B2 | 2/2007 | DeLuca |
| 7,177,926 B2 | 2/2007 | Kramer |
| 7,181,317 B2 | 2/2007 | Amundson et al. |
| 7,185,262 B2 | 2/2007 | Barthel et al. |
| 7,186,290 B2 | 3/2007 | Sheehan et al. |
| 7,187,354 B2 | 3/2007 | Min et al. |
| 7,187,986 B2 | 3/2007 | Johnson et al. |
| 7,188,002 B2 | 3/2007 | Chapman, Jr. et al. |
| 7,188,207 B2 | 3/2007 | Mitter |
| 7,188,482 B2 | 3/2007 | Sadegh et al. |
| 7,188,779 B2 | 3/2007 | Alles |
| 7,191,028 B2 | 3/2007 | Nomura et al. |
| 7,194,663 B2 | 3/2007 | Fletcher et al. |
| 7,195,211 B2 | 3/2007 | Kande et al. |
| 7,197,717 B2 | 3/2007 | Anderson et al. |
| 7,200,450 B2 | 4/2007 | Boyer et al. |
| 7,203,165 B1 | 4/2007 | Kowalewski |
| 7,203,575 B2 | 4/2007 | Maturana et al. |
| 7,203,776 B2 | 4/2007 | Junger et al. |
| 7,206,646 B2 | 4/2007 | Nixon et al. |
| 7,206,647 B2 | 4/2007 | Kumar |
| 7,209,485 B2 | 4/2007 | Guse |
| 7,209,748 B2 | 4/2007 | Wong et al. |
| 7,212,825 B2 | 5/2007 | Wong et al |
| 7,213,044 B2 | 5/2007 | Tjong et al. |
| 7,216,016 B2 | 5/2007 | Van Ostrand et al. |
| 7,216,017 B2 | 5/2007 | Kwon et al. |
| 7,216,497 B2 | 5/2007 | Hull et al. |
| 7,218,589 B2 | 5/2007 | Wisnudel et al. |
| 7,218,996 B1 | 5/2007 | Beitelmal et al. |
| 7,219,141 B2 | 5/2007 | Bonasia et al. |
| 7,222,111 B1 | 5/2007 | Budike, Jr. |
| 7,222,152 B1 | 5/2007 | Thompson et al. |
| 7,222,493 B2 | 5/2007 | Jayanth et al. |
| 7,222,494 B2 | 5/2007 | Peterson et al. |
| 7,224,366 B2 | 5/2007 | Kessler et al. |
| 7,225,054 B2 | 5/2007 | Amundson et al. |
| 7,225,356 B2 | 5/2007 | Monitzer |
| 7,228,187 B2 | 6/2007 | Ticky et al. |
| 7,232,058 B2 | 6/2007 | Lee |
| 7,233,229 B2 | 6/2007 | Stroupe et al. |
| 7,239,623 B2 | 7/2007 | Burghardt et al. |
| 7,242,988 B1 | 7/2007 | Hoffberg et al. |
| 7,243,004 B2 | 7/2007 | Shah et al. |
| 7,244,294 B2 | 7/2007 | Kates |
| 7,246,753 B2 | 7/2007 | Hull et al. |
| 7,248,576 B2 | 7/2007 | Hoffmann |
| 7,251,534 B2 | 7/2007 | Walls et al. |
| 7,257,813 B1 | 8/2007 | Mayer et al. |
| 7,259,666 B1 | 8/2007 | Hermsmeyer et al. |
| 7,260,084 B2 | 8/2007 | Saller |
| 7,260,451 B2 | 8/2007 | Takai et al. |
| 7,260,609 B2 | 8/2007 | Fuehrer et al. |
| 7,260,948 B2 | 8/2007 | Jayanth et al. |
| 7,261,241 B2 | 8/2007 | Eoga |
| 7,261,243 B2 | 8/2007 | Butler et al. |
| 7,261,762 B2 | 8/2007 | Kang et al. |
| 7,266,775 B2 | 9/2007 | Patitucci |
| 7,266,960 B2 | 9/2007 | Shah |
| 7,269,962 B2 | 9/2007 | Bachmann |
| 7,272,154 B2 | 9/2007 | Loebig |
| 7,272,452 B2 | 9/2007 | Coogan et al. |
| 7,272,457 B2 | 9/2007 | Glanzer et al. |
| 7,274,972 B2 | 9/2007 | Amundson et al. |
| 7,274,973 B2 | 9/2007 | Nichols et al. |
| 7,277,280 B2 | 10/2007 | Peng |
| 7,277,970 B2 | 10/2007 | Ellerbrock et al. |
| 7,278,103 B1 | 10/2007 | Clark et al. |
| 7,281,697 B2 | 10/2007 | Reggiani |
| 7,287,062 B2 | 10/2007 | Im et al. |
| 7,287,708 B2 | 10/2007 | Lucas et al. |
| 7,287,709 B2 | 10/2007 | Proffitt et al. |
| 7,289,458 B2 | 10/2007 | Gila et al. |
| 7,292,900 B2 | 11/2007 | Kreidler et al. |
| 7,293,422 B2 | 11/2007 | Parachini et al. |
| 7,295,099 B2 | 11/2007 | Lee et al. |
| 7,296,426 B2 | 11/2007 | Butler et al. |
| 7,299,279 B2 | 11/2007 | Sadaghiany |

| | | |
|---|---|---|
| 7,299,996 B2 | 11/2007 | Garrett et al. |
| 7,301,699 B2 | 11/2007 | Kanamori et al. |
| 7,302,642 B2 | 11/2007 | Smith et al. |
| 7,305,495 B2 | 12/2007 | Carter |
| 7,306,165 B2 | 12/2007 | Shah |
| 7,310,559 B2 | 12/2007 | Walko, Jr. |
| 7,313,465 B1 | 12/2007 | O'Donnell |
| 7,313,716 B2 | 12/2007 | Weigl et al. |
| 7,313,923 B2 | 1/2008 | Jayanth et al. |
| 7,315,768 B2 | 1/2008 | Dang et al. |
| 7,317,970 B2 | 1/2008 | Pienta et al. |
| 7,318,089 B1 | 1/2008 | Stachura et al. |
| 7,320,110 B2 | 1/2008 | Shah |
| 7,324,874 B2 | 1/2008 | Jung |
| 7,327,376 B2 | 2/2008 | Shen et al. |
| 7,327,815 B1 | 2/2008 | Jurisch |
| 7,330,512 B2 | 2/2008 | Frank et al. |
| 7,331,191 B2 | 2/2008 | He et al. |
| 7,334,161 B2 | 2/2008 | Williams et al. |
| 7,336,650 B2 | 2/2008 | Franz et al. |
| 7,337,369 B2 | 2/2008 | Barthel et al. |
| 7,337,619 B2 | 3/2008 | Hsieh et al. |
| 7,343,226 B2 | 3/2008 | Ehlers et al. |
| 7,346,404 B2 | 3/2008 | Eryurek et al. |
| 7,346,433 B2 | 3/2008 | Budike, Jr. |
| 7,346,835 B1 | 3/2008 | Lobinger et al. |
| 7,349,761 B1 | 3/2008 | Cruse |
| 7,354,005 B2 | 4/2008 | Carey et al. |
| 7,356,050 B2 | 4/2008 | Reindl et al. |
| 7,359,335 B2 | 4/2008 | Knop et al. |
| 7,359,345 B2 | 4/2008 | Chang et al. |
| 7,360,002 B2 | 4/2008 | Brueckner et al. |
| 7,360,370 B2 | 4/2008 | Shah et al. |
| 7,360,717 B2 | 4/2008 | Shah |
| 7,364,093 B2 | 4/2008 | Garozzo |
| 7,365,812 B2 | 4/2008 | Lee |
| 7,366,498 B2 | 4/2008 | Ko et al. |
| 7,366,944 B2 | 4/2008 | Oshins et al. |
| 7,370,074 B2 | 5/2008 | Alexander et al. |
| 7,377,450 B2 | 5/2008 | Van Ostrand et al. |
| 7,379,791 B2 | 5/2008 | Tamarkin et al. |
| 7,379,997 B2 | 5/2008 | Ehlers et al. |
| 7,383,158 B2 | 6/2008 | Krocker et al. |
| 7,389,150 B2 | 6/2008 | Inoue et al. |
| 7,389,204 B2 | 6/2008 | Eryurek et al. |
| RE40,437 E | 7/2008 | Rosen |
| 7,392,661 B2 | 7/2008 | Alles |
| 7,395,122 B2 | 7/2008 | Kreidler et al. |
| 7,395,137 B2 | 7/2008 | Robinson |
| 7,403,128 B2 | 7/2008 | Scuka et al. |
| 7,412,839 B2 | 8/2008 | Jayanth |
| 7,412,842 B2 | 8/2008 | Pham |
| 7,418,428 B2 | 8/2008 | Ehlers et al. |
| 7,424,345 B2 | 9/2008 | Norbeck |
| D578,026 S | 10/2008 | Roher et al. |
| 7,433,740 B2 | 10/2008 | Hesse et al. |
| 7,434,744 B2 | 10/2008 | Garozzo et al. |
| 7,436,292 B2 | 10/2008 | Rourke et al. |
| 7,436,293 B2 | 10/2008 | Rourke et al. |
| 7,436,296 B2 | 10/2008 | Rourke et al. |
| 7,436,400 B2 | 10/2008 | Cheng |
| 7,437,198 B2 | 10/2008 | Iwaki |
| 7,439,862 B2 | 10/2008 | Quan |
| 7,441,094 B2 | 10/2008 | Stephens |
| 7,446,660 B2 | 11/2008 | Posamentier |
| 7,448,435 B2 | 11/2008 | Garozzo |
| 7,451,937 B2 | 11/2008 | Flood et al. |
| 7,454,269 B1 | 11/2008 | Dushane et al. |
| 7,455,240 B2 | 11/2008 | Chapman, Jr. et al. |
| 7,457,853 B1 | 11/2008 | Chari et al. |
| 7,460,933 B2 | 12/2008 | Chapman, Jr. et al. |
| 7,476,988 B2 | 1/2009 | Mulhouse et al. |
| 7,516,106 B2 | 4/2009 | Ehlers et al. |
| 7,526,364 B2 | 4/2009 | Rule et al. |
| 7,567,844 B2 | 7/2009 | Thomas et al. |
| 7,571,195 B2 | 8/2009 | Billingsley et al. |
| 7,571,355 B2 | 8/2009 | Shabalin |
| 7,574,871 B2 | 8/2009 | Bloemer et al. |
| 7,584,897 B2 | 9/2009 | Schultz et al. |
| 7,587,459 B2 | 9/2009 | Wewalaarachchi |
| 7,593,124 B1 | 9/2009 | Sheng et al. |
| 7,593,787 B2 | 9/2009 | Feingold et al. |
| 7,604,046 B2 | 10/2009 | Bergman et al. |
| 7,624,931 B2 | 12/2009 | Chapman et al. |
| 7,641,126 B2 | 1/2010 | Schultz et al. |
| 7,650,323 B2 | 1/2010 | Hesse et al. |
| D610,475 S | 2/2010 | Beers et al. |
| 7,693,583 B2 | 4/2010 | Wolff et al. |
| 7,693,591 B2 | 4/2010 | Hoglund et al. |
| 7,706,923 B2 | 4/2010 | Amundson et al. |
| 7,730,223 B1 | 6/2010 | Bavor et al. |
| 7,734,572 B2 | 6/2010 | Wiemeyer et al. |
| 7,743,124 B2 | 6/2010 | Holdaway et al. |
| 7,747,757 B2 | 6/2010 | Garglulo et al. |
| 7,752,289 B2 | 7/2010 | Kikkawa et al. |
| 7,761,563 B2 | 7/2010 | Shike et al. |
| 7,774,102 B2 | 8/2010 | Butler et al. |
| 7,797,349 B2 | 9/2010 | Kosaka |
| 7,809,472 B1 | 10/2010 | Silva et al. |
| 7,827,963 B2 | 11/2010 | Li et al. |
| 7,847,790 B2 | 12/2010 | Bewley et al. |
| 7,861,941 B2 | 1/2011 | Schultz et al. |
| 7,870,080 B2 | 1/2011 | Budike, Jr. |
| 7,886,166 B2 | 2/2011 | Shnekendorf et al. |
| 7,904,209 B2 | 3/2011 | Podgorny et al. |
| 7,934,504 B2 | 5/2011 | Lowe et al. |
| 7,949,615 B2 | 5/2011 | Ehlers et al. |
| 7,963,454 B2 | 6/2011 | Sullivan et al. |
| D642,081 S | 7/2011 | Kashimoto |
| 7,979,164 B2 | 7/2011 | Garozzo et al. |
| 8,005,576 B2 | 8/2011 | Rodgers |
| 8,024,054 B2 | 9/2011 | Mairs et al. |
| 8,032,254 B2 | 10/2011 | Amundson et al. |
| 8,042,049 B2 | 10/2011 | Killian et al. |
| D648,641 S | 11/2011 | Wallaert |
| D648,642 S | 11/2011 | Wallaert |
| 8,050,801 B2 | 11/2011 | Richards et al. |
| 8,082,068 B2 | 12/2011 | Rodgers |
| 8,083,154 B2 | 12/2011 | Schultz et al. |
| 8,087,593 B2 | 1/2012 | Leen |
| 8,091,796 B2 | 1/2012 | Amundson et al. |
| 8,099,178 B2 | 1/2012 | Mairs et al. |
| 8,103,390 B2 | 1/2012 | Rodgers |
| 8,112,181 B2 | 2/2012 | Remsburg |
| 8,116,917 B2 | 2/2012 | Rodgers |
| 8,122,110 B1 | 2/2012 | Wilbur et al. |
| 8,127,060 B2 | 2/2012 | Doll et al. |
| 8,167,216 B2 | 5/2012 | Schultz et al. |
| 8,183,995 B2 | 5/2012 | Wang et al. |
| 8,219,249 B2 | 7/2012 | Harrod et al. |
| 8,224,491 B2 | 7/2012 | Koster et al. |
| 8,239,066 B2 | 8/2012 | Jennings et al. |
| 8,239,073 B2 | 8/2012 | Fausak et al. |
| 8,244,383 B2 | 8/2012 | Bergman et al. |
| 8,255,090 B2 | 8/2012 | Frader-Thompson |
| 2001/0025349 A1 | 9/2001 | Sharood et al. |
| 2001/0034586 A1 | 10/2001 | Ewert et al. |
| 2001/0048376 A1 | 12/2001 | Maeda et al. |
| 2001/0055311 A1 | 12/2001 | Trachewsky et al. |
| 2002/0002425 A1 | 1/2002 | Dossey et al. |
| 2002/0013897 A1 | 1/2002 | McTernan et al. |
| 2002/0016639 A1 | 2/2002 | Smith et al. |
| 2002/0022894 A1 | 2/2002 | Eryurek et al. |
| 2002/0026476 A1 | 2/2002 | Miyazaki et al. |
| 2002/0033252 A1 | 3/2002 | Sasao et al. |
| 2002/0048194 A1 | 4/2002 | Klein |
| 2002/0072814 A1 | 6/2002 | Schuler et al. |
| 2002/0091784 A1 | 7/2002 | Baker et al. |
| 2002/0104323 A1 | 8/2002 | Rash et al. |
| 2002/0116550 A1 | 8/2002 | Hansen |
| 2002/0123896 A1 | 9/2002 | Diez et al. |
| 2002/0124211 A1* | 9/2002 | Gray et al. ...................... 714/39 |
| 2002/0143523 A1 | 10/2002 | Balaji et al. |
| 2002/0152298 A1* | 10/2002 | Kikta et al. ...................... 709/223 |
| 2002/0157054 A1 | 10/2002 | Shin et al. |
| 2002/0163427 A1 | 11/2002 | Eryurek et al. |
| 2002/0178288 A1 | 11/2002 | McLeod |
| 2002/0190242 A1 | 12/2002 | Iillie et al. |

| | | | | | |
|---|---|---|---|---|---|
| 2002/0191026 A1 | 12/2002 | Rodden et al. | 2005/0119771 A1 | 6/2005 | Amundson et al. |
| 2002/0191603 A1 | 12/2002 | Shin et al. | 2005/0119793 A1 | 6/2005 | Amundson et al. |
| 2003/0058863 A1 | 3/2003 | Oost | 2005/0119794 A1 | 6/2005 | Amundson et al. |
| 2003/0061340 A1 | 3/2003 | Sun et al. | 2005/0120012 A1 | 6/2005 | Poth et al. |
| 2003/0078677 A1 | 4/2003 | Hull et al. | 2005/0125495 A1 | 6/2005 | Tjong et al. |
| 2003/0088338 A1 | 5/2003 | Phillips et al. | 2005/0143138 A1 | 6/2005 | Lee et al. |
| 2003/0097482 A1* | 5/2003 | DeHart et al. ............... 709/253 | 2005/0145705 A1 | 7/2005 | Shah et al. |
| 2003/0108064 A1 | 6/2003 | Bilke et al. | 2005/0150967 A1 | 7/2005 | Chapman et al. |
| 2003/0115177 A1 | 6/2003 | Takanabe et al. | 2005/0154494 A1 | 7/2005 | Ahmed |
| 2003/0116637 A1 | 6/2003 | Ellingham | 2005/0159848 A1 | 7/2005 | Shah et al. |
| 2003/0154355 A1 | 8/2003 | Fernandez | 2005/0159924 A1 | 7/2005 | Shah et al. |
| 2003/0206100 A1 | 11/2003 | Richman et al. | 2005/0161517 A1 | 7/2005 | Helt et al. |
| 2003/0229784 A1 | 12/2003 | Cuellar et al. | 2005/0166610 A1 | 8/2005 | Jayanth |
| 2004/0001478 A1 | 1/2004 | Wong | 2005/0176410 A1 | 8/2005 | Brooking et al. |
| 2004/0003051 A1 | 1/2004 | Kryzanowski et al. | 2005/0182498 A1 | 8/2005 | Landou et al. |
| 2004/0003415 A1 | 1/2004 | Ng | 2005/0192727 A1 | 9/2005 | Shostak et al. |
| 2004/0025089 A1 | 2/2004 | Haswarey et al. | 2005/0193155 A1 | 9/2005 | Fujita |
| 2004/0039478 A1 | 2/2004 | Kiesel et al. | 2005/0198040 A1 | 9/2005 | Cohen et al. |
| 2004/0059815 A1 | 3/2004 | Buckingham et al. | 2005/0223339 A1 | 10/2005 | Lee |
| 2004/0066788 A1 | 4/2004 | Lin et al. | 2005/0229610 A1 | 10/2005 | Park et al. |
| 2004/0088069 A1 | 5/2004 | Singh | 2005/0235661 A1 | 10/2005 | Pham |
| 2004/0095237 A1 | 5/2004 | Chen et al. | 2005/0235662 A1 | 10/2005 | Pham |
| 2004/0104942 A1 | 6/2004 | Weigel | 2005/0235663 A1 | 10/2005 | Pham |
| 2004/0107717 A1 | 6/2004 | Yoon et al. | 2005/0240312 A1 | 10/2005 | Terry et al. |
| 2004/0111186 A1 | 6/2004 | Rossi et al. | 2005/0252673 A1 | 11/2005 | Kregle et al. |
| 2004/0111254 A1 | 6/2004 | Gogel et al. | 2005/0256591 A1 | 11/2005 | Rule et al. |
| 2004/0117330 A1 | 6/2004 | Ehlers et al. | 2005/0256935 A1 | 11/2005 | Overstreet et al. |
| 2004/0133314 A1 | 7/2004 | Ehlers et al. | 2005/0258257 A1 | 11/2005 | Thurman et al. |
| 2004/0133704 A1 | 7/2004 | Kryzyanowski | 2005/0270151 A1* | 12/2005 | Winick ............... 340/539.1 |
| 2004/0138981 A1 | 7/2004 | Ehlers et al. | 2005/0278071 A1 | 12/2005 | Durham, III |
| 2004/0139038 A1 | 7/2004 | Ehlers et al. | 2005/0280364 A1 | 12/2005 | Omura et al. |
| 2004/0143360 A1 | 7/2004 | Kiesel et al. | 2005/0281368 A1 | 12/2005 | Droba et al. |
| 2004/0146008 A1 | 7/2004 | Conradt et al. | 2005/0288823 A1 | 12/2005 | Hesse et al. |
| 2004/0148482 A1 | 7/2004 | Grundy et al. | 2006/0006244 A1 | 1/2006 | Morrow et al. |
| 2004/0156360 A1 | 8/2004 | Sexton et al. | 2006/0009861 A1 | 1/2006 | Bonasla |
| 2004/0159112 A1 | 8/2004 | Jayanth et al. | 2006/0009863 A1 | 1/2006 | Lingemann |
| 2004/0189590 A1 | 9/2004 | Mehaffey et al. | 2006/0021358 A1 | 2/2006 | Nallapa |
| 2004/0204775 A1 | 10/2004 | Keyes et al. | 2006/0021359 A1 | 2/2006 | Hur et al. |
| 2004/0205781 A1 | 10/2004 | Hill et al. | 2006/0030954 A1 | 2/2006 | Bergman et al. |
| 2004/0206096 A1 | 10/2004 | Jayanth | 2006/0036350 A1 | 2/2006 | Bohrer et al. |
| 2004/0210348 A1 | 10/2004 | Imhof et al. | 2006/0036952 A1 | 2/2006 | Yang |
| 2004/0218591 A1* | 11/2004 | Ogawa et al. ............... 370/364 | 2006/0041898 A1 | 2/2006 | Potyrailo et al. |
| 2004/0222307 A1 | 11/2004 | DeLuca | 2006/0045107 A1 | 3/2006 | Kucenas et al. |
| 2004/0236471 A1 | 11/2004 | Poth | 2006/0048064 A1 | 3/2006 | Vronay |
| 2004/0245352 A1 | 12/2004 | Smith et al. | 2006/0058924 A1 | 3/2006 | Shah |
| 2004/0249597 A1 | 12/2004 | Whitehead | 2006/0063523 A1 | 3/2006 | McFarland et al. |
| 2004/0260427 A1 | 12/2004 | Wimsatt | 2006/0090142 A1 | 4/2006 | Glasgow et al. |
| 2004/0266491 A1 | 12/2004 | Howard et al. | 2006/0090483 A1 | 5/2006 | Kim et al. |
| 2004/0267385 A1 | 12/2004 | Lingemann | 2006/0091227 A1 | 5/2006 | Attridge |
| 2004/0267395 A1 | 12/2004 | Discenzo et al. | 2006/0092977 A1 | 5/2006 | Bai et al. |
| 2004/0267790 A1 | 12/2004 | Pak et al. | 2006/0106791 A1 | 5/2006 | Morrow et al. |
| 2005/0005249 A1 | 1/2005 | Hill et al. | 2006/0108432 A1 | 5/2006 | Mattheis |
| 2005/0007249 A1 | 1/2005 | Eryurek et al. | 2006/0111816 A1 | 5/2006 | Spalink et al. |
| 2005/0010759 A1 | 1/2005 | Wakiyama | 2006/0130497 A1 | 6/2006 | Kang et al. |
| 2005/0033707 A1 | 2/2005 | Ehlers et al. | 2006/0144055 A1 | 7/2006 | Ahn |
| 2005/0034023 A1 | 2/2005 | Maturana et al. | 2006/0144232 A1 | 7/2006 | Kang et al. |
| 2005/0040247 A1 | 2/2005 | Pouchak | 2006/0149414 A1 | 7/2006 | Archacki et al. |
| 2005/0040250 A1 | 2/2005 | Wruck | 2006/0150027 A1 | 7/2006 | Paden |
| 2005/0041033 A1 | 2/2005 | Hilts et al. | 2006/0153247 A1 | 7/2006 | Stumer |
| 2005/0041633 A1 | 2/2005 | Roeser et al. | 2006/0155398 A1 | 7/2006 | Hoffberg et al. |
| 2005/0046584 A1 | 3/2005 | Breed | 2006/0158051 A1 | 7/2006 | Bartlett et al. |
| 2005/0051168 A1 | 3/2005 | DeVries et al. | 2006/0159007 A1 | 7/2006 | Frutiger et al. |
| 2005/0054381 A1 | 3/2005 | Lee et al. | 2006/0168522 A1 | 7/2006 | Bala |
| 2005/0055427 A1 | 3/2005 | Frutiger et al. | 2006/0185818 A1 | 8/2006 | Garozzo |
| 2005/0068978 A1 | 3/2005 | Sexton et al. | 2006/0186214 A1 | 8/2006 | Simon et al. |
| 2005/0073789 A1 | 4/2005 | Tanis | 2006/0190138 A1* | 8/2006 | Stone et al. ............... 700/276 |
| 2005/0076150 A1 | 4/2005 | Lee et al. | 2006/0192021 A1 | 8/2006 | Schultz et al. |
| 2005/0080879 A1 | 4/2005 | Kim et al. | 2006/0192022 A1 | 8/2006 | Barton et al. |
| 2005/0081156 A1 | 4/2005 | Clark et al. | 2006/0196953 A1 | 9/2006 | Simon et al. |
| 2005/0081157 A1 | 4/2005 | Clark et al. | 2006/0200253 A1 | 9/2006 | Hoffberg et al. |
| 2005/0090915 A1 | 4/2005 | Gelwtiz | 2006/0200258 A1 | 9/2006 | Hoffberg et al. |
| 2005/0096872 A1 | 5/2005 | Blevins et al. | 2006/0200259 A1 | 9/2006 | Hoffberg et al. |
| 2005/0097478 A1 | 5/2005 | Killian et al. | 2006/0200260 A1 | 9/2006 | Hoffberg et al. |
| 2005/0103874 A1 | 5/2005 | Erdman | 2006/0202978 A1 | 9/2006 | Lee et al. |
| 2005/0109048 A1 | 5/2005 | Lee | 2006/0206220 A1 | 9/2006 | Amundson |
| 2005/0116023 A1 | 6/2005 | Amundson et al. | 2006/0209208 A1 | 9/2006 | Kim et al. |
| 2005/0118996 A1 | 6/2005 | Lee et al. | 2006/0212194 A1 | 9/2006 | Breed |
| 2005/0119765 A1 | 6/2005 | Bergman et al. | 2006/0219799 A1 | 10/2006 | Schultz et al. |
| 2005/0119766 A1 | 6/2005 | Amundson et al. | 2006/0229090 A1 | 10/2006 | LaDue |

| | | |
|---|---|---|
| 2006/0235548 A1 | 10/2006 | Gaudette |
| 2006/0236351 A1 | 10/2006 | Ellerbrock et al. |
| 2006/0239296 A1 | 10/2006 | Jinzaki et al. |
| 2006/0248233 A1 | 11/2006 | Park et al. |
| 2006/0250578 A1 | 11/2006 | Pohl et al. |
| 2006/0250979 A1 | 11/2006 | Gauweller et al. |
| 2006/0267756 A1 | 11/2006 | Kates |
| 2006/0276917 A1 | 12/2006 | Li et al. |
| 2007/0005191 A1 | 1/2007 | Sloup et al. |
| 2007/0008116 A1 | 1/2007 | Bergman et al. |
| 2007/0012052 A1* | 1/2007 | Butler et al. .......... 62/181 |
| 2007/0013534 A1 | 1/2007 | DiMaggio |
| 2007/0014233 A1 | 1/2007 | Oguro et al. |
| 2007/0016311 A1 | 1/2007 | Bergman et al. |
| 2007/0016476 A1 | 1/2007 | Hoffberg et al. |
| 2007/0019683 A1 | 1/2007 | Kryzyanowski |
| 2007/0025368 A1 | 2/2007 | Ha et al. |
| 2007/0032909 A1 | 2/2007 | Tolbert et al. |
| 2007/0033310 A1 | 2/2007 | Kweon |
| 2007/0035255 A1 | 2/2007 | Shuster et al. |
| 2007/0040040 A1 | 2/2007 | Mueller |
| 2007/0043477 A1 | 2/2007 | Ehlers et al. |
| 2007/0043478 A1 | 2/2007 | Ehlers et al. |
| 2007/0045429 A1 | 3/2007 | Chapman et al. |
| 2007/0045431 A1 | 3/2007 | Chapman et al. |
| 2007/0045442 A1 | 3/2007 | Chapman et al. |
| 2007/0051818 A1 | 3/2007 | Atlas |
| 2007/0053513 A1 | 3/2007 | Hoffberg |
| 2007/0055407 A1 | 3/2007 | Goldberg et al. |
| 2007/0055757 A1 | 3/2007 | Mairs et al. |
| 2007/0067062 A1 | 3/2007 | Mairs et al. |
| 2007/0067496 A1 | 3/2007 | Deiretsbacher et al. |
| 2007/0073973 A1 | 3/2007 | Hazay |
| 2007/0080235 A1 | 4/2007 | Fulton, Jr. |
| 2007/0083721 A1 | 4/2007 | Grinspan |
| 2007/0084937 A1 | 4/2007 | Ahmed |
| 2007/0088883 A1 | 4/2007 | Wakabayashi |
| 2007/0089090 A1 | 4/2007 | Riedl et al. |
| 2007/0090199 A1 | 4/2007 | Hull et al. |
| 2007/0093226 A1 | 4/2007 | Foltyn et al. |
| 2007/0097993 A1 | 5/2007 | Bojahra et al. |
| 2007/0102149 A1 | 5/2007 | Kates |
| 2007/0109114 A1 | 5/2007 | Farley et al. |
| 2007/0109975 A1 | 5/2007 | Reckamp et al. |
| 2007/0113247 A1 | 5/2007 | Kwak |
| 2007/0114291 A1 | 5/2007 | Pouchak |
| 2007/0119957 A1 | 5/2007 | Kates |
| 2007/0119958 A1 | 5/2007 | Kates |
| 2007/0129820 A1 | 6/2007 | Glanzer et al. |
| 2007/0129825 A1 | 6/2007 | Kargenian |
| 2007/0129826 A1 | 6/2007 | Kreidler et al. |
| 2007/0129917 A1 | 6/2007 | Blevins et al. |
| 2007/0130834 A1 | 6/2007 | Kande et al. |
| 2007/0130969 A1 | 6/2007 | Peterson et al. |
| 2007/0131784 A1 | 6/2007 | Garozzo et al. |
| 2007/0135692 A1 | 6/2007 | Hwang et al. |
| 2007/0135946 A1 | 6/2007 | Sugiyama et al. |
| 2007/0136669 A1 | 6/2007 | Kwon et al. |
| 2007/0136687 A1 | 6/2007 | Pak |
| 2007/0138307 A1 | 6/2007 | Khoo |
| 2007/0138308 A1 | 6/2007 | Schultz et al. |
| 2007/0143704 A1 | 6/2007 | Laird-McConnell |
| 2007/0143707 A1 | 6/2007 | Yun et al. |
| 2007/0157016 A1 | 7/2007 | Dayan et al. |
| 2007/0158442 A1 | 7/2007 | Chapman et al. |
| 2007/0168887 A1 | 7/2007 | Lee |
| 2007/0177505 A1 | 8/2007 | Charrua et al. |
| 2007/0191024 A1 | 8/2007 | Kim et al. |
| 2007/0192731 A1 | 8/2007 | Townsend et al. |
| 2007/0204637 A1 | 9/2007 | Fujii et al. |
| 2007/0205297 A1 | 9/2007 | Finkam et al. |
| 2007/0205916 A1 | 9/2007 | Blom et al. |
| 2007/0208461 A1 | 9/2007 | Chase |
| 2007/0208549 A1 | 9/2007 | Blevins et al. |
| 2007/0213853 A1 | 9/2007 | Glanzer et al. |
| 2007/0219645 A1 | 9/2007 | Thomas et al. |
| 2007/0220301 A1 | 9/2007 | Brundridge et al. |
| 2007/0220907 A1 | 9/2007 | Ehlers |
| 2007/0223500 A1 | 9/2007 | Lee et al. |
| 2007/0225868 A1 | 9/2007 | Terlson et al. |
| 2007/0225869 A1 | 9/2007 | Amundson et al. |
| 2007/0233323 A1 | 10/2007 | Wiemeyer et al. |
| 2007/0236156 A1 | 10/2007 | Lys et al. |
| 2007/0237032 A1 | 10/2007 | Rhee et al. |
| 2007/0238413 A1 | 10/2007 | Coutts |
| 2007/0239658 A1 | 10/2007 | Cunningham et al. |
| 2007/0240226 A1 | 10/2007 | Song et al. |
| 2007/0241203 A1 | 10/2007 | Wagner et al. |
| 2007/0242058 A1 | 10/2007 | Yamada |
| 2007/0245306 A1 | 10/2007 | Dameshek et al. |
| 2007/0257120 A1 | 11/2007 | Chapman, Jr. et al. |
| 2007/0260782 A1 | 11/2007 | Shaikli |
| 2007/0260978 A1 | 11/2007 | Oh et al. |
| 2007/0266329 A1 | 11/2007 | Gaudette |
| 2007/0271521 A1 | 11/2007 | Harriger et al. |
| 2007/0274093 A1 | 11/2007 | Haim et al. |
| 2007/0277013 A1 | 11/2007 | Rexha et al. |
| 2007/0278320 A1 | 12/2007 | Lunacek et al. |
| 2007/0284452 A1 | 12/2007 | Butler et al. |
| 2007/0299857 A1 | 12/2007 | Gwozdz et al. |
| 2007/0300064 A1 | 12/2007 | Isaacs et al. |
| 2008/0003845 A1 | 1/2008 | Hong et al. |
| 2008/0004727 A1 | 1/2008 | Glanzer et al. |
| 2008/0005428 A1 | 1/2008 | Maul et al. |
| 2008/0006709 A1 | 1/2008 | Ashworth et al. |
| 2008/0013259 A1 | 1/2008 | Barton et al. |
| 2008/0029610 A1 | 2/2008 | Nichols |
| 2008/0031147 A1 | 2/2008 | Fieremans et al. |
| 2008/0040351 A1 | 2/2008 | Jin et al. |
| 2008/0048045 A1 | 2/2008 | Butler et al. |
| 2008/0048046 A1 | 2/2008 | Wagner et al. |
| 2008/0054082 A1 | 3/2008 | Evans et al. |
| 2008/0055190 A1 | 3/2008 | Lee |
| 2008/0056722 A1 | 3/2008 | Hendrix et al. |
| 2008/0057872 A1 | 3/2008 | McFarland et al. |
| 2008/0057931 A1 | 3/2008 | Nass et al. |
| 2008/0058996 A1 | 3/2008 | Sachdev et al. |
| 2008/0059682 A1 | 3/2008 | Cooley et al. |
| 2008/0062892 A1 | 3/2008 | Dodgen et al. |
| 2008/0063006 A1 | 3/2008 | Nichols |
| 2008/0065926 A1 | 3/2008 | Poth et al. |
| 2008/0072704 A1 | 3/2008 | Clark et al. |
| 2008/0073440 A1 | 3/2008 | Butler et al. |
| 2008/0077884 A1 | 3/2008 | Patitucci |
| 2008/0077886 A1 | 3/2008 | Eichner |
| 2008/0082767 A1 | 4/2008 | Nulkar et al. |
| 2008/0083009 A1 | 4/2008 | Kaler et al. |
| 2008/0083834 A1 | 4/2008 | Krebs et al. |
| 2008/0097651 A1 | 4/2008 | Shah et al. |
| 2008/0104189 A1 | 5/2008 | Baker et al. |
| 2008/0114500 A1 | 5/2008 | Hull et al. |
| 2008/0120335 A1 | 5/2008 | Dolgoff |
| 2008/0121729 A1 | 5/2008 | Gray |
| 2008/0128523 A1 | 6/2008 | Hoglund et al. |
| 2008/0129475 A1 | 6/2008 | Breed et al. |
| 2008/0133033 A1 | 6/2008 | Wolff et al. |
| 2008/0133060 A1 | 6/2008 | Hoglund et al. |
| 2008/0133061 A1 | 6/2008 | Hoglund et al. |
| 2008/0134087 A1 | 6/2008 | Hoglund et al. |
| 2008/0134098 A1 | 6/2008 | Hoglund et al. |
| 2008/0144302 A1 | 6/2008 | Rosenblatt |
| 2008/0148098 A1 | 6/2008 | Chen |
| 2008/0161977 A1 | 7/2008 | Takach et al. |
| 2008/0161978 A1 | 7/2008 | Shah |
| 2008/0168255 A1 | 7/2008 | Abou-Emara et al. |
| 2008/0168356 A1 | 7/2008 | Eryurek et al. |
| 2008/0183335 A1 | 7/2008 | Poth et al. |
| 2008/0184059 A1 | 7/2008 | Chen |
| 2008/0185976 A1 | 8/2008 | Dickey et al. |
| 2008/0186160 A1 | 8/2008 | Kim et al. |
| 2008/0192649 A1 | 8/2008 | Pyeon et al. |
| 2008/0195254 A1 | 8/2008 | Jung et al. |
| 2008/0195581 A1 | 8/2008 | Ashmore et al. |
| 2008/0195687 A1 | 8/2008 | Jung et al. |
| 2008/0198036 A1 | 8/2008 | Songkakul et al. |
| 2008/0215987 A1 | 9/2008 | Alexander et al. |
| 2008/0217418 A1 | 9/2008 | Helt et al. |
| 2008/0217419 A1 | 9/2008 | Ehlers et al. |

| | | |
|---|---|---|
| 2008/0223944 A1 | 9/2008 | Helt et al. |
| 2008/0235611 A1 | 9/2008 | Fraley et al. |
| 2008/0256475 A1 | 10/2008 | Amundson et al. |
| 2008/0264085 A1 | 10/2008 | Perry et al. |
| 2008/0272934 A1 | 11/2008 | Wang et al. |
| 2008/0281472 A1 | 11/2008 | Podgorny et al. |
| 2008/0294274 A1 | 11/2008 | Laberge et al. |
| 2008/0294932 A1 | 11/2008 | Oshins et al. |
| 2009/0001180 A1 | 1/2009 | Siddaramanna et al. |
| 2009/0001182 A1 | 1/2009 | Siddaramanna et al. |
| 2009/0049847 A1 | 2/2009 | Butler et al. |
| 2009/0052105 A1 | 2/2009 | Soleimani et al. |
| 2009/0057424 A1 | 3/2009 | Sullivan et al. |
| 2009/0057425 A1 | 3/2009 | Sullivan et al. |
| 2009/0065597 A1 | 3/2009 | Garozzo et al. |
| 2009/0094506 A1 | 4/2009 | Lakkis |
| 2009/0105846 A1 | 4/2009 | Hesse et al. |
| 2009/0113037 A1 | 4/2009 | Pouchak |
| 2009/0119092 A1 | 5/2009 | Balasubramanyan |
| 2009/0132091 A1 | 5/2009 | Chambers et al. |
| 2009/0140056 A1 | 6/2009 | Leen |
| 2009/0140057 A1 | 6/2009 | Leen |
| 2009/0140058 A1 | 6/2009 | Koster et al. |
| 2009/0140061 A1 | 6/2009 | Schultz et al. |
| 2009/0140062 A1 | 6/2009 | Amundson et al. |
| 2009/0140063 A1 | 6/2009 | Koster et al. |
| 2009/0140064 A1 | 6/2009 | Schultz et al. |
| 2009/0143879 A1 | 6/2009 | Amundson et al. |
| 2009/0143880 A1 | 6/2009 | Amundson et al. |
| 2009/0143916 A1 | 6/2009 | Boll et al. |
| 2009/0143918 A1 | 6/2009 | Amundson et al. |
| 2009/0157529 A1 | 6/2009 | Ehlers et al. |
| 2009/0195349 A1 | 8/2009 | Frader-Thompson |
| 2009/0198810 A1 | 8/2009 | Bayer et al. |
| 2009/0245278 A1 | 10/2009 | Kee |
| 2009/0257431 A1 | 10/2009 | Ramanathan et al. |
| 2009/0259785 A1 | 10/2009 | Perry et al. |
| 2009/0261174 A1 | 10/2009 | Butler et al. |
| 2009/0261767 A1 | 10/2009 | Butler et al. |
| 2009/0266904 A1 | 10/2009 | Cohen |
| 2009/0267540 A1 | 10/2009 | Chemel et al. |
| 2009/0271336 A1 | 10/2009 | Franks |
| 2009/0287736 A1 | 11/2009 | Shike et al. |
| 2010/0011437 A1 | 1/2010 | Courtney |
| 2010/0023865 A1 | 1/2010 | Fulker et al. |
| 2010/0050075 A1 | 2/2010 | Thorson et al. |
| 2010/0050108 A1 | 2/2010 | Mirza |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0070907 A1 | 3/2010 | Harrod et al. |
| 2010/0073159 A1 | 3/2010 | Schmickley et al. |
| 2010/0076605 A1 | 3/2010 | Harrod et al. |
| 2010/0100253 A1 | 4/2010 | Fausak et al. |
| 2010/0101854 A1 | 4/2010 | Wallaert et al. |
| 2010/0102136 A1 | 4/2010 | Hadzidedic et al. |
| 2010/0102948 A1 | 4/2010 | Grohman et al. |
| 2010/0102973 A1 | 4/2010 | Grohman et al. |
| 2010/0106305 A1 | 4/2010 | Pavlak et al. |
| 2010/0106307 A1 | 4/2010 | Grohman et al. |
| 2010/0106308 A1 | 4/2010 | Filbeck et al. |
| 2010/0106309 A1 | 4/2010 | Grohman et al. |
| 2010/0106310 A1 | 4/2010 | Grohman |
| 2010/0106311 A1 | 4/2010 | Wallaert |
| 2010/0106312 A1 | 4/2010 | Grohman et al. |
| 2010/0106313 A1 | 4/2010 | Grohman et al. |
| 2010/0106314 A1 | 4/2010 | Grohman et al. |
| 2010/0106315 A1 | 4/2010 | Grohman |
| 2010/0106316 A1 | 4/2010 | Curry et al. |
| 2010/0106317 A1 | 4/2010 | Grohman et al. |
| 2010/0106318 A1 | 4/2010 | Grohman et al. |
| 2010/0106319 A1 | 4/2010 | Grohman et al. |
| 2010/0106320 A1 | 4/2010 | Grohman et al. |
| 2010/0106321 A1 | 4/2010 | Hadzidedic |
| 2010/0106322 A1 | 4/2010 | Grohman |
| 2010/0106323 A1 | 4/2010 | Wallaert |
| 2010/0106324 A1 | 4/2010 | Grohman |
| 2010/0106325 A1 | 4/2010 | Grohman |
| 2010/0106326 A1 | 4/2010 | Grohman |
| 2010/0106327 A1 | 4/2010 | Grohman et al. |
| 2010/0106329 A1 | 4/2010 | Grohman |
| 2010/0106330 A1 | 4/2010 | Grohman |
| 2010/0106333 A1 | 4/2010 | Grohman et al. |
| 2010/0106334 A1 | 4/2010 | Grohman et al. |
| 2010/0106787 A1 | 4/2010 | Grohman |
| 2010/0106809 A1 | 4/2010 | Grohman |
| 2010/0106810 A1 | 4/2010 | Grohman |
| 2010/0106814 A1 | 4/2010 | Hadzidedic et al. |
| 2010/0106815 A1 | 4/2010 | Grohman et al. |
| 2010/0106925 A1 | 4/2010 | Grohman et al. |
| 2010/0106957 A1 | 4/2010 | Grohman et al. |
| 2010/0107007 A1 | 4/2010 | Grohman et al. |
| 2010/0107070 A1 | 4/2010 | Devineni et al. |
| 2010/0107071 A1 | 4/2010 | Pavlak et al. |
| 2010/0107072 A1 | 4/2010 | Mirza et al. |
| 2010/0107073 A1 | 4/2010 | Wallaert |
| 2010/0107074 A1 | 4/2010 | Pavlak et al. |
| 2010/0107076 A1 | 4/2010 | Grohman |
| 2010/0107083 A1 | 4/2010 | Grohman |
| 2010/0107103 A1 | 4/2010 | Wallaert |
| 2010/0107109 A1 | 4/2010 | Filbeck et al. |
| 2010/0107110 A1 | 4/2010 | Mirza |
| 2010/0107111 A1 | 4/2010 | Mirza |
| 2010/0107112 A1 | 4/2010 | Jennings et al. |
| 2010/0107232 A1 | 4/2010 | Grohman et al. |
| 2010/0115364 A1 | 5/2010 | Grohman |
| 2010/0142526 A1 | 6/2010 | Wong |
| 2010/0145629 A1 | 6/2010 | Botich et al. |
| 2010/0168924 A1 | 7/2010 | Tessier et al. |
| 2010/0169419 A1 | 7/2010 | DeVilbiss et al. |
| 2010/0179696 A1 | 7/2010 | Grohman et al. |
| 2010/0211546 A1 | 8/2010 | Grohman et al. |
| 2010/0241245 A1 | 9/2010 | Wiemeyer et al. |
| 2010/0259931 A1 | 10/2010 | Chemel et al. |
| 2010/0264846 A1 | 10/2010 | Chemel et al. |
| 2010/0270933 A1 | 10/2010 | Chemel et al. |
| 2010/0272102 A1 | 10/2010 | Kobayashi |
| 2010/0295474 A1 | 11/2010 | Chemel et al. |
| 2010/0295475 A1 | 11/2010 | Chemel et al. |
| 2010/0295482 A1 | 11/2010 | Chemel et al. |
| 2010/0301768 A1 | 12/2010 | Chemel et al. |
| 2010/0301769 A1 | 12/2010 | Chemel et al. |
| 2010/0301770 A1 | 12/2010 | Chemel et al. |
| 2010/0301771 A1 | 12/2010 | Chemel et al. |
| 2010/0301772 A1 | 12/2010 | Chemel et al. |
| 2010/0301773 A1 | 12/2010 | Chemel et al. |
| 2010/0301774 A1 | 12/2010 | Chemel et al. |
| 2010/0305761 A1 | 12/2010 | Remsburg |
| 2010/0314458 A1 | 12/2010 | Votaw et al. |
| 2010/0319362 A1 | 12/2010 | Hisaoka |
| 2011/0001436 A1 | 1/2011 | Chemel et al. |
| 2011/0001438 A1 | 1/2011 | Chemel et al. |
| 2011/0004823 A1 | 1/2011 | Wallaert |
| 2011/0004824 A1 | 1/2011 | Thorson et al. |
| 2011/0007016 A1 | 1/2011 | Mirza et al. |
| 2011/0007017 A1 | 1/2011 | Wallaert |
| 2011/0010620 A1 | 1/2011 | Mirza et al. |
| 2011/0010621 A1 | 1/2011 | Wallaert |
| 2011/0010652 A1 | 1/2011 | Wallaert |
| 2011/0010653 A1 | 1/2011 | Wallaert |
| 2011/0010660 A1 | 1/2011 | Thorson et al. |
| 2011/0032932 A2 | 2/2011 | Pyeon et al. |
| 2011/0040785 A1 | 2/2011 | Steenberg et al. |
| 2011/0061014 A1 | 3/2011 | Frader-Thompson et al. |
| 2011/0063126 A1 | 3/2011 | Kennedy et al. |
| 2012/0012662 A1 | 1/2012 | Leen et al. |
| 2012/0046792 A1 | 2/2012 | Secor |
| 2012/0065805 A1 | 3/2012 | Montalvo |
| 2012/0116593 A1 | 5/2012 | Amundson et al. |
| 2012/0181010 A1 | 7/2012 | Schultz et al. |

FOREIGN PATENT DOCUMENTS

| | | |
|---|---|---|
| EP | 2241836 A1 | 10/2010 |
| EP | 2241837 A1 | 10/2010 |
| GB | 2117573 A | 10/1983 |
| WO | 02056540 A2 | 7/2002 |
| WO | 2008100641 A1 | 8/2008 |

OTHER PUBLICATIONS

Related case U.S. Appl. No. 29/345,748, filed Oct. 21, 2009 to Timothy Wallaert et al., entitled "Thin Cover Plate for an Electronic System Controller".
Related case U.S. Appl. No. 29/345,747, filed Oct. 21, 2009 to Timothy Wallaert et al., entitled "Thin Cover Plate for an Electronic System Controller".
Related case U.S. Appl. No. 12/603,508, filed Oct. 21, 2009 to Wojciech Grohman, entitled "Alarm and Diagnostics System and Method for a Distributed-Architecture Heating, Ventilation and Air Conditioning Network".
Related case U.S. Appl. No. 12/603,450, filed Oct. 21, 2009 to Wojciech Grohman, entitled "Alarm and Diagnostics System and Method for a Distributed-Architecture Heating, Ventilation and Air Conditioning Network".
Related case U.S. Appl. No. 12/603,382, filed Oct. 21, 2009 to Wojciech Grohman, entitled "Device Abstraction System and Method for a Distributed-Architecture Heating, Ventilation and Air Conditioning System".
Related case U.S. Appl. No. 12/603,504, filed Oct. 21, 2009 to Amanda Filbeck et al., entitled "System and Method of Use for a User Interface Dashboard of a Heating, Ventilation and Air Conditioning Network".
Related case U.S. Appl. No. 12/603,449, filed Oct. 21, 2009 to Wojciech Grohman et al., entitled "System and Method of Use for a User Interface Ashboard of a Heating, Ventilation and Air Conditioning Network".
Related case U.S. Appl. No. 12/603,460, filed Oct. 21, 2009 to Wojciech Grohman et al., entitled "System and Method of Use for a User Interface Dashboard of a Heating, Ventilation and Air Conditioning Network".
Related case U.S. Appl. No. 12/603,526, filed Oct. 21, 2009 to Wojciech Grohman et al., entitled "Communication Protocol System and Methof for a Distrivuted-Architecture Heating, Ventilation and Air Conditioning Network K".
Related case U.S. Appl. No. 12/603,475, filed Oct. 21, 2009 to Suresh Kumar Devineni et al., entitled "System and Method of Use for a User Interface Dashboard of a Heating, Ventilation and Air Conditioning Network".
Related case U.S. Appl. No. 12/603,362, filed Oct. 21, 2009 to Wojciech Grohman et al., entitled "Device Abstraction System and Method for a Distributed-Architecture Heating, Ventilation and Air Conditioning System".
Related case U.S. Appl. No. 12/603,473, filed Oct. 21, 2009 to Wojciech Grohman et al., entitled "System and Method for Zoning a Distributed-Architecture Heating, Ventilation and Air Conditioning Network".
Related case U.S. Appl. No. 12/603,407, filed Oct. 21, 2009 to Amanda Filbeck et al., entitled "System and Method for Zoning a Distributed-Architecture Heating, Ventilation and Air Conditioning Network".
Related case U.S. Appl. No. 12/603,496, filed Oct. 21, 2009 to Wojciech Grohman et al., entitled "Device Abstraction System and Method for a Distributed-Architecture Heating, Ventilation and Air Conditioning System".
Related case U.S. Appl. No. 12/603,482, filed Oct. 21, 2009 to Muhammad Mirza et al., entitled "System and Method of Use for a User Interface Dashboard of a Heating, Ventilation and Air Conditioning Network".
Related case U.S. Appl. No. 12/603,488, filed Oct. 21, 2009 to Muhammad Mirza et al., entitled "System and Method of Use for a User Interface Dashboard of a Heating, Ventilation and Air Conditioning Network".
Related case U.S. Appl. No. 12/603,495, filed Oct. 21, 2009 to Thomas Pavlak et al., entitled "System and Method of Use for a User Interface Dashboard of a Heating, Ventilation and Air Conditioning Network".
Related case U.S. Appl. No. 12/603,497, filed Oct. 21, 2009 to Muhammad Mirza et al., entitled "System and Method of Use for a User Interface Dashboard of a Heating, Ventilation and Air Conditioning Network".
Related case U.S. Appl. No. 12/603,431, filed Oct. 21, 2009 to Wojciech Grohman et al., entitled "General Control Technique in a Heating, Ventilation and Air Conditioning Network".
Related case U.S. Appl. No. 12/603,502, filed Oct. 21, 2009 to Jacob Jennings et al., entitled "System and Method of Use for a User Interface Dashboard of a Heating, Ventilation and Air Conditioning Network".
Related case U.S. Appl. No. 12/603,489, filed Oct. 21, 2009 to Wojciech Grohman et al., entitled "System and Method for Zoning a Distributed-Architecture Heating, Ventilation and Air Conditioning Network".
Related case U.S. Appl. No. 12/603,527, filed Oct. 21, 2009 to Darko Hadzidedic, entitled "Memory Recovery Scheme and Data Structure in a Heating, Ventilation and Air Conditioning Network".
Related case U.S. Appl. No. 12/603,479, filed Oct. 21, 2009 to Wojciech Grohman et al., entitled "Device Abstraction System and Method for a Distributed-Architecture Heating, Ventilation and Air Conditioning System".
Related case U.S. Appl. No. 12/603,536, filed Oct. 21, 2009 to Timothy Wallaert et al., entitled "Communication Protocol System and Method for a Distributed-Architecture Heating, Ventilation and Air Conditioning Network".
Related case U.S. Appl. No. 12/603,509, filed Oct. 21, 2009 to Timothy Wallaert et al., entitled "System and Method of Use for a User Interface Dashboard of a Heating, Ventilation and Air Conditioning Network".
Related case U.S. Appl. No. 12/603,512, filed Oct. 21, 2009 to Wojciech Grohman et al., entitled "Programming and Configuration in a Heating, Ventilation and Air Conditioning Network".
Related case U.S. Appl. No. 12/603,464, filed Oct. 21, 2009 to Wojciech Grohman et al., entitled "Alarm and Diagnostics System and Method for a Distributed-Architecture Heating, Ventilation and Air Conditioning Network".
Related case U.S. Appl. No. 12/603,528, filed Oct. 21, 2009 to Wojciech Grohman et al., entitled "Memory Recovery Scheme and Data Structure in a Heating, Ventilation and Air Conditioning Network".
Related case U.S. Appl. No. 12/603,525, filed Oct. 21, 2009 to Wojciech Grohman et al., entitled "Method of Controlling Equipment in a Heating, Ventilation and Air Conditioning Network".
Related case U.S. Appl. No. 12/603,520, filed Oct. 21, 2009 to Darko Hadzidedic et al., entitled "Alarm and Diagnostics System and Method for a Distributed-Architecture Heating, Ventilation and Air Conditioning Network".
Related case U.S. Appl. No. 12/603,539, filed Oct. 21, 2009 to Wojciech Grohman et al., entitled "Communication Protocol System and Method for a Distributed-Architecture Heating, Ventilation and Air Conditioning Network".
Related case U.S. Appl. No. 12/603,420, filed Oct. 21, 2009 to Darko Hadzidedic et al., entitled "Alarm and Diagnostics System and Method for a Distributed-Architecture Heating, Ventilation and Air Conditioning Network".
Related case U.S. Appl. No. 12/603,483, filed Oct. 21, 2009 to Wojciech Grohman et al., entitled "Device Abstraction System and Method for a Distributed-Architecture Heating, Ventilation and Air Conditioning System".
Related case U.S. Appl. No. 12/603,514, filed Oct. 21, 2009 to Thomas Pavlak et al., entitled "System and Method of Use for a User Interface Dashboard of a Heating, Ventilation and Air Conditioning Network".
Related case U.S. Appl. No. 12/603,515, filed Oct. 21, 2009 to Wojciech Grohman et al., entitled "Alarm and Diagnostics System and Method for a Distributed-Architecture Heating, Ventilation and Air Conditioning Network".
Related case U.S. Appl. No. 12/603,490, filed Oct. 21, 2009 to Wojciech Grohman, entitled "System Recovery in a Heating, Ventilation and Air Conditioning Network".
Related case U.S. Appl. No. 12/603,523, filed Oct. 21, 2009 to Wojciech Grohman et al., entitled "Alarm and Diagnostics System and Method for a Distributed-Architecture Heating, Ventilation and Air Conditioning".

Related case U.S. Appl. No. 12/603,493, filed Oct. 21, 2009 to Wojciech Grohman et al., entitled "System Recovery in a Heating, Ventilation and Air Conditioning Network".
Related case U.S. Appl. No. 12/603,547, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,531, filed Oct. 21, 2009 to Wojciech Grohman, entitled "Memory Recovery Scheme and Data Structure in a Heating, Ventilation and Air Conditioning Network".
Related case U.S. Appl. No. 12/603,555, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,562, filed Oct. 21, 2009 to Wojciech Grohman et al., entitled "Communication Protocol System and Method for a Distributed-Architecture Heating, Ventilation and Air Conditioning Network".
Related case U.S. Appl. No. 12/603,566, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,451, filed Oct. 21, 2009 to Timothy Wallaert, entitled "Alarm and Diagnostics System and Method for a Distributed-Architecture Heating, Ventilation and Air Conditioning Network".
Related case U.S. Appl. No. 12/603,553, filed Oct. 21, 2009 to Wojciech Grohman et al., entitled "Communication Protocol System and Method for a Distributed-Architecture Heating, Ventilation and Air Conditioning Network".
Related case U.S. Appl. No. 12/603,487, filed Oct. 21, 2009 to Wojciech Grohman, entitled "System Recovery in a Heating, Ventilation and Air Conditioning Network".
Related case U.S. Appl. No. 12/603,558, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,468, filed Oct. 21, 2009 to Wojciech Grohman et al., entitled "Programming and Configuration in a Heating, Ventilation and Air Conditioning Network".
Related case U.S. Appl. No. 12/603,560, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,519, filed Oct. 21, 2009 to Thomas Pavlak, entitled "System and Method of Use for a User Interface Dashboard of a Heating, Ventilation and Air Conditioning Network".
Related case U.S. Appl. No. 12/603,499, filed Oct. 21, 2009 to Jimmy Curry et al., entitled "Alarm and Diagnostics System and Method for a Distributed-Architechture Heating, Ventilation and Air Conditioning Network".
"Define Track at Dictionary.com ," http://dictionary.reference.com/browse/track, Mar. 12, 2013, 3 pages.
"Definition of Track by Macmillan Dictionary," http://www.macmillandictionary.com/dictionary/british/track, Mar. 12, 2013, 4 pages.
"Definition of track by the Free Online Dictionary, Thesaurus, and Encyclopedia," http://www.thefreedictionary.com/track, Mar. 12, 2013, 6 pages.
Checket-Hanks, B., "Zoning Controls for Convenience's Sakes, High-End Residential Controls Move Into New Areas," Air Conditioning, Heating & Refrigeration News, ABI/IFORM Global, Jun. 28, 2004, 3 pages.
Leeb, G., "A User Interface for Home-Net," IEEE Transactions on Consumer Electronics, vol. 40, Issue 4, Nov. 1994, pp. 897-902.
"IPMI—Intelligent Platform Management Interface Specification v1.5," Document Revision 1.1, Intel Hewlett-Packard NEC Dell, Feb. 20, 2002, 460 pages.
Nash, H., "Fire Alarm Systems for Health Care Facilities," IEEE Transactions on Industry Applications, vol. 1A-19, No. 5, Sep./ Oct. 1983, pp. 848-852.
Bruggeman, E., et al., "A Multifunction Home Control System," IEEE Transactions on Consumer Electronics, CE-29, Issue 1, 10 pages.
Fischer, H., et al., "Remote Building Management and DDc-Technology to Operate Distributed HVAC-Installations," The first International Telecommunications Energy Special Conference, TELESCON '94, Apr. 11-15, 1994, pp. 127-132.
Gallas, B., et al., "Embedded Pentium ®Processor System Design for Windows CE," WESCON 1998, pp. 114-123.
"iView-100 Series (iView/iView-100-40) Handheld Controller User's Manual," ICP DAS, Mar. 2006, Version 2.0.
"Spectre™ Commercial Zoning System, Engineering Data," Lennox, Bulletin No. 210366E, Oct. 2002, 33 pages.
Sharma, A., "Design of Wireless Sensors Network for Building Management Systems," University of California-Berkley, 57 pages.
"Linux Programmer's Manual," UNIX Man Pages: Login (1), http://unixhelp.ed.ac.uk/CGI/man-cgi?login, Util-linux 1.6, Nov. 4, 1996, 4 pages.

\* cited by examiner

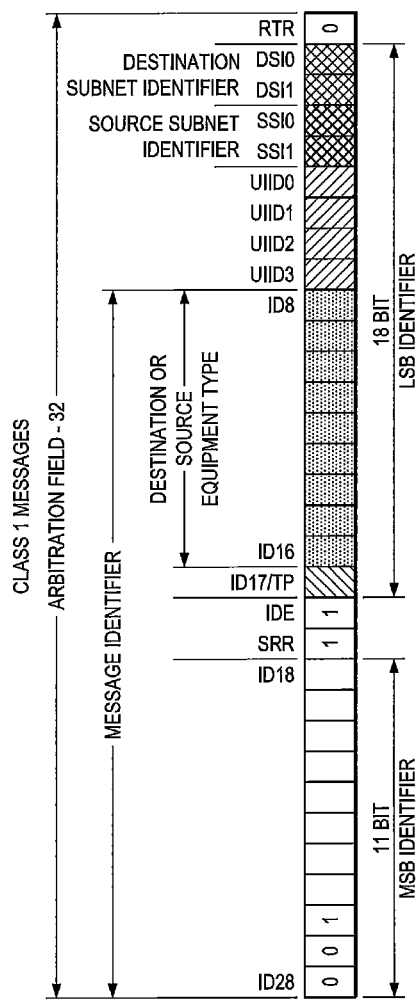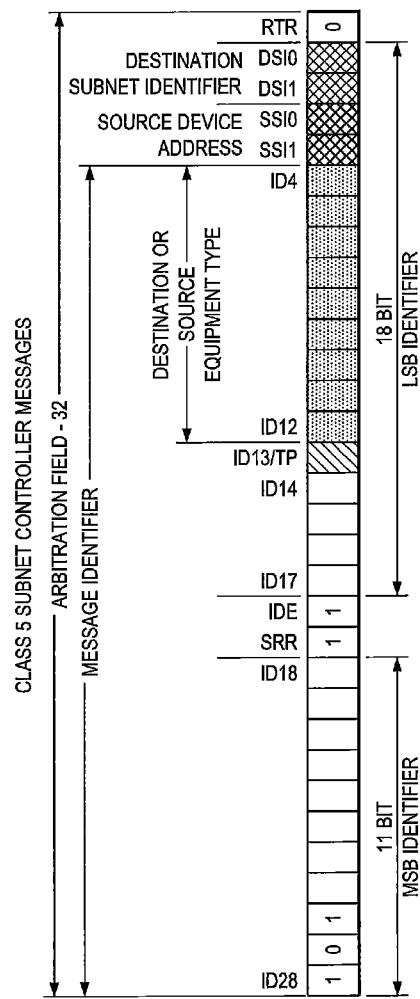

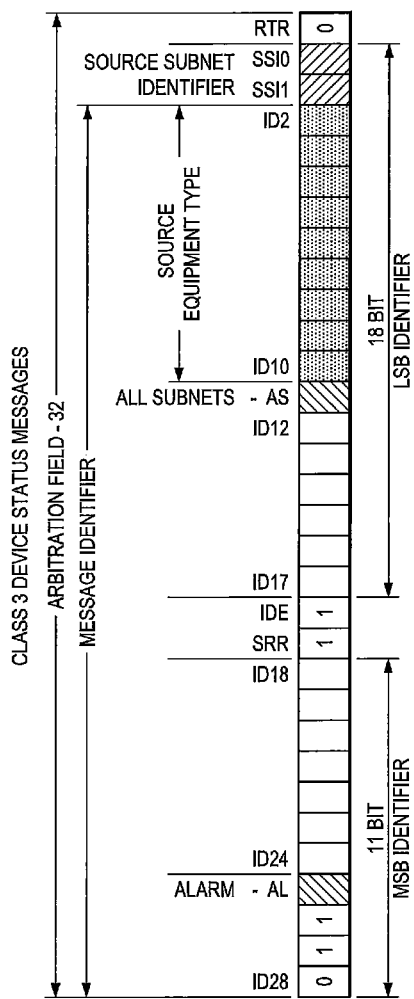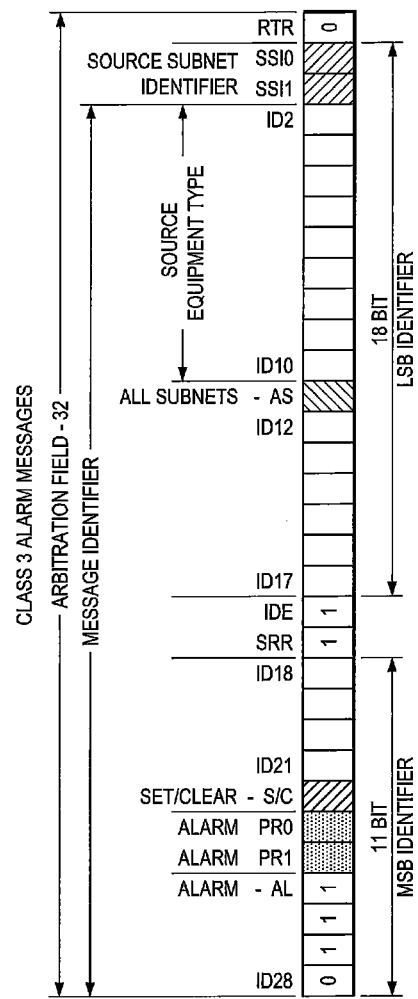

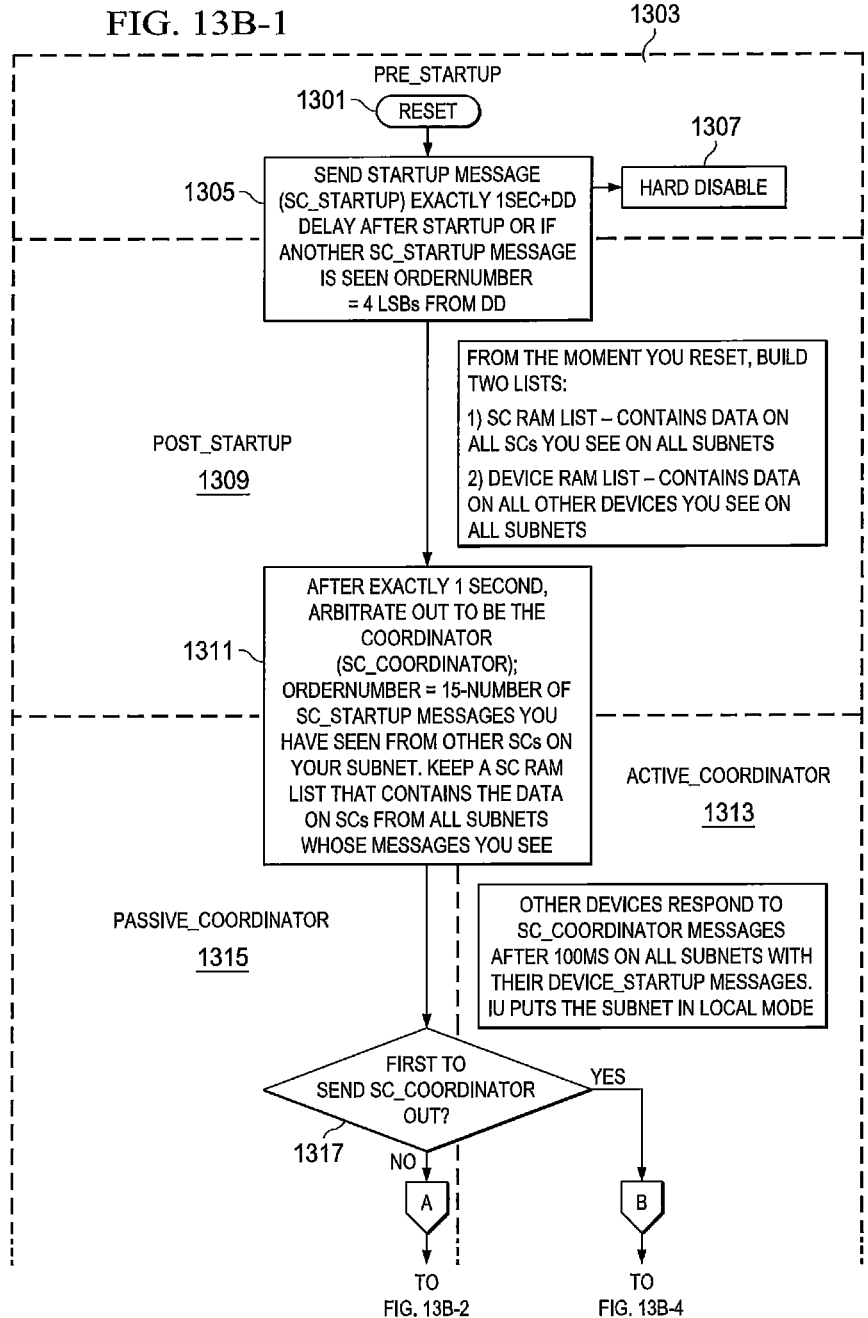

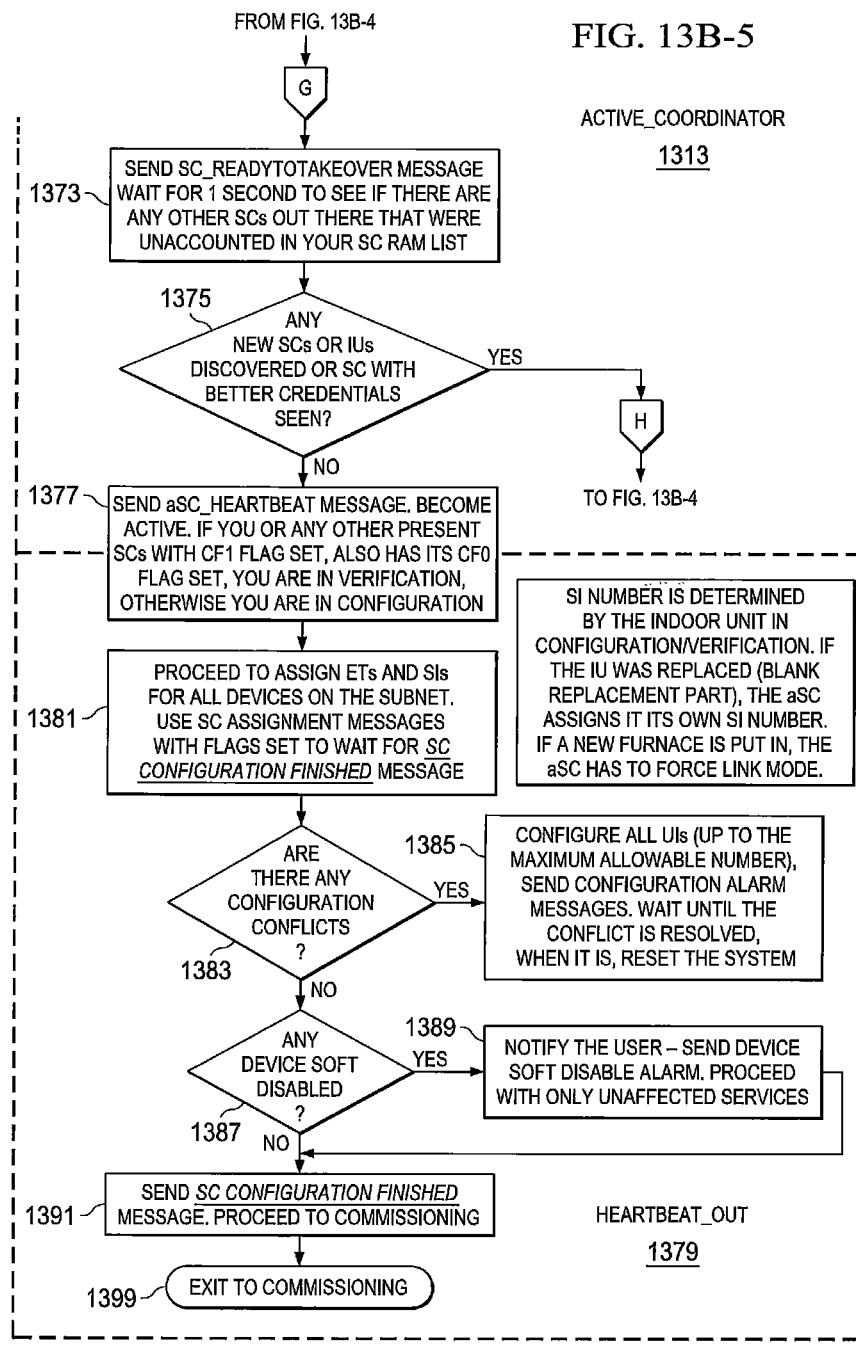

FIG. 13C-1b

FROM FIG. 13C-1a

EXPECTED MESSAGE ☐
UNEXPECTED MESSAGE ▨

| SC STATE | POSSIBLE MESSAGES | MESSAGE RECEIVED / RESPONSE/RESULTING ACTION |
|---|---|---|
| COORDINATOR: AFTER RECEIPT OF EITHER SC COORDINATOR MESSAGE OR SC TOKEN PASS MESSAGES ACTIVE_COORDINATOR | 1 | IF NEW, ADD TO SC RAM LIST AND RESPOND WITH SC_COORDINATOR MESSAGE IMMEDIATELY. IF DUPLICATE, IGNORE THE MESSAGE |
| | 2 | IF NEW, ADD TO DEVICE RAM LIST, IF IU RESET ALL CF1 VALID? FLAGS IN YOUR SC RAM LIST - NEED TO QUERY ALL SCs AGAIN. CF1 VALID? FLAG IS SET WHEN THE SC_DECLARATION MESSAGE IS RECEIVED FROM THE SC IN QUESTION |
| | 3 | IF NEW, ADD TO DEVICE RAM LIST, IF IU RESET ALL CF1 VALID? FLAGS IN YOUR SC RAM LIST - NEED TO QUERY ALL SCs AGAIN. CF1 VALID? FLAG IS SET WHEN THE SC_DECLARATION MESSAGE IS RECEIVED FROM THE SC IN QUESTION. WHEN ONLY DEVICE DD MESSAGES ARE RECEIVED, IT MEANS YOU RESET YOURSELF. INCREMENT YOUR SELF-RESET COUNTER |
| | 4 | IF YOUR CREDENTIALS ARE HIGHER THAN THE CREDENTIALS SEEN IN THE MESSAGE, RESPOND WITH YOUR SC_COORDINATOR MESSAGE, IF NOT, GO TO PASSIVE_COORDINATOR |
| | 5 | UPDATE YOUR SC RAM LIST TO CONTAIN THE CF1 FLAG. SET CF1 VALID? FLAG FOR THIS SC |
| NON-COORDINATOR: AFTER RECEIPT OF SC COORDINATOR MESSAGE PASSIVE_COORDINATOR STAY IN THIS STATE UNTIL CONFIGURED, OR BECOME ACTIVE, OR FOR 5 MINUTES, AFTER WHICH YOU RESET | 1 | IF NEW, ADD TO SC RAM LIST, IF DUPLICATE, IGNORE THE MESSAGE |
| | 2 | IF NEW, ADD TO DEVICE RAM LIST, IF IU RESET ALL CF1 VALID? FLAGS IN YOUR SC RAM LIST |
| | 3 | IF NEW, ADD TO DEVICE RAM LIST, IF IU RESET ALL CF1 VALID? FLAGS IN YOUR SC RAM LIST. WHEN ONLY DEVICE DD MESSAGES ARE RECEIVED, IT MEANS YOU RESET YOURSELF. INCREMENT YOUR SELF-RESET COUNTER |
| | 4 | IGNORE THE MESSAGE |
| | 5 | UPDATE YOUR SC RAM LIST TO CONTAIN THE CF1 FLAG. SET CF1 VALID? FLAG FOR THIS SC |

TO FIG. 13C-1c

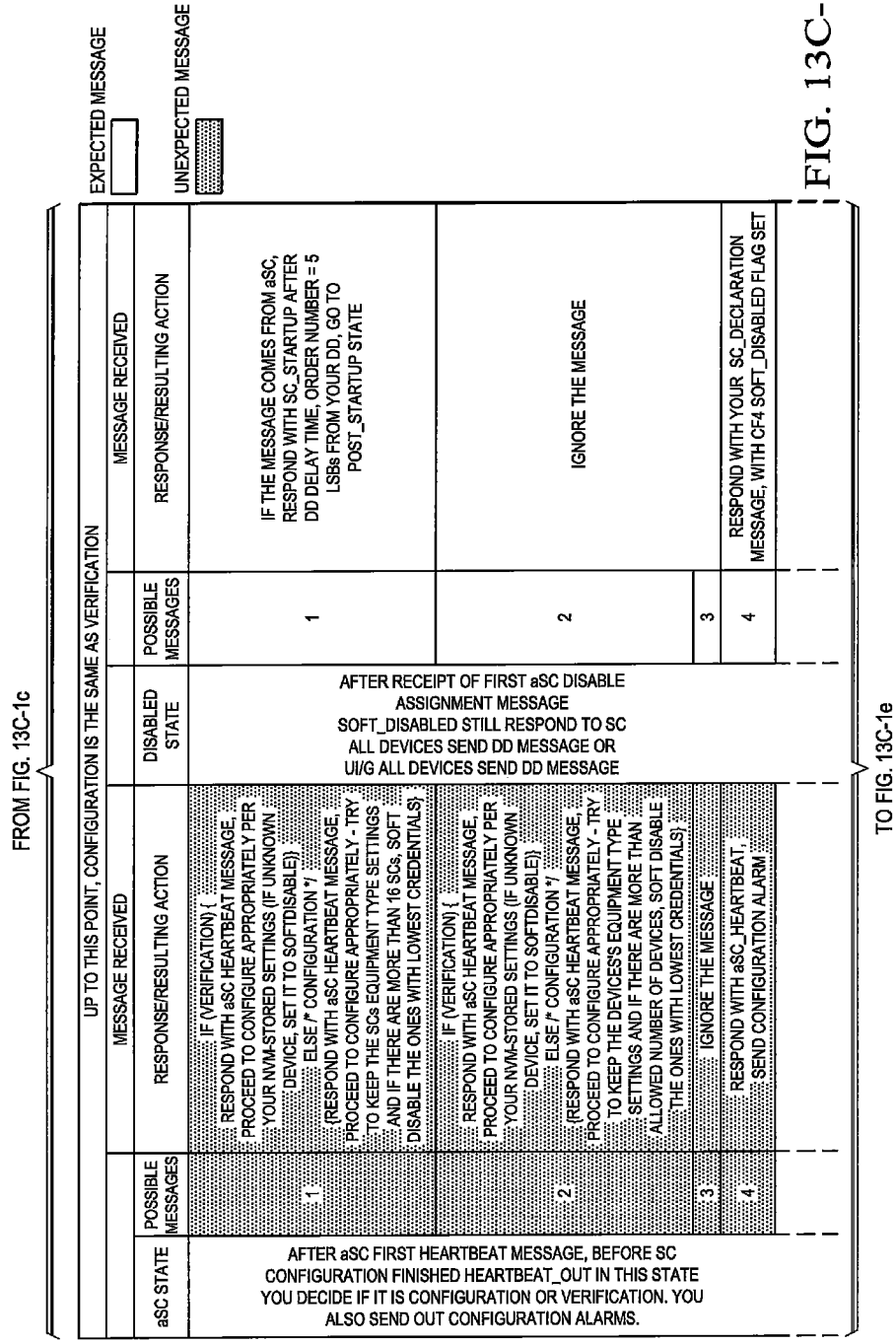

FROM FIG. 13C-1e

| iSC STATE | POSSIBLE MESSAGES | MESSAGE RECEIVED RESPONSE / RESULTING ACTION |
|---|---|---|
| AFTER RECEIPT OF FIRST aSC INACTIVE ASSIGNMENT MESSAGE INACTIVE | 1 | IF THE MESSAGE COMES FROM aSC, RESPOND WITH SC_STARTUP AFTER DD DELAY TIME, ORDERNUMBER = 5 LSBs FROM YOUR DD, GO TO POST_STARTUP STATE |
| | 2 | MONITOR ALL SUBNET ACTIVITY AND ACT JUST LIKE aSC, WITHOUT SENDING ANY MESSAGES OUT |
| | 3 | |
| | 4 | RESPOND WITH YOUR SC_DECLARATION MESSAGE |
| | 5 | |
| | 6 | MONITOR ALL SUBNET ACTIVITY AND ACT JUST LIKE aSC, WITHOUT SENDING ANY MESSAGES OUT |
| | 7 | |
| | 8 | |
| | 9 | YOU WERE JUST REASSIGNED OR DISABLED, RESPOND WITH AN ACK AND PROCEED AS DIRECTED |
| | 10 | UPDATE YOUR TIME KEEPING TO BE ABLE TO TAKE OVER WHEN aSC GOES MISSING |
| | 11 | PROCEED AS DIRECTED (SEE THE MESSAGE FLAGS TO DETERMINE WHAT STATE TO GO TO) |

EXPECTED MESSAGE

UNEXPECTED MESSAGE

FIG. 13C-1f

| POSSIBLE MESSAGES THAT INFLUENCE STATE MACHINE: | |
|---|---|
| 1 = SC STARTUP MESSAGE | SC_STARTUP |
| 2 = DEVICE STARTUP MESSAGE (!=SC) | DEVICE_STARTUP |
| 3 = DEVICE DEVICE DESIGNATOR MESSAGE | DEVICE_DD |
| 4 = SC COORDINATOR MESSAGE | SC_COORDINATOR |
| 5 = SC DECLARATION MESSAGE | SC_DECLARATION |
| 6 = SC DECLARATION QUERY MESSAGE | SC_QUERY |
| 7 = SC TOKEN PASS MESSAGE | SC_TOKENPASS |
| 8 = SC READY TO TAKE OVER MESSAGE | SC_READYTOTAKEOVER |
| 9 = aSC DEVICE ASSIGNMENT | SC_ASSIGNMENT |
| 10 = ACTIVE SUBNET CONTROLLER HEARTBEAT MESSAGE | aSC_HEARTBEAT |
| 11 = aSC CONFIGURATION FINISHED MESSAGE | SC_CONFIGURATIONFINISHED |

FIG. 13C-2

PRIORITY ORDER (HIGH TO LOW):

| |
|---|
| aSC HEARTBEAT MESSAGE (CLASS 3 AS) |
| SC STARTUP MESSAGE (CLASS 3 AS) |
| SC COORDINATOR MESSAGE (CLASS 3 AS) |
| DEVICE STARTUP (CLASS 5) |
| DEVICE DEVICE DESIGNATOR (CLASS 5) |
| SC DECLARATION MESSAGE (CLASS 5) |
| SC DECLARATION QUERY MESSAGE (CLASS 5) |
| SC TOKEN PASS MESSAGE (CLASS 5) |
| SC READY TO TAKE OVER MESSAGE (CLASS 5 AS) |
| DEVICE ASSIGNMENT ACK (CLASS 5) |
| aSC DEVICE ASSIGNMENT MESSAGE (CLASS 5) |
| aSC CONFIGURATION FINISHED MESSAGE (CLASS 5) |

FIG. 13C-3

| STATE TRANSITION: | WHEN MESSAGE SENT | WHEN MESSAGE RECEIVED |
|---|---|---|
| PRE_STARTUP -> POST_STARTUP | SC_STARTUP | |
| POST_STARTUP -> ACTIVE_COORDINATOR | SC_COORDINATOR | |
| POST_STARTUP -> PASSIVE_COORDINATOR | | SC_COORDINATOR |
| PASSIVE_COORDINATOR -> ACTIVE_COORDINATOR | | SC_TOKENPASS |
| ACTIVE_COORDINATOR -> PASSIVE_COORDINATOR | | SC_COORDINATOR WITH HIGHER CREDENTIALS |
| PASSIVE_COORDINATOR -> INACTIVE | | SC_ASSIGNMENT |
| PASSIVE_COORDINATOR -> SOFT_DISABLED | | SC_ASSIGNMENT WITH DISABLED BIT SET |
| ACTIVE_COORDINATOR -> HEARTBEAT_OUT | ASC_HEARTBEAT | |

FIG. 13C-4

| SCs SC LIST STRUCTURE: | STORAGE REQUIREMENT: |
|---|---|
| CF1 VALID? | 1 BIT |
| CF1 FLAG | 1 BIT |
| CF0 FLAG | 1 BIT |
| SUBNET PRIORITY LEVEL | 4 BITS |
| FEATURE LEVEL | 8 BITS |
| PROTOCOL LEVEL | 12 BITS |
| DEVICE DESIGNATOR | 32 BITS |
| SUBNET ID | 2 BITS |
| TOTAL MEMORY REQUIREMENT: | 8 BYTES PER SC |

FIG. 13C-5

COMMUNICATION PROTOCOL SYSTEM AND METHOD FOR A DISTRIBUTED-ARCHITECTURE HEATING, VENTILATION AND AIR CONDITIONING NETWORK

CROSS-REFERENCE TO RELATED APPLICATIONS

This application claims the benefit of U.S. Provisional Application Ser. No. 61/167,135, filed by Grohman, et al., on Apr. 6, 2009, entitled "Comprehensive HVAC Control System", and is a continuation-in-part application of application Ser. No. 12/258,659, filed by Grohman on Oct. 27, 2008, entitled "Apparatus and Method for Controlling an Environmental Conditioning Unit," both of which are commonly assigned with this application and incorporated herein by reference. This application is also related to the following U.S. patent applications, which are filed on even date herewith, commonly assigned with this application and incorporated herein by reference:

| Serial No. | Inventors | Title |
| --- | --- | --- |
| 12/603,464 | Grohman, et al. | "Alarm and Diagnostics System and Method for a Distributed-Architecture Heating, Ventilation and Air Conditioning Network" |
| 12/603,534 | Wallaert, et al. | "Flush Wall Mount Control Unit and In-Set Mounting Plate for a Heating, Ventilation and Air Conditioning System" |
| 12/603,449 | Thorson, et al. | "System and Method of Use for a User Interface Dashboard of a Heating, Ventilation and Air Conditioning Network" |
| 12/603,382 | Grohman | "Device Abstraction System and Method for a Distributed-Architecture Heating, Ventilation and Air Conditioning Network" |
| 12/603,526 | Grohman, et al. | "Communication Protocol System and Method for a Distributed-Architecture Heating, Ventilation and Air Conditioning Network" |
| 12/603,527 | Hadzidedic | "Memory Recovery Scheme and Data Structure in a Heating, Ventilation and Air Conditioning Network" |
| 12/603,490 | Grohman | "System Recovery in a Heating, Ventilation and Air Conditioning Network" |
| 12/603,473 | Grohman, et al. | "System and Method for Zoning a Distributed-Architecture Heating, Ventilation and Air Conditioning Network" |
| 12/603,525 | Grohman, et al. | "Method of Controlling Equipment in a Heating, Ventilation and Air Conditioning Network" |
| 12/603,512 | Grohman, et al. | "Programming and Configuration in a Heating, Ventilation and Air Conditioning Network" |
| 12/603,431 | Mirza, et al. | "General Control Techniques in a Heating, Ventilation and Air Conditioning Network" |

TECHNICAL FIELD

This application is directed, in general, to HVAC networks and, more specifically, to systems and methods for logical manipulation of system features.

BACKGROUND

Climate control systems, also referred to as HVAC systems (the two terms will be used herein interchangeably), are employed to regulate the temperature, humidity and air quality of premises, such as a residence, office, store, warehouse, vehicle, trailer, or commercial or entertainment venue. The most basic climate control systems either move air (typically by means of an air handler having a fan or blower), heat air (typically by means of a furnace) or cool air (typically by means of a compressor-driven refrigerant loop). A thermostat is typically included in a conventional climate control system to provide some level of automatic temperature and humidity control. In its simplest form, a thermostat turns the climate control system on or off as a function of a detected temperature. In a more complex form, the thermostat may take other factors, such as humidity or time, into consideration. Still, however, the operation of a thermostat remains turning the climate control system on or off in an attempt to maintain the temperature of the premises as close as possible to a desired set point temperature. Climate control systems as described above have been in wide use since the middle of the twentieth century and have, to date, generally provided adequate temperature management.

SUMMARY

One aspect provides an HVAC data processing and communication network. In an embodiment, the network includes a system device and a subnet controller. The system device is adapted to provide a service and publish a message including a device status vector representing an availability of the system device to provide the service. The subnet controller is adapted to receive the message from the system device including the device status vector via a data bus.

Another aspect is a method of manufacturing a HVAC data processing and communication network. In an embodiment, the method includes configuring a system device and a subnet controller. The system device is configured to provide a service and publish a message including a device status vector representing an availability of the system device to provide the service. The subnet controller is configured to receive the message from the system device including the device status vector via a data bus.

Yet another aspect is a system device for use in an HVAC data processing and communication network. In an embodiment, the system device includes a physical layer interface, a demand unit and a local controller. The physical layer interface is adapted to couple the system device to a data bus. The demand unit is configured to provide an HVAC service. The local controller adapted to publish a message including a device status vector representing an availability of the demand unit to provide the HVAC service.

BRIEF DESCRIPTION

Reference is now made to the following descriptions taken in conjunction with the accompanying drawings, in which:

FIG. 9 illustrates an embodiment of a Class 1 message format of the disclosure;

FIG. 10A illustrates an embodiment of a Class 3 device status message format of the disclosure;

FIG. 10B illustrates an embodiment of a Class 3 alarm message format of the disclosure;

FIG. 11 illustrates an embodiment of a Class 5 subnet controller message format of the disclosure;

DETAILED DESCRIPTION

As stated above, conventional climate control systems have been in wide use since the middle of the twentieth century and have, to date, generally provided adequate temperature management. However, it has been realized that more sophisticated control and data acquisition and processing techniques may be developed and employed to improve the installation, operation and maintenance of climate control systems.

Described herein are various embodiments of an improved climate control, or HVAC, system in which at least multiple components thereof communicate with one another via a data bus. The communication allows identity, capability, status and operational data to be shared among the components. In some embodiments, the communication also allows commands to be given. As a result, the climate control system may be more flexible in terms of the number of different premises in which it may be installed, may be easier for an installer to install and configure, may be easier for a user to operate, may provide superior temperature and/or relative humidity (RH) control, may be more energy efficient, may be easier to diagnose, may require fewer, simpler repairs and may have a longer service life.

Figure 1:
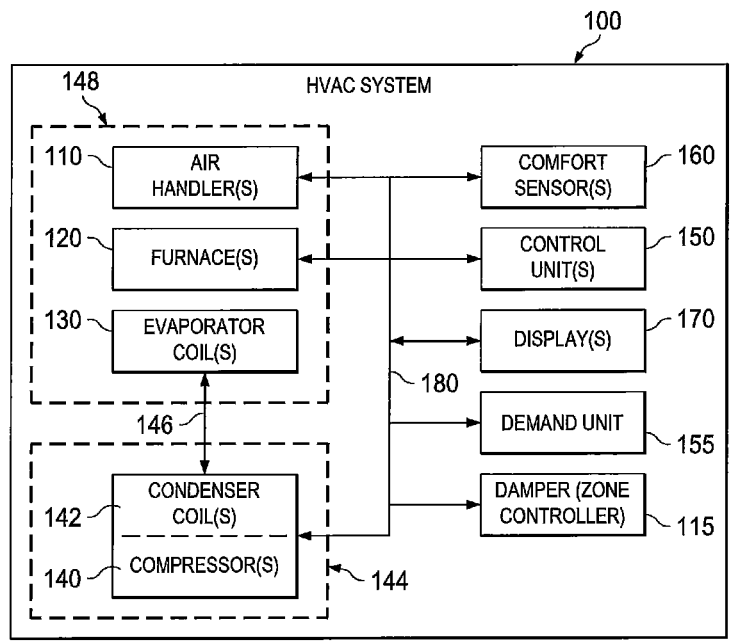
FIG. 1 is a high-level block diagram of an HVAC system according to various embodiments of the disclosure.

FIG. 1 is a high-level block diagram of a networked HVAC system, generally designated 100. The HVAC system 100 may be referred to herein simply as "system 100" for brevity. In one embodiment, the system 100 is configured to provide ventilation and therefore includes one or more air handlers 110. In an alternative embodiment, the ventilation includes one or more dampers 115 to control air flow through air ducts (not shown.) Such control may be used in various embodiments in which the system 100 is a zoned system. In an alternative embodiment, the system 100 is configured to provide heating and therefore includes one or more furnaces 120, typically associated with the one or more air handlers 110. In an alternative embodiment, the system 100 is configured to provide cooling and therefore includes one or more refrigerant evaporator coils 130, typically associated with the one or more air handlers 110. Such embodiment of the system 100 also includes one or more compressors 140 and associated condenser coils 142, which are typically associated with one or more so-called "outdoor units" 144. The one or more compressors 140 and associated condenser coils 142 are typically connected to an associated evaporator coil 130 by a refrigerant line 146. In an alternative embodiment, the system 100 is configured to provide ventilation, heating and cooling, in which case the one or more air handlers 110, furnaces 120 and evaporator coils 130 are associated with one or more "indoor units" 148, e.g., basement or attic units that may also include an air handler.

For convenience in the following discussion, a demand unit 155 is representative of the various units exemplified by the air handler 110, furnace 120, and compressor 140, and more generally includes an HVAC component that provides a service in response to control by the control unit 150. The service may be, e.g., heating, cooling, humidification, dehumidification, or air circulation. A demand unit 155 may provide more than one service, and if so, one service may be a primary service, and another service may be an ancillary service. For example, for a heating unit that also circulates air, the primary service may be heating, and the ancillary service may be air circulation (e.g. by a blower).

The demand unit 155 may have a maximum service capacity associated therewith. For example, the furnace 120 may have a maximum heat output (often expressed in terms of British Thermal Units (BTU) or Joules), or a blower may have a maximum airflow capacity (often expressed in terms of cubic feet per minute (CFM) or cubic meters per minute (CMM)). In some cases, the demand unit 155 may be configured to provide a primary or ancillary service in staged portions. For example, blower may have two or more motor speeds, with a CFM value associated with each motor speed.

One or more control units 150 control one or more of the one or more air handlers 110, the one or more furnaces 120 and/or the one or more compressors 140 to regulate the temperature of the premises, at least approximately. In various embodiments to be described, the one or more displays 170 provide additional functions such as operational, diagnostic and status message display and an attractive, visual interface that allows an installer, user or repairman to perform actions with respect to the system 100 more intuitively. Herein, the term "operator" will be used to refer collectively to any of the installer, the user and the repairman unless clarity is served by greater specificity.

One or more separate comfort sensors 160 may be associated with the one or more control units 150 and may also optionally be associated with one or more displays 170. The one or more comfort sensors 160 provide environmental data, e.g. temperature and/or humidity, to the one or more control units 150. An individual comfort sensor 160 may be physically located within a same enclosure or housing as the control unit 150, in a manner analogous with a conventional HVAC thermostat. In such cases, the commonly housed comfort sensor 160 may be addressed independently. However, the one or more comfort sensors 160 may be located separately and physically remote from the one or more control units 150. Also, an individual control unit 150 may be physically located within a same enclosure or housing as a display 170, again analogously with a conventional HVAC thermostat. In such embodiments, the commonly housed control unit 150 and display 170 may each be addressed independently. However, one or more of the displays 170 may be located within the system 100 separately from and/or physically remote to the control units 150. The one or more displays 170 may include a screen such as a liquid crystal or OLED display (not shown).

Although not shown in FIG. 1, the HVAC system 100 may include one or more heat pumps in lieu of or in addition to the one or more furnaces 120, and one or more compressors 140. One or more humidifiers or dehumidifiers may be employed to increase or decrease humidity. One or more dampers may be used to modulate air flow through ducts (not shown). Air cleaners and lights may be used to reduce air pollution. Air quality sensors may be used to determine overall air quality.

Finally, a data bus 180, which in the illustrated embodiment is a serial bus, couples the one or more air handlers 110, the one or more furnaces 120, the one or more evaporator condenser coils 142 and compressors 140, the one or more control units 150, the one or more remote comfort sensors 160 and the one or more displays 170 such that data may be communicated therebetween or thereamong. As will be understood, the data bus 180 may be advantageously employed to convey one or more alarm messages or one or more diagnostic messages. All or some parts of the data bus 180 may be implemented as a wired or wireless network.

The data bus 180 in some embodiments is implemented using the Bosch CAN (Controller Area Network) specification, revision 2, and may be synonymously referred to herein as a residential serial bus (RSBus) 180. The data bus 180 provides communication between or among the aforementioned elements of the network 200. It should be understood that the use of the term "residential" is nonlimiting; the network 200 may be employed in any premises whatsoever, fixed or mobile. Other embodiments of the data bus 180 are also contemplated, including e.g., a wireless bus, as mentioned previously, and 2-, 3- or 4-wire networks, including IEEE-1394 (Firewire™, i.LINK™, Lynx™), Ethernet, Universal Serial Bus (e.g., USB 1.x, 2.x, 3.x), or similar standards. In wireless embodiments, the data bus 180 may be implemented, e.g., using Bluetooth™, Zibgee or a similar wireless standard.

Figure 2:
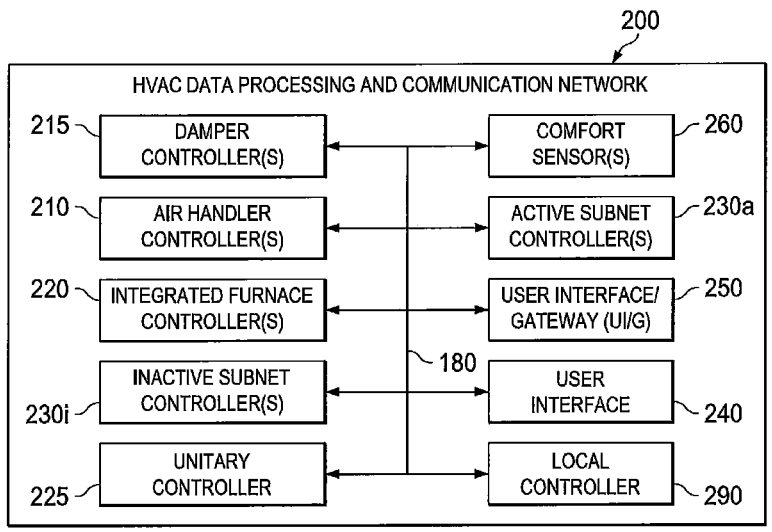
FIG. 2 is an embodiment of the disclosure of a network layer associated with the HVAC system.

FIG. 2 is a high-level block diagram of one embodiment of an HVAC data processing and communication network 200 that may be employed in the HVAC system 100 of FIG. 1. One or more air handler controllers (AHCs) 210 may be associated with the one or more air handlers 110 of FIG. 1. One or more integrated furnace controllers (IFCs) 220 may be associated with the one or more furnaces 120. One or more damper controller modules 215, also referred to herein as a zone controller module 215, may be associated with the one or more dampers 115. One or more unitary controllers 225 may be associated with one or more evaporator coils 130 and one or more condenser coils 142 and compressors 140 of FIG. 1. The network 200 includes an active subnet controller (aSC) 230a and an inactive subnet controller (iSC) 230i. The aSC 230a may act as a network controller of the system 100. The aSC 230a is responsible for configuring and monitoring the system 100 and for implementation of heating, cooling, humidification, dehumidification, air quality, ventilation or any other functional algorithms therein. Two or more aSCs 230a may also be employed to divide the network 200 into subnetworks, or subnets, simplifying network configuration, communication and control. Each subnet typically contains one indoor unit, one outdoor unit, a number of different accessories including humidifier, dehumidifier, electronic air cleaner, filter, etc., and a number of comfort sensors, subnet controllers and user interfaces. The iSC 230i is a subnet controller that does not actively control the network 200. In some embodiments, the iSC 230i listens to all messages broadcast over the data bus 180, and updates its internal memory to match that of the aSC 230a. In this manner, the iSC 230i may backup parameters stored by the aSC 230a, and may be used as an active subnet controller if the aSC 230a malfunctions. Typically there is only one aSC 230a in a subnet, but there may be multiple iSCs therein, or no iSC at all. Herein, where the distinction between an active or a passive SC is not germane the subnet controller is referred to generally as an SC 230.

A user interface (UI) 240 provides a means by which an operator may communicate with the remainder of the network 200. In an alternative embodiment, a user interface/gateway (UI/G) 250 provides a means by which a remote operator or remote equipment may communicate with the remainder of the network 200. Such a remote operator or equipment is referred to generally as a remote entity. A comfort sensor interface 260, referred to herein interchangeably as a comfort sensor (CS) 260, may provide an interface between the data bus 180 and each of the one or more comfort sensors 160. The comfort sensor 260 may provide the aSC 230a with current information about environmental conditions inside of the conditioned space, such as temperature, humidity and air quality.

For ease of description, any of the networked components of the HVAC system 100, e.g., the air handler 110, the damper 115, the furnace 120, the outdoor unit 144, the control unit 150, the comfort sensor 160, the display 170, may be described in the following discussion as having a local controller 290. The local controller 290 may be configured to provide a physical interface to the data bus 180 and to provide various functionality related to network communication. The SC 230 may be regarded as a special case of the local controller 290, in which the SC 230 has additional functionality enabling it to control operation of the various networked components, to manage aspects of communication among the networked components, or to arbitrate conflicting requests for network services among these components. While the local controller 290 is illustrated as a stand-alone networked entity in FIG. 2, it is typically physically associated with one of the networked components illustrated in FIG. 1.

Figure 3:
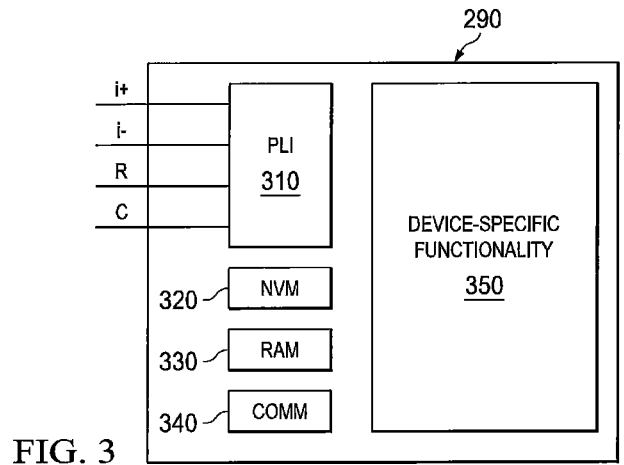
FIG. 3 is a block diagram of a local controller of the disclosure.

FIG. 3 illustrates a high-level block diagram of the local controller 290. The local controller 290 includes a physical layer interface (PLI) 310, a non-volatile memory (NVM) 320, a RAM 330, a communication module 340 and a functional block 350 that may be specific to the demand unit 155, e.g., with which the local controller 290 is associated. The PLI 310 provides an interface between a data network, e.g., the data bus 180, and the remaining components of the local controller 290. The communication module 340 is configured to broadcast and receive messages over the data network via the PLI 310. The functional block 350 may include one or more of various components, including without limitation a microprocessor, a state machine, volatile and nonvolatile memory, a power transistor, a monochrome or color display, a touch panel, a button, a keypad and a backup battery. The local controller 290 may be associated with a demand unit 155, and may provide control thereof via the functional block 350, e.g. The NVM 320 provides local persistent storage of certain data, such as various configuration parameters, as described further below. The RAM 330 may provide local storage of values that do not need to be retained when the local controller 290 is disconnected from power, such as results from calculations performed by control algorithms. Use of the RAM 330 advantageously reduces use of the NVM cells that may degrade with write cycles.

In some embodiments, the data bus 180 is implemented over a 4-wire cable, in which the individual conductors are assigned as follows:

R—the "hot"—a voltage source, 24 VAC, e.g.
C—the "common"—a return to the voltage source.
i+—RSBus High connection.
i−—RSBus Low connection.

The disclosure recognizes that various innovative system management solutions are needed to implement a flexible, distributed-architecture HVAC system, such as the system 100. More specifically, cooperative operation of devices in the system 100, such as the air handler 110, outdoor unit 144, or UI 240 is improved by various embodiments presented herein. More specifically still, embodiments are presented of communications protocols among networked HVAC devices that provide a robust means of communicating within an installation site, and simplified configuration of the system relative to conventional systems.

Figure 4:
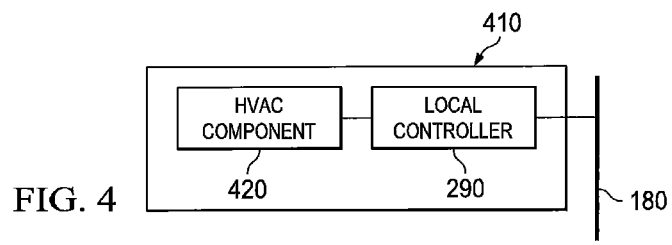
FIG. 4 is a block diagram of a system device of the disclosure.

FIG. 4 illustrates a device 410 according to the disclosure. The following description pertains to the HVAC data processing and communication network 200 that is made up of a number of system devices 410 operating cooperatively to provide HVAC functions. Herein after the system device 410 is referred to more briefly as the device 410 without any loss of generality. The term "device" applies to any component of the system 100 that is configured to communicate with other components of the system 100 over a wired or wireless network. Thus, the device 410 may be, e.g., the air handler 110 in combination with its AHC 210, or the furnace 120 in combination with its IFC 220. This discussion may refer to a generic device 410 or to a device 410 with a specific recited function as appropriate. An appropriate signaling protocol may be used to govern communication of one device with another device. While the function of various devices 410 in the network 200 may differ, each device 410 shares a common architecture for interfacing with other devices, e.g. the local controller 290 appropriately configured for the HVAC component 420 with which the local controller 290 is associated. The microprocessor or state machine in the functional block 350 may operate to perform any task for which the device 410 is responsible, including, without limitation, sending and responding to messages via the data bus 180, controlling a motor or actuator, or performing calculations. A system status display 430 is described below.

In various embodiments, signaling between devices 410 relies on messages. Messages are data strings that convey information from one device 410 to another device 410. The purpose of various substrings or bits in the messages may vary depending on the context of the message. Generally, specifics regarding message protocols are beyond the scope of the present description. However, aspects of messages and messaging are described when needed to provide context for the various embodiments described herein.

Figure 5:
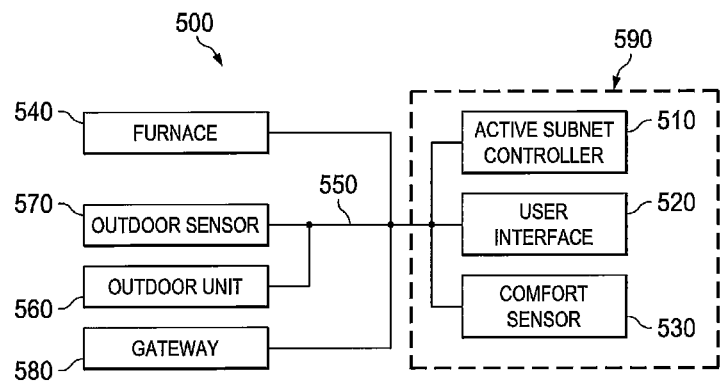
FIG. 5 illustrates an example grouping of devices on an RSBus subnet.

FIG. 5 illustrates an embodiment of the disclosure of a network of the disclosure generally designated 500. The network 500 includes an aSC 510, a user interface 520, a comfort sensor 530 and a furnace 540 configured to communicate over a data bus 550. In some embodiments these devices form a minimum HVAC network. In addition, the network 500 is illustrated as including an outdoor unit 560, an outdoor sensor 570, and a gateway 580. The furnace 540 and outdoor unit 560 are provided by way of example only and not limited to any particular demand units. The aSC 510 is configured to control the furnace 540 and the outdoor unit 560 using, e.g., command messages sent via the data bus 550. The aSC 510 receives environmental data, e.g. temperature and/or humidity, from the comfort sensor 530, the furnace 540, the outdoor sensor 570 and the outdoor unit 560. The data may be transmitted over the data bus 550 by way of messages formatted for this purpose. The user interface 520 may include a display and input means to communicate information to, and accept input from, an operator of the network 500. The display and input means may be, e.g., a touch-sensitive display screen, though embodiments of the disclosure are not limited to any particular method of display and input.

The aSC 510, comfort sensor 530 and user interface 520 may optionally be physically located within a control unit 590. The control unit 590 provides a convenient terminal to the operator to effect operator control of the system 100. In this sense, the control unit is similar to the thermostat used in conventional HVAC systems. However, the control unit 590 may only include the user interface 520, with the aSC 510 and comfort sensor 530 remotely located from the control unit 590.

As described previously, the aSC 510 may control HVAC functionality, store configurations, and assign addresses during system auto configuration. The user interface 520 provides a communication interface to provide information to and receive commands from a user. The comfort sensor 530 may measure one or more environmental attributes that affect user comfort, e.g., ambient temperature, RH and pressure. The three logical devices 510, 520, 530 each send and receive messages over the data bus 550 to other devices attached thereto, and have their own addresses on the network 500. In many cases, this design feature facilitates future system expansion and allows for seamless addition of multiple sensors or user interfaces on the same subnet. The aSC 510 may be upgraded, e.g., via a firmware revision. The aSC 510 may also be configured to release control of the network 500 and effectively switch off should another SC present on the data bus 550 request it.

Configuring the control unit 590 as logical blocks advantageously provides flexibility in the configuration of the network 500. System control functions provided by a subnet controller may be placed in any desired device, in this example the control unit 590. The location of these functions therein need not affect other aspects of the network 500. This abstraction provides for seamless upgrades to the network 500 and ensures a high degree of backward compatibility of the system devices 410 present in the network. The approach provides for centralized control of the system, without sacrificing flexibility or incurring large system upgrade costs.

For example, the use of the logical aSC 510 provides a flexible means of including control units on a same network in a same conditioned space. The system, e.g., the system 100, may be easily expanded. The system retains backward compatibility, meaning the network 500 may be updated with a completely new type of equipment without the need to reconfigure the system, other than substituting a new control unit 590, e.g. Moreover, the functions provided by the subnet controller may be logically placed in any physical device, not just the control unit 590. Thus, the manufacturer has greater flexibility in selecting devices, e.g., control units or UIs, from various suppliers.

In various embodiments, each individual subnet, e.g., the network 500, is configured to be wired as a star network, with all connections to the local controller 290 tied at the furnace 120 or the air handler 110. Thus, each indoor unit, e.g., the furnace 120, may include three separate connectors configured to accept a connection to the data bus 180. Two connectors may be 4-pin connectors: one 4-pin connector may be dedicated for connecting to an outdoor unit, and one may be used to connect to equipment other than the outdoor unit. The third connector may be a 2-pin connector configured to connect the subnet of which the indoor unit is a member to other subnets via the i+/i− signals. As described previously, a 24 VAC transformer associated with the furnace 120 or air handler 110 may provide power to the system devices 410 within the local subnet via, e.g., the R and C lines. The C line may be locally grounded.

Figure 6A:
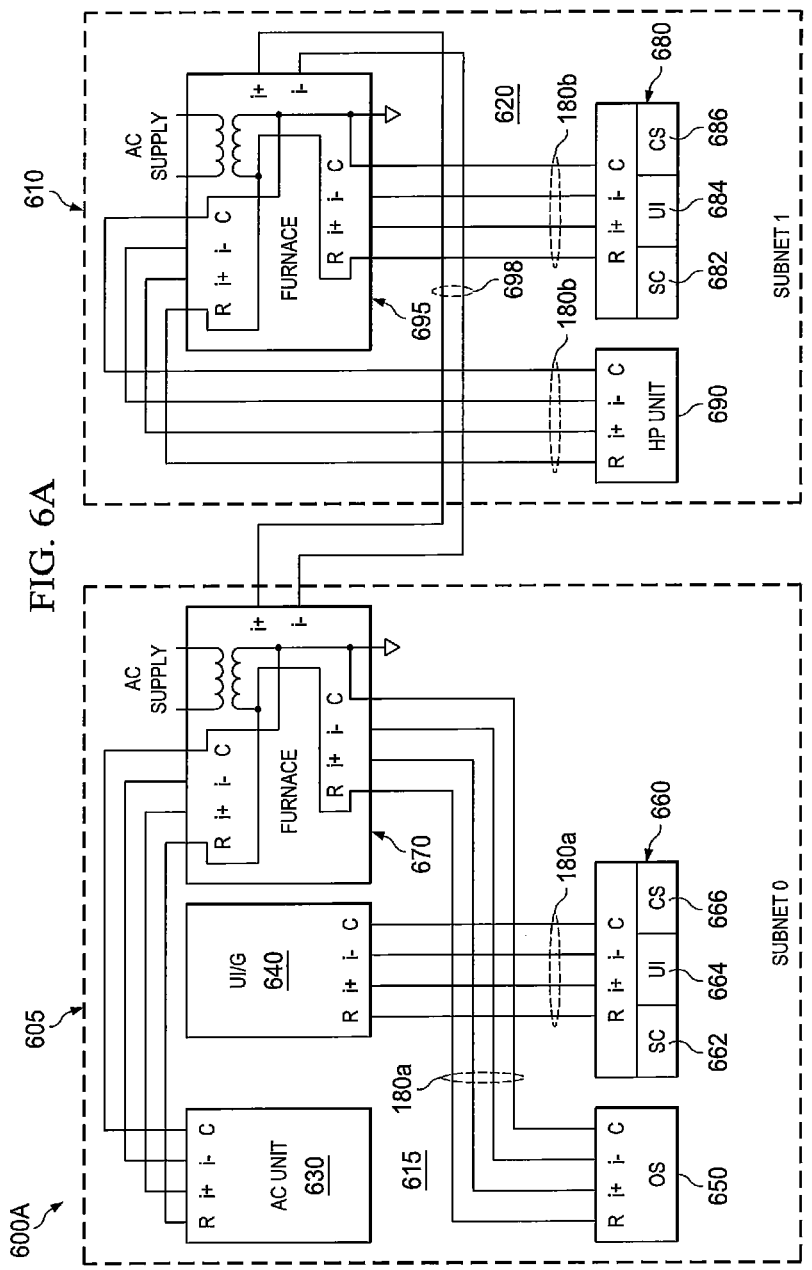
FIG. 6A is an embodiment of an HVAC data processing and communication network having two subnets.

FIG. 6A illustrates a detailed connection diagram of components of a network 600A according to one embodiment of the disclosure. The network 600A includes a zone 605 and a zone 610. The zones 605, 610 are illustrated without limitation as being configured as subnets 615, 620, respectively. The subnet 615 includes an air conditioning (AC) unit 630, a UI/G 640, an outdoor sensor (OS) 650, a control unit 660, and a furnace 670. The control unit 660 includes an SC 662, a UI 664 and a comfort sensor 666, each of which is independently addressable via a data bus 180a. The subnet 620 includes a control unit 680, a heat pump 690 and a furnace 695. The control unit 680 houses an SC 682, a UI 684 and a comfort sensor 686, each of which is independently addressable via a data bus 180b. In various embodiments and in the illustrated embodiment each individual subnet, e.g., the subnets 615, 620 are each configured to be wired as a star network, with connections to all devices therein made at a furnace or air handler associated with that subnet. Thus, e.g., each of the devices 630, 640, 650, 660 is connected to the data bus 180a at the furnace 670. Similarly, each device 680, 690 is connected to the subnet 620 at the furnace 695. Each furnace 670, 695, generally representative of the indoor unit 148, may include a connection block configured to accept a connection to the RSBus 180. For example, two terminals of the connection block may be 4-pin connectors. In one embodiment, one 4-pin connector is dedicated to connecting to an outdoor unit, for example the connection from the furnace 670 to the AC unit 630. Another 4-pin connector is used to connect to equipment other than the outdoor unit, e.g., from the furnace 670 to the UI/G 640, the OS 650, and the control unit 660. A third connector may be a 2-pin connector configured to connect one subnet to another subnet. In the network 600A, e.g., the subnet 615 is connected to the subnet 620 via a wire pair 698 that carries the i+/i− signals of the serial bus. As described previously with respect to the furnace 120, a transformer located at the furnace 670 may provide power to the various components of the subnet 615, and a transformer located at the furnace 695 may provide power to the various components of the subnet 620 via R and C lines. As illustrated, the C line may be locally grounded.

This approach differs from conventional practice, in which sometimes a master controller has the ability to see or send commands to multiple controllers in a single location, e.g., a house. Instead, in embodiments of which FIG. 6A is representative there is no master controller. Any controller (e.g. the SCs 662, 682) may communicate with any device, including other controllers, to make changes, read data, etc. Thus, e.g., a user located on a first floor of a residence zoned by floor may monitor and control the state of a zone conditioning a second floor of the residence without having to travel to the thermostat located on the second floor. This provides a significant convenience to the user, who may be a resident, installer or technician.

Figure 7:
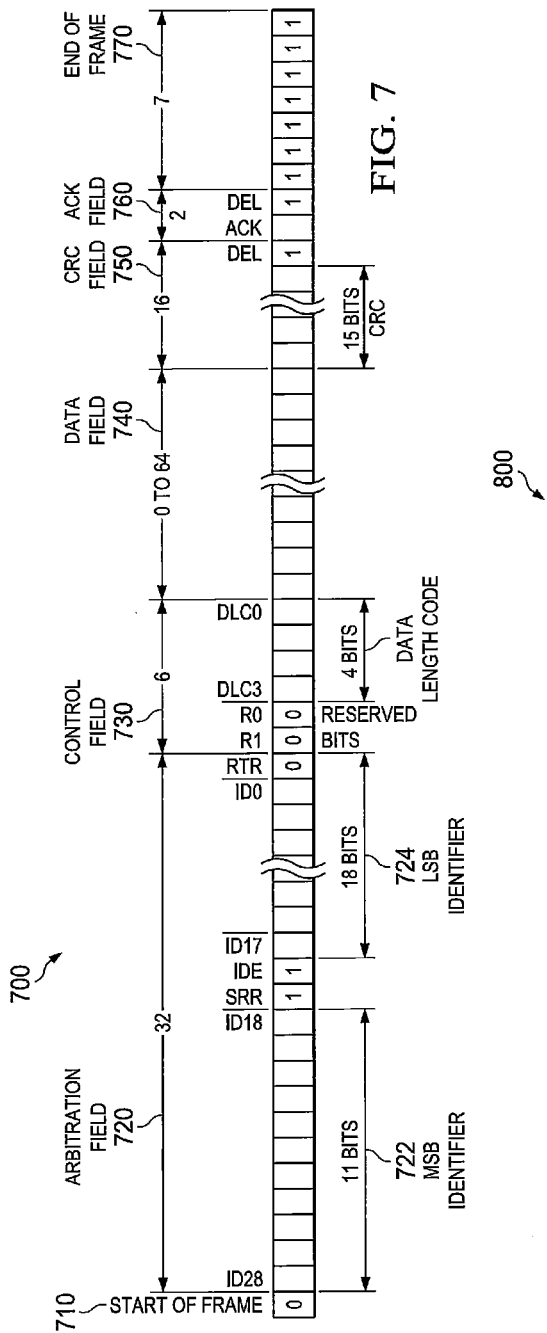
FIG. 7 illustrates field definitions of an example message frame of the disclosure.

FIG. 7 illustrates an example embodiment of a message frame generally designated 700. The message frame 700 is configurable to send messages between one local controller 290 and another local controller 290, e.g., between the UI 240 and the AHC 210. It is to be understood that the message frame 700 is but one of several possible schemes to communicate between local controllers 290. Those of skill in the pertinent arts will recognize that other equivalent schemes are within the scope of the disclosure.

Messages may be communicated in a manner compatible with a two-wire bus architecture. In some cases, a controller-area network is an appropriate communication standard. In an example embodiment, messages follow a format based on the Bosch CAN2.0B (hereinafter "CAN") standard. The following aspects of the CAN standard are described by way of example, with no implied limitation on messaging formats otherwise within the scope of the disclosure.

As will be appreciated by those skilled in the pertinent art, the bus in the CAN standard can have one of two complementary logical values: "dominant" or "recessive". During simultaneous transmission of dominant and recessive bits, the resulting bus value will be dominant. For example, in case of a wired-AND implementation of the bus, the dominant level would be represented by a logical 0 and the recessive level by a logical 1. In this context a dominant bit is a bit that "wins" when a dominant and a recessive bit are simultaneously asserted on the CAN bus.

As illustrated in FIG. 7, a single message frame may include a Start of Frame (SOF) bit 710, an Arbitration Field (AF) 720, a Control Field (CF) 730, a Data Field (DF) 740, a CRC Field 750, an ACK Field 760 and an End of Frame (EOF) Field 770.

Each message frame starts with a dominant SOF bit 710, e.g., a logical 0. At least some of the local controllers 290 on the network 200 that are ready to transmit messages synchronize to the SOF bit 710 generated by the local controller 290 that initializes the transmission. In some cases, the SC 230 performs the initialization. This aspect is discussed in greater detail below. It may be preferable in some cases that all of the local controllers 290 on the network 200 synchronize in this manner.

The AF 720 may include a number of bits as identifier (ID) bits. The illustrated embodiment includes two subfields. A first subfield 722 includes, e.g., 11 base ID bits, while a second subfield 724 includes, e.g., 18 extended ID bits. This configuration is an example of a CAN extended format. Those skilled in the pertinent art will appreciate that in other embodiments, a standard format message frame 700 may be used. An SRR bit and an IDE bit separate the first subfield 722 and the second subfield 724, and a RTR bit ends the AF 720. In some embodiments the SRR bit and IDE bit are always set to 1 and the RTR bit is always set to 0.

In the message frame 700 the CF 730 is illustrated as including, e.g., two reserved bits R0 and R1 and a 4-bit Data Length Code (DLC) Field. The reserve bits are always sent as recessive, but the receivers should accept them without any errors regardless if they are recessive or dominant. The DLC Field determines the number of bytes in the DF 740.

The DF 740 may range from 0 to 64 bits. The case of 0 bits, of course, represents the special case that no data is send by the message frame 700. In all but this special case, data may be segmented into multiples of 8 bits (bytes) with maximum of 8 bytes.

The CRC Field 750 contains a checksum calculated on the SOF bit 710, the AF 720, CF 730 and DF 740. The CRC field 750 is illustrated in this example embodiment of the CAN standard as being 15 bits wide. Of course other CRC widths may be used where appropriate for other communication standards. The computation of the CRC may be determined as per the CAN2.0 standard, e.g. The CRC field 750 is terminated in a suitable manner, e.g., by a Delimiter Bit that is always recessive.

The ACK field 760 is two bits long and contains an ACK SLOT (ACK) and an ACK delimiter (Del). A transmitting local controller 290, e.g., the SC 230, sends two recessive bits. A receiving local controller 290, e.g., the AHC 210, reports the correct receipt of a message to the transmitting local controller 290 by asserting a dominant bit during the ACK slot. Thus the transmitting local controller 290 can detect that another local controller 290 is present on the network to receive the message. However, the acknowledgement by the receiving local controller 290 does not confirm the validity of the message data.

The EOF field 770 is delimited by a flag sequence of seven consecutive recessive bits.

The CAN standard prohibits the occurrence of more than five consecutive bits of a same value in the SOF bit 710, the AF 720, the CF 730, the DF 740, and the CRC field 750. Whenever a transmitting local controller 290 detects five consecutive bits of identical value in the bit stream to be transmitted it automatically inserts a complementary bit in the actual transmitted bit stream.

The CAN standard defines five types of errors that are not mutually exclusive:

Bit Error—while sending any bits on the bus, the transmitting local controller 290 also monitors the bus. When the state of the bus is detected to be different from the intended state, a bit error normally occurs. Exceptions to this general case include when a recessive bit is sent in an AF 720 and a dominant bit is read back. This event signifies a case of lost arbitration rather than a bit error. The ACK field 760 is sent as a recessive bit. When at least one other active local controller 290 is present on the bus, in routine operation the local controller 290 sets the field to the dominant state. Note that a local controller 290 sending a Passive Error Flag and detecting a dominant bit does not interpret this as a Bit Error. A bit error may indicate in some circumstances a collision between a message the local controller 290 is attempting to publish to the data bus 180 and a message published to the data bus 180 by another local controller.

Bit Stuffing Error: this error occurs when a 6th consecutive equal bit level is detected in the message field comprising the SOF bit 710, the AF 720, the CF 730, the DF 740 and the CRC field 750.

CRC Error: each receiving local controller 290 calculates the CRC in the same manner as the transmitting local controller 290. The CRC error is generated when the calculated value is different from the value received on the RSBus bus 180.

Form Error: this error occurs when a fixed-form bit field (a delimiter, EOF Field or inter-frame space) contains one or more illegal bits. For the receiving local controller 290, a dominant bit received in the EOF bit should not be considered an error.

Acknowledgment Error: this error represents the condition that the transmitting local controller 290 determines that no receiving local controller 290 has asserted a dominant bit during the ACK transmission as described above.

Figure 8:
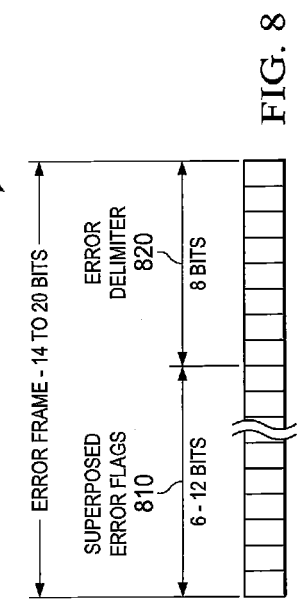
FIG. 8 illustrates an error frame of the disclosure.

FIG. 8 illustrates an embodiment of an error frame, generally designated 800. The RSBus 180 may provide active and passive error frames in conformity with the CAN standard. The error frame 800 includes an error flag field 810 and an error delimiter 820. The error flag field 810 may be superimposed. In an active error frame, the superposed flags are dominant, whereas in a passive error frame, the flags are recessive.

The majority of transmission errors may be addressed by retransmitting the message according to the CAN2.0 standard. More specifically, each error type listed above may be handled as follows:

Bit Error: An Error Frame may be generated which starts with the next bit-time.

Bit Stuffing Error: A node that detects a violation of bit stuffing (e.g., more than 5 bits of the same state) may generate an Error Frame, which causes the sending local controller 290 to resend the message.

CRC Error: CRC may be calculated by both the receiving local controller 290 and the sending local controller 290. The sending local controller 290 includes the CRC in the message. If the CRC of the receiving local controller 290 fails to match the CRC in the message then an error frame is generated. The sending local controller 290 may resend the message in response to the error frame.

Form Error: A sending local controller 290 that detects a dominant bit in the Delimiter, End of Frame (EOF) field or Inter-frame Space may generate an Active Error Frame. The sending local controller 290 may resend the message in response to the Active Error Frame.

Acknowledge Error: At least one receiving local controller 290 is expected to set the acknowledge bit to dominant after the message is sent by the transmitting local controller 290. If the acknowledge bit is not set to dominant, the sending local controller 290 may resend the message.

Under certain conditions, a local controller 290 may be placed in a fault confinement condition to limit the operation thereof. Each local controller 290 keeps a count of detected transmit and receive errors. Under some conditions, the local controller 290 may enter one of three error states: error active, error passive, and bus off.

A local controller 290 is normally in the error active state. In this state the local controller 290 can interrupt a current message in progress by signaling an error via an active error frame 800. The transmitting local controller 290 detects the active error frame 800 and resends the message as described above. Each local controller 290 may keep a separate count of transmit errors and receive errors. The local controller 290 remains in the error active state until an error count exceeds a lower limit value. The limit value 127 may be chosen for convenience, but any desired number may be used. In some embodiments, the error value is $2^n-1$, n being an integer.

A local controller 290 enters the error passive state when either the transmit or receive error count exceeds 127. In the event that one of the error counts exceeds 127, the local controller 290 may generate an alarm condition alerting the SC 230 to the error state. An alarm condition may be signified by a DEVICE Communications Problem alarm. The alarm may be cleared when the local controller 290 enters the error active state. In the error passive state, a local controller 290 is configured to refrain from interrupting a message in progress. The local controller 290 may, however, generate passive error frames 800.

The local controller 290 enters the bus off state when the transmit error count exceeds an upper limit value. In some embodiments, the upper limit value is $2^{n+1}-1$, where n is the integer selected for the lower limit value described above. Thus, in one example, if the lower limit value is 127, the upper limit value may be 255.

When the error count exceeds the upper limit value, the affected local controller 290 is configured to refrain from sending messages on the RSBus 180. However, the local controller 290 may continue to monitor activity on the RSBus 180. A local controller 290 which is in bus off state may enter the error active state after a reset. The device reset condition may be the expiration of a timer that starts upon the local controller 290 entering the bus-off state. In an example embodiment, the timer expires after 5 minutes. When the local controller 290 is reset by any means, the local controller 290 may reset its transmit error count.

Referring back to FIG. 7, each message frame 700 may be limited in the amount of data that may be sent thereby. When implemented using the CAN2.0 standard, for example, the DF 740 can contain a maximum of eight bytes. In some cases, it may be desirable to send more than eight bytes of data from one local controller 290 to another local controller 290. In such cases, the sending local controller 290 may send a message longer than eight bytes by partitioning the message into multiple message frames 700. A mechanism referred to as "transport protocol" is provided by some embodiments to enable sending such messages. In some embodiments, this mechanism is based on the ISO/DIS Standard 15765-2, incorporated herein by reference as if reproduced in its entirety. Herein after, this standard is referred to as the "15765-2 standard" for brevity. The 15765-2 standard provides for message sequences that include up to 4095 bytes.

The 15765-2 standard uses the addressing format as described below with respect to the message addressing scheme. Thus transport protocol messages may follow the same format as other messages broadcast over the RSBus 180. However, transport protocol messages may be distinguished from non-transport protocol messages at the appropriate layer of the protocol stack based on the ID of the message in question.

Referring to FIG. 7, the DF 740 may include from 0 to eight bytes of data, where each byte comprises 8 bits. In some cases, a local controller 290 may need to convey more than eight bytes of data to another local controller 290.

In various embodiments the local controllers 290 are configured to implement full-duplex transport protocol communication. Such communication is defined, e.g., in Section 6.7.3 of the 15765-2 standard. All local controllers 290, except the SC 230 and the UI/G 250, are single session transfer protocol devices. The SC 230 and the UI/G 250 support up to 4 concurrent transport protocol sessions. When single session devices are engaged in a transport protocol receive session, they are not required to respond to a new transport protocol receive session request.

In such cases the SC 230 and the UI/G 250 may ignore incoming first frames. The transmitting local controller 290 may then retry sending the first frame a number of times. In some embodiments, the requesting local controller 290 retries twice, each time after a one-second timeout. If three consecutive attempts fail, the local controller 290 may issue an alarm signifying that the receiving local controller 290 is unresponsive and may abort the communication attempt. Analogously, the same single-session transport protocol device will not request another transport protocol send session unless the currently ongoing send session is completed. In some embodiments, all single frame transport protocol messages are sent and received regardless of the state of the multi-frame send or receive sessions.

In some embodiments, a transport protocol block size is eight, and a separation time may be 5 ms. However, the local controllers 290 may be configured to use other values, or to override default values, when necessary for effective communication.

In some cases, one or more errors may be encountered during a transfer protocol session. Various embodiments provide error handling consistent with those described by the 15765-2 standard.

Each logical local controller 290 on the RSBus 180 may be identified by an Equipment Type (ET) number. The Equipment Type number serves as an identifier of a class of logical local controllers 290. In some cases, there may be multiple Equipment Type numbers for a same device class. Table I below lists an example embodiment of Equipment Type numbers for various classes of equipment. The values presented in Table I apply to this example embodiment, and are provided without limitation for illustration purposes. Those skilled in the pertinent art will recognize that various equivalents may be implemented within the scope of the disclosure.

TABLE I

RSBus Equipment Types

| Equipment Type | Number Range | Equipment Type Number (in binary form) | | | | | | | | Comments |
|---|---|---|---|---|---|---|---|---|---|---|
| | | Bit 8 | Bit 7 | Bit 6 | Bit 5 | Bit 4 | Bit 3 | Bit 2 | Bit 1 | Bit 0 | |
| Subnet Controllers | 0h-Fh | 0 | 0 | 0 | 0 | 0 | x | x | x | x | Active Subnet Controller = 0h |
| Furnace | 10h | 0 | 0 | 0 | 0 | 1 | 0 | 0 | 0 | 0 | |
| Air Handler | 11h | 0 | 0 | 0 | 0 | 1 | 0 | 0 | 0 | 1 | |
| Air Conditioner | 12h | 0 | 0 | 0 | 0 | 1 | 0 | 0 | 1 | 0 | |
| Heat Pump | 13h | 0 | 0 | 0 | 0 | 1 | 0 | 0 | 1 | 1 | |
| Humidifier | 14h | 0 | 0 | 0 | 0 | 1 | 0 | 1 | 0 | 0 | |
| Dehumidifier | 15h | 0 | 0 | 0 | 0 | 1 | 0 | 1 | 0 | 1 | |
| Damper Control Modules | 16h-17h | 0 | 0 | 0 | 0 | 1 | 0 | 1 | 1 | X | |
| ERV | 18h | 0 | 0 | 0 | 0 | 1 | 1 | 0 | 0 | 0 | |
| HRV | 19h | 0 | 0 | 0 | 0 | 1 | 1 | 0 | 0 | 1 | |
| Dual Fuel Module | 1Ah | 0 | 0 | 0 | 0 | 1 | 1 | 0 | 1 | 0 | |
| UV Light | 1Bh | 0 | 0 | 0 | 0 | 1 | 1 | 0 | 1 | 1 | |
| Media Air Cleaner | 1Ch | 0 | 0 | 0 | 0 | 1 | 1 | 1 | 0 | 0 | |
| Electronic Air Cleaner | 1Dh | 0 | 0 | 0 | 0 | 1 | 1 | 1 | 0 | 1 | |
| IAQ Analyzer | 1Eh | 0 | 0 | 0 | 0 | 1 | 1 | 1 | 1 | 0 | |
| Twinning Module | 1Fh | 0 | 0 | 0 | 0 | 1 | 1 | 1 | 1 | 1 | |
| Wireless Comfort Sensors | 20h-3Fh | 0 | 0 | 0 | 1 | x | x | x | x | x | Wireless Gateways may be configured at 20h or at 30h. Individual sensors may then be added from that address on until a maximum number is reached, e.g., 32. |
| Comfort Sensors | 40h-4Fh | 0 | 0 | 1 | 0 | 0 | x | x | x | x | |

TABLE I-continued

RSBus Equipment Types

| Equipment Type | Number Range | Bit 8 | Bit 7 | Bit 6 | Bit 5 | Bit 4 | Bit 3 | Bit 2 | Bit 1 | Bit 0 | Comments |
|---|---|---|---|---|---|---|---|---|---|---|---|
| Wireless Outdoor Sensor | 50h-5Fh | 0 | 0 | 1 | 0 | 1 | x | x | x | x | A Wireless Gateway may be configured at 50h. Individual addresses are added to this base address to a maximum number of sensors, e.g., 16. |
| Outdoor Sensors | 60h-63h | 0 | 0 | 1 | 1 | 0 | 0 | 0 | x | x | The number of sensors on each subnet may be limited, e.g., to 4. |
| Not Used | 64h-6Fh | 0 | 0 | 1 | 1 | 0 | ? | ? | ? | ? | Expansion |
| User Interfaces/ Gateways | 70h-7Fh | 0 | 0 | 1 | 1 | 1 | x | x | x | x | User Interfaces are 70h-7Bh. Gateways are 7Ch-7Fh |
| Not Used | 80h-1DFh | 1 | ? | ? | ? | ? | ? | ? | ? | ? | Expansion |
| Reserved | 1E0h-1FF | 1 | 1 | 1 | 1 | x | x | x | x | x | Reserved for NVM Flashing |

In various embodiments, a local controller 290 may be configured to notify the aSC 230a that it cannot be configured as commanded. The notification may take the form of an appropriately configured message sequence from the local controller 290 to the aSC 230a.

Table II below illustrates an embodiment of a message addressing scheme of the disclosure. A message ID of this embodiment includes 29 bits, providing a pool of more than 5E8 different messages. This message pool is divided into eight message classes identified by the three most significant bits of the Message ID, bits 26-28. Each message class may be designated for a different purpose, as indicate. In the illustrated embodiment, classes 0, 2, 4 and 7 are not currently defined.

TABLE II

RSBus Message Classes

| Message Class | CAN extended 29-bit message ID | | | | | | | | | |
|---|---|---|---|---|---|---|---|---|---|---|
| | 28 | 27 | 26 | 25 | 24 | 23 | 22 | 21 | 20 | 19 |
| Class 0 | 0 | 0 | 0 | | | | | | | |
| Class 1 UI/G messages | 0 | 0 | 1 | C1MID8 | C1MID7 | C1MID6 | C1MID5 | C1MID4 | C1MID3 | C1MID2 |
| Class 2 | 0 | 1 | 0 | | | | | | | |
| Class 3 Broadcast messages | 0 | 1 | 1 | AL | C3MID12/PR0 | C3MID11/PR1 | C3MID10/S/C | C3MID9 | C3MID8 | C3MID7 |
| Class 4 | 1 | 0 | 0 | | | | | | | |
| Class 5 SC messages | 1 | 0 | 1 | C5MID12 | C5MID11 | C5MID10 | C5MID9 | C5MID8 | C5MID7 | C5MID6 |
| Class 6 Diagnostic messages | 1 | 1 | 0 | C6MID9 | C6MID8 | C6MID7 | C6MID6 | C6MID5 | C6MID4 | C6MID3 |
| Class 7 | 1 | 1 | 1 | | | | | | | |

| Message Class | CAN extended 29-bit message ID | | | | | | | |
|---|---|---|---|---|---|---|---|---|
| | 18 | 17 | 16 | 15 | 14 | 13 | 12 | 11 |
| Class 0 | | | | | | | | |
| Class 1 UI/G messages | C1MID1 | C1MID0/TP | | | Destination or Source Equipment Type | | | |
| Class 2 | | | | | | | | |
| Class 3 Broadcast messages | C3MID6 | C3MID5 | C3MID4 | C3MID3 | C3MID2 | C3MID1 | C3MID0 | AS |
| Class 4 | | | | | | | | |
| Class 5 SC messages | C5MID5 | C5MID4 | C5MID3 | C5MID2 | C5MID1 | C5MID0/TP | Destination or Source Equipment Type | |
| Class 6 Diagnostic messages | C6MID2 | C6MID1 | C6MID0 | DD9 | DD8 | DD7 | DD6 | DD5 |
| Class 7 | | | | | | | | |

TABLE II-continued

RSBus Message Classes

| Message Class | CAN extended 29-bit message ID | | | | | | | | | | |
|---|---|---|---|---|---|---|---|---|---|---|---|
| | 10 | 9 | 8 | 7 | 6 | 5 | 4 | 3 | 2 | 1 | 0 |
| Class 0 | | | | | | | | | | | |
| Class 1 UI/G messages | Destination or Source Equipment Type | | | UIID3 | UIID2 | UIID1 | UIID0 | SS1 | SS0 | DS1 | DS0 |
| Class 2 | | | | | | | | | | | |
| Class 3 Broadcast messages | | | | Source Equipment Type | | | | | | SS1 | SS0 |
| Class 4 | | | | | | | | | | | |
| Class 5 SC messages | | | | Destination or Source Equipment Type | | | | SS1 | SS1 | DS1 | DS0 |
| Class 6 Diagnostic messages | DD4 | DD3 | DD2 | DD1 | DD0 | UIID3 | UIID2 | UIID1 | UIID0 | S/DS1 | S/DS0 |
| Class 7 | | | | | | | | | | | |

In various embodiments, all message IDs on the RSBus 180 follow the described encoding, with one exception. For a transfer protocol flow control frame, the message ID may duplicate the message ID of the frame of the received transfer protocol First Frame.

The various message classes of Table II are now described. Message Class 1 includes User Interface and Gateway messages, e.g., those sent by the UI/G 250. These messages serve to communicate with the user during normal system operation. They include messages sent from the user interface or the gateway, as well as some messages explicitly and implicitly addressed to them.

FIG. 9 illustrates an embodiment of the disclosure of the AF 720 (FIG. 7) for Class 1 messages. The control bits in the AF 720 are encoded as follows:

TABLE III

Class 1 Message Arbitration Field Breakdown

| Sub-Field | Description | Purpose |
|---|---|---|
| DSI0-DSI1 | Destination Subnet Identifier | Indicate the subnet the message is sent to |
| SSI0-SSI1 | Source Subnet Identifier | Indicate the subnet the message originated in |
| UIID0-UIID3 | User Interface ID | Indicate the address of the UI or G the message is sent to or from, values 0-11 denote User Interfaces, values 12-15 identify Gateways; it is equivalent to the UI/Gs Equipment Type numbers, offset by 70h - e.g. if the UI has the ET = 72h, its UIID = 2 |
| Equipment Type | Equipment Type Number | As defined in Table I |
| C1MID0 = ID17/TP | Class 1 Message ID LSb/Transfer Protocol | Least significant bit of the Class 1 Message ID. This bit indicates if the message is a Transfer Protocol message (TP = 1) or not (TP = 0) |
| C1MID0-C1MID8 = ID17-ID25 | Class 1 Message ID | Unique 9-bit message identifier within Class 1 |

FIG. 10A illustrates an embodiment of the disclosure of the AF 720 (FIG. 7) for Class 3, System Broadcast messages. System Broadcast Messages are broadcasted from one subnet, such as the subnet 400, but all local controllers 290 from all subnets can listen and respond to a Class 3 message. System Broadcast messages include DEVICE_Status and Alarms messages. There are 8,192 ($2^{13}$) System Broadcast messages possible in the illustrated embodiment. The number of alarms is limited to a subset of the total possible number of message, e.g. 1024)($2^{10}$). The control bits in the AF 720 are encoded as follows for this message class:

TABLE IV

Class 3 Message Arbitration Field Breakdown: System Broadcast Messages

| Sub-Field | Description | Purpose |
|---|---|---|
| SSI0-SSI1 | Source Subnet Identifier | Indicate the subnet the message originated from |
| AL | Alarms | AL = 0 indicates that the message is a system broadcast message. AL = 1 indicates an alarm |
| AS | All subnets | AS = 0 indicates that the message is broadcast on all subnets. AS = 1 indicates that the destination subnet is identical to the source subnet |
| Equipment Type | Equipment Type Number | As defined in Table I |
| C3MID0-C3MID12 = ID12-ID24 | Class 3 Message ID | Unique 13-bit message identifier within Class 3 |

FIG. 10B illustrates an embodiment of Class 3 messages for the case that the message is an Alarm message. In various embodiments, all Alarm messages are Class 3 messages. An Alarm message includes additional information about the alarm priority encoded in the PR0-PR1 bits. The control fields in the AF 720 are encoded as indicated in Table V.

TABLE V

Class 3 Message Arbitration Field Breakdown: Alarm Messages

| Sub-Field | Description | Purpose |
|---|---|---|
| SSI0-SSI1 | Source Subnet Identifier | Indicate the subnet the message originated from |
| AL | Alarms | Set to 1 to indicate an alarm |
| PR0-PR1 | Alarm Priority | Encodes alarm priority, e.g., minor, moderate and critical |
| SC | Set/Clear | Set to 0 when the alarm is set and set to 1 when the alarm is being cleared |
| ID12-ID21 | Alarm Number | The exact representation of the alarm number |
| AS | All Subnets | AS = 0 indicates that the message is broadcast on all subnets. AS = 1 indicates that the destination subnet is identical to the source subnet |
| Equipment Type | Equipment Type Number | As defined in Table I |

FIG. 11 illustrates an embodiment of the disclosure of the AF 720 for Class 5, Subnet Controller messages. Messages in this class may be used primarily when a local controller 290 is in a COMMISSION state or a CONFIGURATION mode. In some embodiments, all messages in class 5 are used for communication to or from the Subnet Controller, e.g., the SC 230. The format of messages in Class 5 may be constrained to be as defined in Table II. In FIG. 10B, ID14-ID25 identify a unique message resulting in total of 4096 ($2^{12}$) messages in this class. Table VI describes the bit assignments in the AF 720 for Class 5 messages.

The Equipment Type and the Destination Subnet Identifier denote the specific device and the specific HVAC system (network subnet) to which the message is addressed when sent from the SC 230. If the message is sent to the SC 230, the Equipment Type identifies the device sending the message and the SSI bits identify the subnet of the device. The SC 230 being addressed is identified by the Destination Subnet Identifier bits.

During normal operation, a Subnet Identifier in device messages would typically not change unless the particular local controller 290 to which the device messages pertain is reconfigured to work on a different subnet. The Equipment Type designator assigned to a local controller 290 typically does not change, but may be reassigned if the local controller 290 is reconfigured. Generally, local controllers 290 other than Subnet Controllers respond only to class 5 messages containing their Equipment Type and Subnet ID in the destination field.

TABLE VI

Class 5 Message Arbitration Field Breakdown: Subnet Controller Messages

| Sub-Field | Description | Purpose |
|---|---|---|
| DSI0-DSI1 | Destination Subnet Identifier | Indicate the subnet the message is sent to |
| SSI0-SSI1 | Source Subnet Identifier | indicate the subnet the message originated in |
| Equipment Type | Equipment Type Number | As defined in Table I |
| C1MID0 = ID13/TP | Class 5 Message ID LSb/Transfer Protocol | Least significant bit of the Class 5 Message ID. If 1, indicates the message is a Transfer Protocol message |
| C5MID0-C5MID12 = ID13-ID25 | Class 5 Message ID | Unique 13-bit message identifier within Class 5 |

Diagnostic messages are categorized as Class 6 messages. Class 6 messages use Device Designator bits to identify the destination device. Even when the local controller 290 is not configured, or is disabled as described below, the local controller 290 can still send or receive Class 6 messages. In various embodiments, the local controller 290 can send and receive Class 6 messages before being configured or while disabled. The control bits in the AF 720 are encoded as described in Table II, and further detailed in Table VII.

TABLE VII

Class 6 Basic Diagnostic Messages

| Sub-Field | Description | Purpose |
|---|---|---|
| UIID0-UIID3 | User Interface ID | Indicate the address of the UI/G the message is sent to or from. Values 0-11 may denote User Interfaces; values 12-15 may identify Gateways. The User Interface ID is equivalent to the UI/G Equipment Type numbers, offset by 70h. E.g., if the Equipment Type of the UI is 72h, its UIID is 2 |
| DD0-DD9 | Device Designator | Indicate the device's 10 least significant Device Designator bits |
| S/DSI0-S/DSI1 | Source/Destination Subnet Identifier | Indicate the subnet of the UI/G that diagnoses the device |
| C6MID0-C6MID9 = ID16-ID25 | Class 5 Message ID LSb/Transfer Protocol | reserved for a total of 1024 possible message IDs in this class |

Some messages sent over the RSBus 180 may expect a response. In some cases, the sender expects the response immediately, meaning as soon as the hardware and communication protocol allow the transmission of the response. Such messages are referred to herein as queries. Queries generally have various timing constraints associated therewith. One embodiment of a set of rules is described below that may apply to query messages for most purposes.

Message Response Time: Generally messages are to be sent without delay by the sending local controller 290. In many cases it is preferable if a response to a query is generated in 100 ms or less. This means that upon receipt of a query, the responding local controller 290 should within 100 ms place a response into its CAN transmit buffer. In many cases the response will not be sent within 100 ms, as the response timing is generally dependent on the traffic conditions on the bus and the message's priority.

In one exception to this general rule, in the SUBNET_STARTUP state the local controller 290 is generally configured to wait 100 ms before it attempts to respond to the SC_Coordinator message. Thus, the response will be placed in the transmit buffer at a time greater than 100 ms after receipt of the query. Other exceptions to the general response timing rule may be made as desired.

Message Resend: A local controller 290 may be configured to resend a message when a correct reply to the message is not received within the expected timeout period. The timeout period may be set to any non-zero value, e.g., about 1 second. If the message is resent after an initial message, and no response is received within the timeout period after the subsequent message, the local controller 290 may attempt to resend the message again. If a response to the third attempt is not received within the timeout period, the local controller 290 may be configured to cease further resending of the message. Of course, more or fewer attempts may be made before ceasing to send the message. In some embodiments, the local controller 290 may send an alarm message identifying the Equipment Type of the unresponsive device, or act in any other way desired.

Subnet Controller Monitoring: In some embodiments, the aSC 230*a* sends a periodic message to other devices on the RSBus 180 that indicates the aSC 230*a* is present and functioning normally. This message is referred to for convenience as a "Heartbeat" message, e.g., aSC_Heartbeat. Each enabled local controller 290 may listen to the aSC_Heartbeat message and, when the message is not detected for a specified listening period, may take a specified action. In one embodiment, the local controller 290 may issue an alarm when the Heartbeat message is absent for more than three times its usual send period, e.g., three messages are missed. In some embodiments, the local controller 290 also ceases operation and returns to a default state.

Timing Accuracy: Each local controller 290 typically includes an oscillator to provide a timing reference. Each oscillator is preferred to conform to the accuracy for systems with bus speed of up to 125 kbaud, as defined in section 9.1 of the Bosch CAN 2.0B specification. This specification defines resonator accuracy over the entire temperature range and all environmental conditions, including aging, to be 1.58%. In some embodiments, a maximum additional ±200 μs tolerance may be accommodated without notable system degradation. In some cases, the tolerance of the device oscillator may be made more stringent when real-time clock functions are provided.

RSBus IDs Header File: The local controllers 290 may be provided by numerous manufacturing suppliers. To promote uniformity of configuration of the various local controllers 290, a system integrator may provide a uniform header file that the suppliers include in firmware controlling the operation of the local controller 290. It is generally preferable that the suppliers use the uniform header file without modification in furtherance of the objective of uniformity of the integrated devices. In an embodiment, the uniform header file contains all RSBus Message IDs for all messages, including the class of each message. In an embodiment, the file also contains the most current parameter and feature numbers as well as the system wide alarms. In some cases, the alarms, features, parameters and messages are identified by their string names in all caps format, with a prefix according to the type. Thus, e.g., alarm names may be prefixed with a lower-case letter "a", feature names may be prefixed with "f", parameter names with "p" and message names with "mIDx_" when defining the message ID from a class x and "mc" when defining the message class.

In a specific example for illustration purposes only, a class 3 message FOO with a message ID of 0x100 may be defined as follows:

```
#define mcDEVICE_FOO 3
#define mID3_DEVICE_FOO 0x100
```

The file may include the following sections:
- Own Alarm IDs—includes Alarm IDs for all Alarms generated by the device
- Parameter IDs—includes Parameter IDs for all parameters sent (owned) and received by the device
- Feature IDs—includes Feature IDs for all parameters sent (owned) and received by the device
- Own User Text IDs—includes all User Text IDs stored by the device
- Sent/Received Message IDs—includes message IDs for all messages sent and received by the device
- Sent/Received Message Classes—includes message classes for all messages sent and received by the device
- Own Alarm Texts—includes installer text in all device supported languages for all alarms owned by the device
- Own Feature Texts—includes installer text in all device supported languages for all features owned by the device
- Own Parameter Texts—includes installer text in all device supported languages for all parameters owned by the device
- Own Feature Send/Receive Matrix—defines whether the particular Feature is sent and/or received by the device
- Own Parameter Send/Receive Matrix—defines whether the particular Parameter is sent and/or received by the device
- Own Message Send/Receive Matrix—defines what states each message is sent and/or received by the device Message Bit Timing: Bit timing of the local controllers 290 may be specified for uniformity of operation. In an embodiment, the local controllers 290 configure the CAN bit timing as follows. The local controller 290 timing oscillator produces a periodic signal with a period referred to as a time quantum (TQ). In some embodiments, one bit has a period of 25 TQ. Thus for a timing oscillator having a period, or TQ, of about 1 μs, the bit rate is about 40 kBaud. A local controller 290 may sample the data on the RSBus at a time related to the TQ. In an embodiment, there the local controller 290 uses a delay time of 8 TQ. The bit is sampled between the 17th and 18th TQ of the bit. If multiple sample points are selected, they may be centered on the transition from 17th to 18th TQ.

If the chosen CAN platform does not support the clock divider that allows 25 TQ per bit timing, it may be preferred to use a setting with the highest number of TQs per bit, preferably not greater than 25. Delay time should be adjusted to 32% of the bit duration, and the sample points at or centered on 68% of the bit duration.

Any of the local controllers 290 in the network 200 may be reset by cycling the power thereof. The local controller 290 is typically configured to execute a power-up routine that places the local controller 290 in a state ready to be configured via messages and thereby begin normal operation.

However, among the many advantages of the communication protocol of the disclosure is the ability to implement an efficient method of resetting the local controllers 290 on the RSBus 180 without cycling power to the devices. In an embodiment, a software reset may be issued upon a timeout when a local controller 290 enters the bus off state as described earlier.

In another embodiment, the SC 230 resets a local controller 290 using a combination of two messages. A first reset message commands the local controller 290 to prepare for a reset. Optionally, the local controller 290 may respond to the first message with a message, e.g., DEVICE_Waiting_for_Reset, indicating that the local controller 290 is waiting for a reset message. The SC 230 sends a second reset message instructing the local controller 290 to reset. The local controller 290 may be configured to only reset in response to the second message if the second message is received within a predetermined time period after the first message, e.g., one minute. If the second message is not received within the predetermined time period, the local controller 290 may resume normal operation and ignore any reset messages received before another message to prepare to reset. In some cases the first and second messages may respectively instruct multiple local controllers 290 to prepare for reset, and to reset.

In another embodiment, the local controller 290 is configured to be placed in a "HARD_DISABLED" and a "SOFT_DISABLED" state. The HARD_DISABLED state may be initiated by a user via a message from the UI/G 250. In some cases, this aspect provides the ability to enable or disable a local controller 290 without physically locating the local controller 290. This may be particularly advantageous when the local controller 290 is a logical device, the location of which may be difficult to immediately determine, when expedient disabling of the local controller 290 is desired.

While in the HARD_DISABLED state, the local controller 290 may be configured to monitor the RSBus 180 without transmitting messages thereover. However, while in this state the local controller 290 may not send messages to other device, nor may the local controller 290 perform any control of an associated demand unit 155. The UI/G 250 may send an appropriately configured message to the local controller 290 instructing the local controller 290 to enter or exit the HARD_DISABLED state. These messages may be, e.g., class 6 messages. When the local controller 290 receives a message altering its HARD_DISABLED state, it may respond by issuing an acknowledgment over the RSBus 180, e.g., via a DEVICE_UI/G_Enable_Acknowledge message. Subnet controllers 230 may monitor these messages to track the state of enablement of the various local controllers 290 on the RSBus 180. When the local controller 290 is hard enabled, it may reset itself and enter a CRC check mode.

The HARD_DISABLED state is persistent, meaning that the local controller 290 remains in the HARD_DISABLED state until the user takes an action to send an enable message. In various embodiments the state of enablement is logged in the NVM 320 associated with each physical or logical local controller 290. Thus, the state of enablement, including the condition of being disabled, is remembered by the local controller 290 after reset.

In the SOFT_DISABLED state, the local controller 290 may continue to respond to messages from the SC 230, but may not execute any control functions. The message may be of a reserved type that instructs one or more local controllers 290 to proceed to a startup state. The local controller 290 may respond in such cases by issuing a message alerting the SC 230 that the local controller 290 is starting up. In various embodiments the state of enablement in the SOFT_RESET state is stored in the RAM 320. Thus, the state of disablement in the SOFT_RESET state may be cleared upon reset of the system 100.

The SOFT_DISABLED state may be cleared when the local controller 290 is reset. The aSC 230a may implement a soft-disable of a local controller 290 when the local controller 290 is "alien" to the subnet, e.g., unrecognized as a properly initiated local controller 290. The aSC 230a may also soft-disable a local controller 290 that is determined to be malfunctioning.

In some embodiments, entry of the local controller 290 to a privileged operating mode may be controlled by messages issued by a special-purpose command interface. One such mode is an OEM programming mode. The OEM programming mode may be used to download configuration data to the local controller 290. Configuration data may include, e.g., serial and model numbers, unit capacity, etc. Such information may be stored in non-volatile memory of the local controller 290, e.g., the NVM 320.

Another privileged operating mode is an OEM functional test mode. This mode may provide the ability to test the local controller 290 using, in addition to the messaging protocol, a special data sequence input to a test port that may be separate from the communication capability of the controller 290. For example, the command interface may send a demand message to and receiving status information from the local controller 290 over the RSBus 180, as discussed more fully below.

In some embodiments, a special command sequence from a standard UI/G 250 may be used to implement either privileged operation mode. Use of these modes may be restricted by password protection if desired.

When the HVAC system 100 is reset or powered up, the local controllers 290 on the subnet are configured in various embodiments to establish an initial operating state of the system 100. One aspect includes configuration of one or more SCs 230 of the subnet of the network 200, e.g. As described further below, each SC 230 enters a SUBNET_STARTUP state upon power-up. During the SUBNET_STARTUP state, the one or more SCs 230 negotiate for the control of the subnet. This negotiation is based on a set of features and parameters of each SC 230, and is designed to ensure that the best SC 230 available controls the subnet. After this negotiation is completed, the SC 230 that is selected by the negotiation process becomes active, or in other words, becomes an aSC that thereafter takes firm control of the subnet. At that point the SC 230 places the subnet in a CONFIGURATION mode or a VERIFICATION mode, and proceeds to assign or reassign Equipment Types and Subnet IDs to the local controllers 290 on the subnet.

In the CONFIGURATION mode, a SUBNET_STARTUP process serves to configure the subnet to an operational state. In the VERIFICATION mode, the SUBNET_STARTUP process verifies that a current subnet configuration matches a subnet configuration set up previously during an initial configuration. It is possible to add new devices to the subnet during a Configuration routine executed only when in the CONFIGURATION mode. The VERIFICATION mode may be similar to the CONFIGURATION mode, with two differences as follows. First, in some embodiments the aSC 230a reassigns the same Equipment Types and Subnet ID numbers to the local controllers 290 as were assigned thereto during the last initial configuration. Second, the VERIFICATION mode may be configured to exclude the registration of new devices on the network. As described further below, the CONFIGURATION mode or the VERIFICATION mode may be indicated by values of a CF0 and a CF1 flag, defined below, of the one or more SCs 230 present in the subnet.

Figure 12:
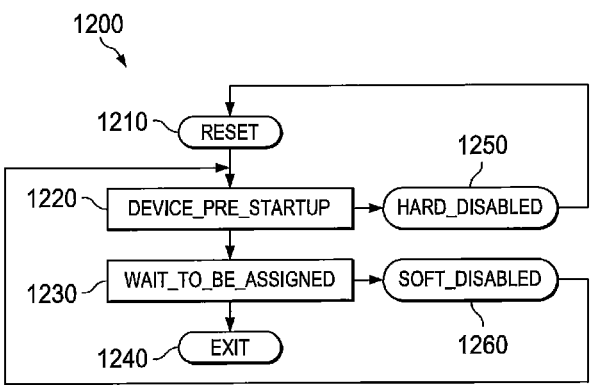
FIG. 12 is a method of the disclosure illustrating startup of a local controller.

FIG. 12 illustrates a state diagram of an embodiment of a SUBNET_STARTUP process, generally designated 1200, that is configured to run on a local controller 290. In various embodiments the process 1200 is implemented as a finite state machine (FSM). In some embodiments the FSM is only implemented on local controllers 290 that are not a subnet controller during the process 1200. In some embodiments, every local controller 290 that is not an SC 230 runs a FSM machine consistent with the process 1200. The process 1200 may execute in response to messages sent by the SC 230.

The process 1200 begins with a reset state 1210. As mentioned previously, the reset state may be reached from a power-up condition, another device state (such as a check of the NVM 320) or a reset command from a controller, e.g. the aSC 230*a*. The process 1200 advances to a state 1220, designated DEVICE_PRE_STARTUP. In an illustrative embodiment, the state 1220 includes a plurality of configuration events that ends with the local controller 290 sending a message over the RSBus 180 indicating the local controller 290 is ready to start. This message is referred to for convenience as DEVICE_Startup. After the state 1220, the process 1200 advances to a state 1230, designated WAIT_TO_BE_ASSIGNED. The state 1230 includes a plurality of configuration events that ends with the local controller 290 receiving a message from the aSC 230*a* commanding a change to an operational state, referred for convenience as aSC_Change_State. Upon receiving the aSC_Change_State message, the process 1200 advances to a state 1240 and exits.

Note that in all states the local controller 290 can still respond to a Class 6 diagnostic message. Thus, from any state, a message may force the process 1200 to the HARD_DISABLED state 1250 or to the reset state 1210. The process 1200 illustrates an example in which the process 1200 enters the HARD_DISABLED state 1250 from the sate 1220. The process 1200 remains in the state 1250 until the local controller 290 receives an appropriate message as described previously. The process 1200 may then advance to the state 1210, from which the local controller 290 may begin the initialization process again.

The process 1200 also illustrates an example in which the process 1200 enters a state 1260 SOFT_DISABLED state from the state 1230. The process 1200 may remain in the state 1260 until the local controller 290 is reset as previously described. The process 1200 may then advance to the state 1220.

In some embodiments, the local controller 290 is configured to remain, during the state 1220, in a listen-only mode for a predetermined period, e.g., at least about 5000 ms. In the listen-only mode, the local controller 290 monitors messages sent over the RSBus 180, but does not initiate any messages. After the listen-only period expires, the local controller 290 may optionally wait an additional startup delay period. After the optional additional delay, the local controller 290 may send a DEVICE_Startup message over the RSBus 180, and may then monitor the RSBus 180 for any messages that indicate other devices on the RSBus 180 failed to receive the startup message correctly.

In some cases, the local controller 290 may initiate its startup message before the end of the 5000 ms listen-only period. In one embodiment, the local controller 290 receives an SC_Coordinator message. In this case, the local controller 290 sends a startup message immediately after powering up. In this context, immediately means after about 100 ms plus an additional delay derived from the Device Designator. In some such cases, the message is not received successfully by at least one other local controller 290, resulting in a Bit Error event on the RSBus 180. If the Bit Error is detected, then the device may wait a specified period, after which it resends the startup message. A specific resend delay period may be selected for a particular local controller 290. In various embodiments the resend delay reduces the probability of message collision on the data bus 180. An algorithm that determines this resend delay time as a function of the Device Designator may compute the resend delay period as described further below.

In various embodiments the system 100 is configured to allow multiple devices of the same type to start communicating on the network 200. These embodiments allow seamless plug-and-play configuration even when the bandwidth of the data bus 180 is limited. The following example illustrates principles of these embodiments, and is presented by way of illustration without limitation.

In one embodiment the Device_Startup message ID is unique to each type of device. The message data field of the Device_Startup message may be identical to the data field of the Device_Designator message. These messages may be Class 5 messages, and in such cases they may have RSBus message IDs that include an offset number and a five bit order number shifted left by one, so as not to interfere with the CAN ID bit ID13 used to indicate the transport protocol. In these messages the order number is defined for a particular system device 410 as the five least significant bits of the Device Designator (DD) of that system device 410. In some embodiments using a Class 3 message that includes the 5-bit order number, the position of the order number in the message ID is not shifted by one. For the case of the aSC 230*a*, the order number can also be a number calculated from the number of other subnet controllers, typically one or more instances of the iSC 230*i*, detected on the subnet.

In a nonlimiting example, the Device_Startup message is 0x180, and the last byte of the DD is 0x45, then the message ID of the Device_Startup message is 0x180+(0x45 & 0x1F)=0x180+0x0A=0x18A.

As described further below, a base delay time may be scaled by the value of the order number. The occurrence of a bit error when a system device 410 sends a Device_Startup message indicates that two devices 290 simultaneously attempted to publish a message on the data bus 180, referred to herein as a message collision, or more briefly, a collision. When a collision occurs, the devices delay resending the Device_Startup message for a unique period derived from the order number.

Thus in various embodiments the presence of the order number advantageously reduces the probability of collisions by the factor $2^b$, where b is the number of bits of the order number. In the embodiments described above, the collision probability is reduced to about 3% of the collision probability that would otherwise be present.

After the local controller 290 successfully sends its startup message, the local controller 290 may wait for a Startup Response message from the aSC 230*a*. The Startup Response may be configured to provide a node assignment to the local controller 290. A node assignment message is referred to for discussion purposes as an aSC_DEVICE_Assignment message. The aSC_DEVICE_Assignment message may be sent by the aSC 230*a* from its subnet. This message may contain information regarding the subnet that the local controller 290 may need to operate properly. Information conveyed by aSC DEVICE Assignment may additionally include the Equipment Type assigned to local controller 290, and other flags. After the local controller 290 receives the aSC_DEVICE message, the local controller 290 may send an acknowledgement message over the subnet of the network 200 it has been assigned to. The message may include, e.g., the Equipment Type of the local controller 290.

If a local controller 290 does not detect a startup response message addressed to it within 5 minutes after it is initiated, the local controller 290 may repeat its startup message. In some embodiments, the local controller 290 repeats the startup message every 5 minutes until the local controller 290 successfully receives an Equipment Type and Subnet ID assignment, e.g., via a aSC_DEVICE_Assignment message. The local controller 290 may send an acknowledgement message indicating it is configured and ready to operate normally. In some embodiments, all local controllers 290 are required to receive an aSC_DEVICE_Assignment message before sending an acknowledgement. In some cases, exceptions may be made to this requirement where system design considerations warrant.

In some cases, the local controller 290 was assigned an Equipment Type and a Subnet ID in a previous system startup. In some embodiments, the local controller 290 retains the previously assigned values. In other cases, the local controller 290 was not previously assigned an Equipment Type and a Subnet ID, such as when the local controller 290 is initially added to the system 100. In some embodiments, a local controller 290 that has not previously been assigned an Equipment Type and a Subnet ID are assigned a default value. The default value of the Equipment Type may be a lowest Equipment Type for the specific device. The default Subnet ID may be, e.g., 0.

When a subnet starts up, an SC 230 may publish an SC_Coordinator message to the data bus 180 to coordinate control of the subnet with any other instances of the SC 230 on the subnet. When the local controller 290 receives the SC_Coordinator message it may respond with a DEVICE_Startup message if the local controller 290 is in the SUBNET_STARTUP or SOFT_DISABLED states, or in an OEM Test state described above. Otherwise the local controller 290 may respond with the DEVICE_Device_Designator message.

For example, if the local controller 290 sees the SC_Coordinator message after powering up, it may respond with the DEVICE_Startup message. Then, the local controller 290 may be assigned an Equipment Type and Subnet ID by an aSC_DEVICE_Assignment message, and may then receive an aSC_Heartbeat message. If the local controller 290 receives another SC_Coordinator message, the local controller 290 may again respond with the DEVICE_Startup message, because it has not cleared the SUBNET_STARTUP state since the last reset. If the local controller 290 is assigned and changes state to, e.g. a COMMISSIONING state and then receives another SC_Coordinator message, the local controller 290 may respond with a DEVICE_Device_Designator message. If the local controller 290 is assigned for the second time, but remains in the SUBNET_STARTUP state when yet another SC_Coordinator message arrives, it may respond with a DEVICE_Startup message, as it is no longer necessary to remember the previous state.

Restated from the perspective of the aSC 230*a*, if the aSC 230*a* receives a DEVICE_Device_Designator message, it knows that the local controller 290 has not recently been reset. If the aSC 230*a* receives the DEVICE_Startup message, it knows that the local controller 290 has not been assigned and has not changed state since last hardware or software reset of the local controller 290.

Figure 6B:
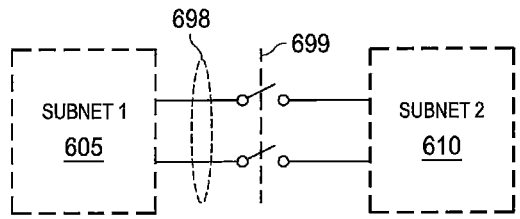
FIG. 6B illustrates an embodiment of selectively isolating subnets.

FIG. 6B illustrates an embodiment in which a link relay is used to selectively isolate the subnet 615 from the subnet 620. In a conventional communicating HVAC system all devices share a common communicating bus. During system installation and configuration special care must be taken to ensure that corresponding equipment from same HVAC system is matched. Installation becomes more cumbersome and prone to error as the number of connected systems increases, and as the number of components in the total system increase. Moreover, if a bus error occurs, such as a short circuit between bus wires, the entire network may be disabled.

In the embodiment of FIG. 6B, the subnet 615 and the subnet 620 may be selectively isolated from each other using a switch 699 such as a relay. Two systems, one corresponding to each subnet 615, 620 may be installed, configured and tested separately. At a proper time the aSC 230*a* in each subnet 615, 620, for example the SC 662 and the SC 682, may link its subnet to another subnet by actuating the switch 699.

Advantageously, and in contrast to conventional HVAC systems, if a communication bus failure is detected, the aSC 230*a* may disconnect its subnet from the network 200 to localize the problem. The aSC 230*a* may put the switch 699 in a local mode (e.g., isolating its subnet) as soon as immediately upon receiving a SC_Coordinator message from any subnet, or upon receiving an SC_Startup message from an aSC 230*a* on the same subnet. After repair, the aSC 230*a* may be instructed via an appropriately configured message to reconnect to the network 200. Thus, at least some HVAC services may be maintained even if one subnet is rendered inoperable by a failure of the data bus 180.

Figure 13A:
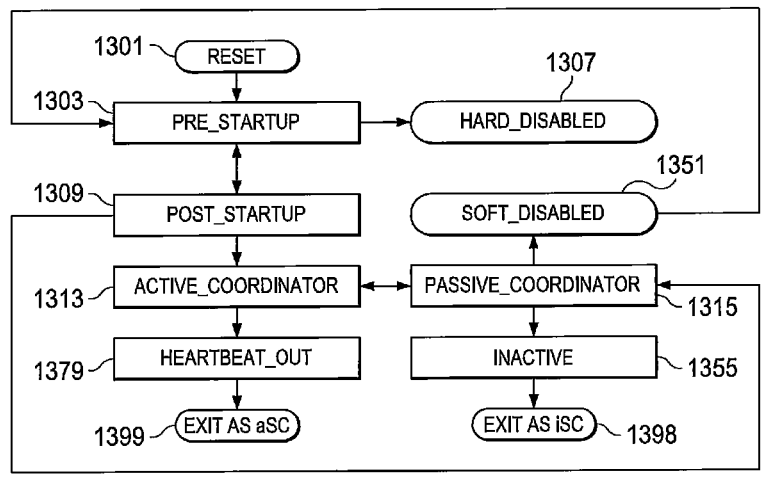
FIGS. 13A and 13B are methods of the disclosure illustrating startup of a subnet controller.
Figures 2, 13B:
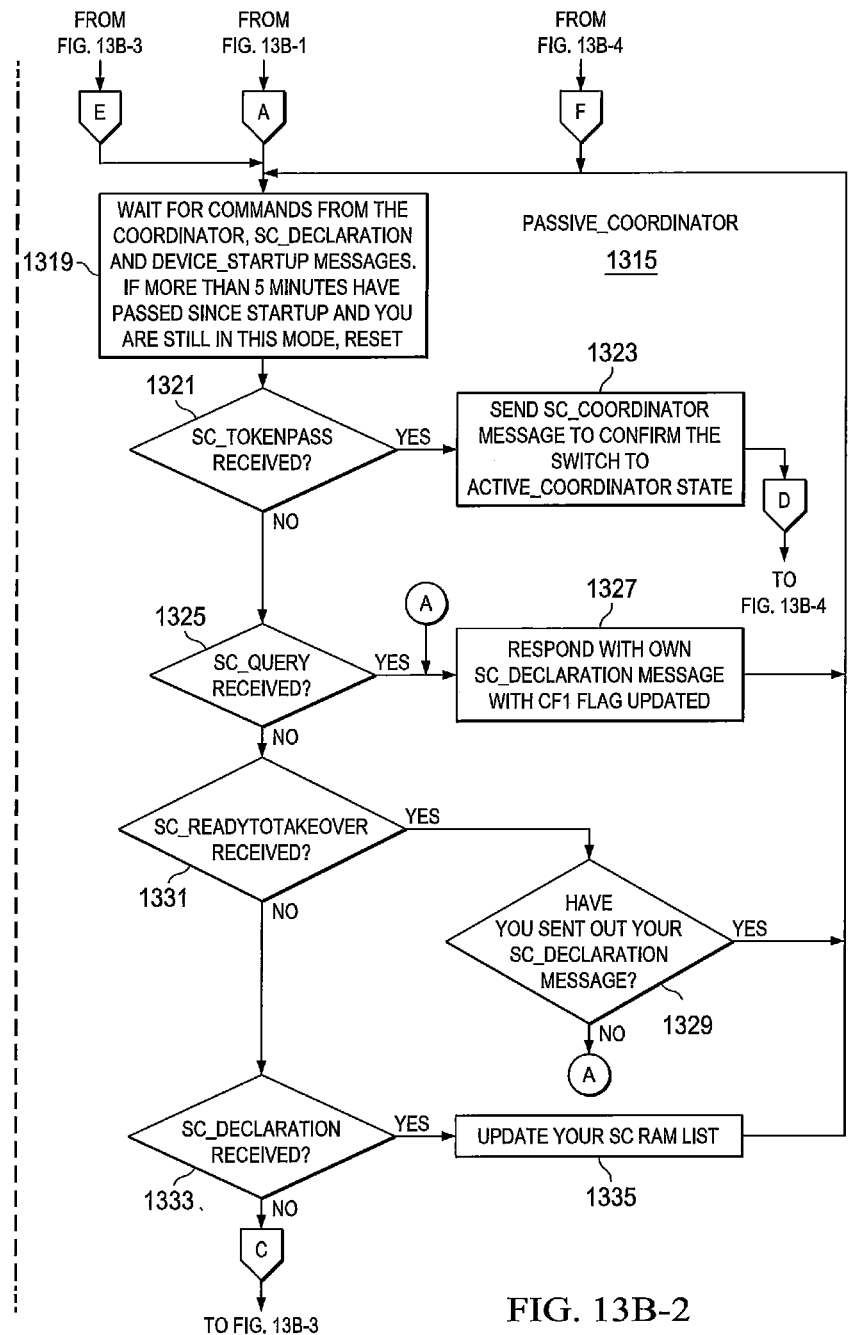
Figures 3, 13B:
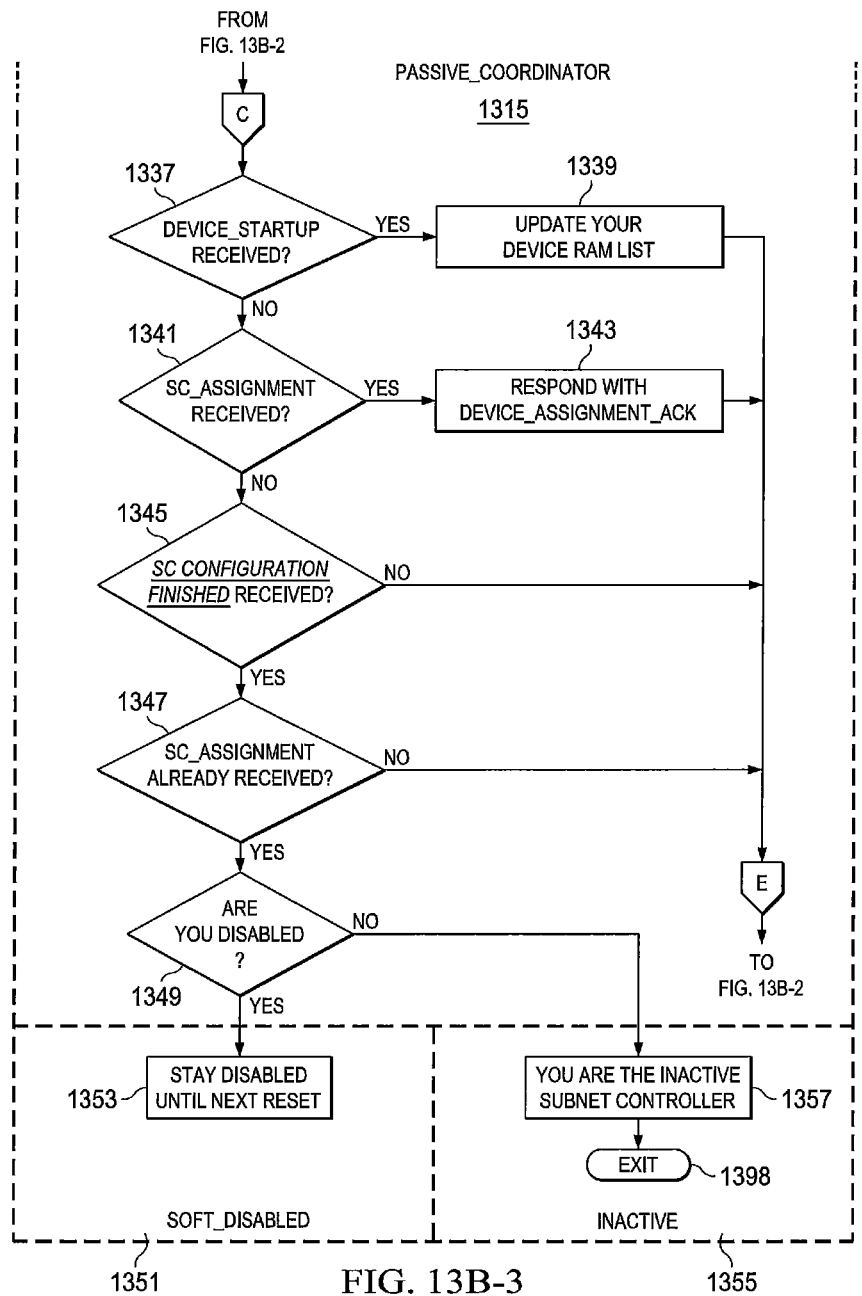
Figures 4, 13B:
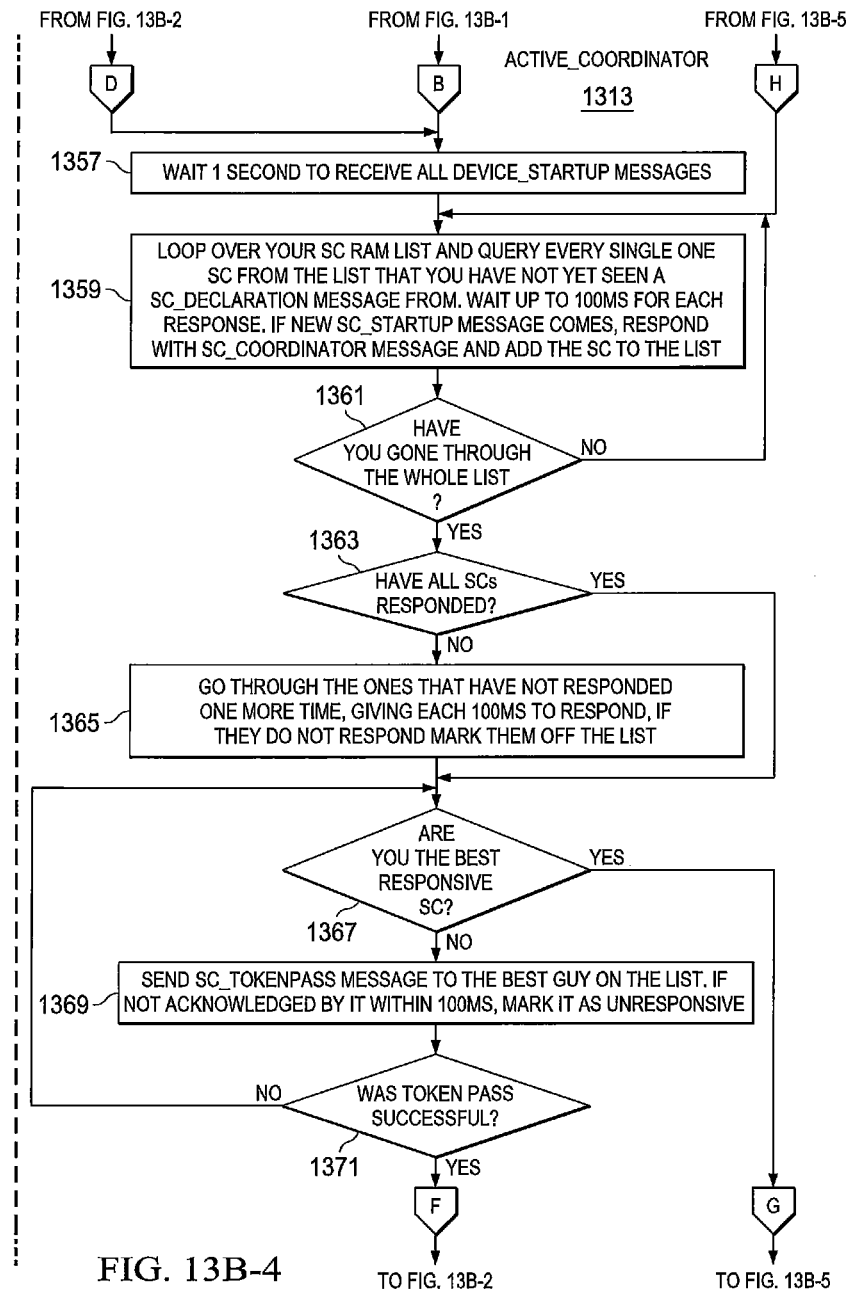

Turning now to FIGS. 13A and 13B, illustrated is a method generally designated 1300A that may run on a subnet controller, e.g., the SC 230, during subnet startup, e.g., during the SUBNET_STARTUP state. FIG. 13A, presenting a summary view of the method 1300A, is described first. FIG. 13B, described afterward, presents a more detailed flow chart 1300B of the method.

First addressing FIG. 13A, the method 1300A begins with a reset state 1301. The state 1301 may result from power-up or an appropriately configured reset command. A state 1303 provides pre-startup activity, e.g., startup messages to system devices 410 in the network 200. A state 1309 provides post-startup activity, e.g., arbitrating the aSC 230*a*. In some cases a system device 410 will be placed in a hard disable state 1307, for example when pre-startup activity indicates that the system device 410 is not functioning properly. After the post-startup state 1309, an SC 230 that is assigned the role of the aSC 230*a* during arbitration during the state 1309 proceeds to an active-coordinator state 1313. The aSC 230*a* may perform system administrative tasks in the state 1313. After the aSC 230*a* performs such administrative tasks the method 1300A proceeds to state 1379 at which point the aSC 230*a* broadcasts an aSC_heartbeat message, indicating that the aSC 230*a* has asserted control over its subnet. The method 1300A terminates with a state 1399, from which the aSC 230*a* continues with system control functions.

An SC 230 that does not become the aSC 230*a* advances in the method 1300A to a passive-coordinator state 1315. The SC 230 entering the state 1315 is assigned the role of iSC 230*i*. The iSC 230*i* performs various tasks in the state 1315 and may then advance to an inactive state 1355. In various embodiments the iSC 230*i* continues to receive messages in the inactive state 1355, and may perform some functions such as storing backup parameters from other system devices 410, but does not exert control over the subnet. In some cases the iSC 230*i* may advance to a soft disable state 1351, e.g. if commanded to do so by a suitable formatted message.

As described, FIG. 13B presents a more detailed flow chart of the method 1300A, generally designated in FIG. 13B as a method 1300B. During the pre-startup state 1303, the SC 230 may execute a step 1305, in which it may send several SC_startup messages according to the various embodiments described herein. In the post-startup state 1309, the SC 230 may perform the previously describe arbitration in a step 1311. If the SC 230 becomes the aSC 230*a*, it may in various embodiments be the first of multiple instances of the SC 230 on the subnet to broadcast an SC_coordinator message. In a step 1317, the SC 230 determines if it is indeed the first to broadcast the SC_coordinator message. If so, the SC 230 enters the active-coordinator state 1313, wherein it performs various administrative tasks 1357-1375. The SC 230 then advances to the heartbeat-out state, wherein it may broadcast the aSC_heartbeat message in a step 1377. The SC 230, now referred to as the aSC 230*a*, may perform various configuration steps 1381-1391 before exiting the method 1300B with an exit state 1399.

If in the step 1317 the SC 230 determines it is not the first SC 230 to send an SC_coordinator message, it branches to the passive-coordinator state 1315 described previously. The SC 230 may perform various configuration steps 1319-1347. In a step 1349, the SC 230 may determine that it is disabled. If so, the SC 230 may enter the soft-disabled state 1351 and remain therein until a reset. If the SC 230 is not disabled, it may enter the inactive state 1355, at which point it is referred to as the iSC 230*i*. The method 1300B exits with an exit state 1398.

Figures 1A, 13C:
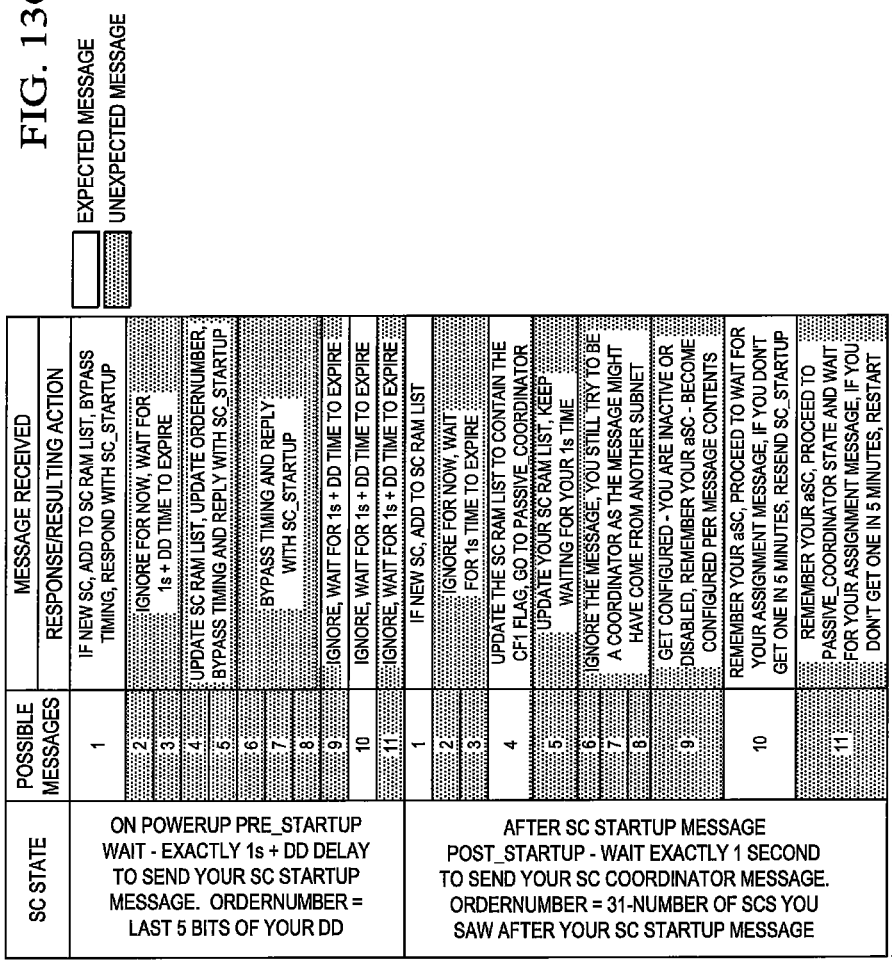
FIG. 13C is a state table an example state machine implementing a method of starting up a subnet controller.
Figures 1C, 13C:
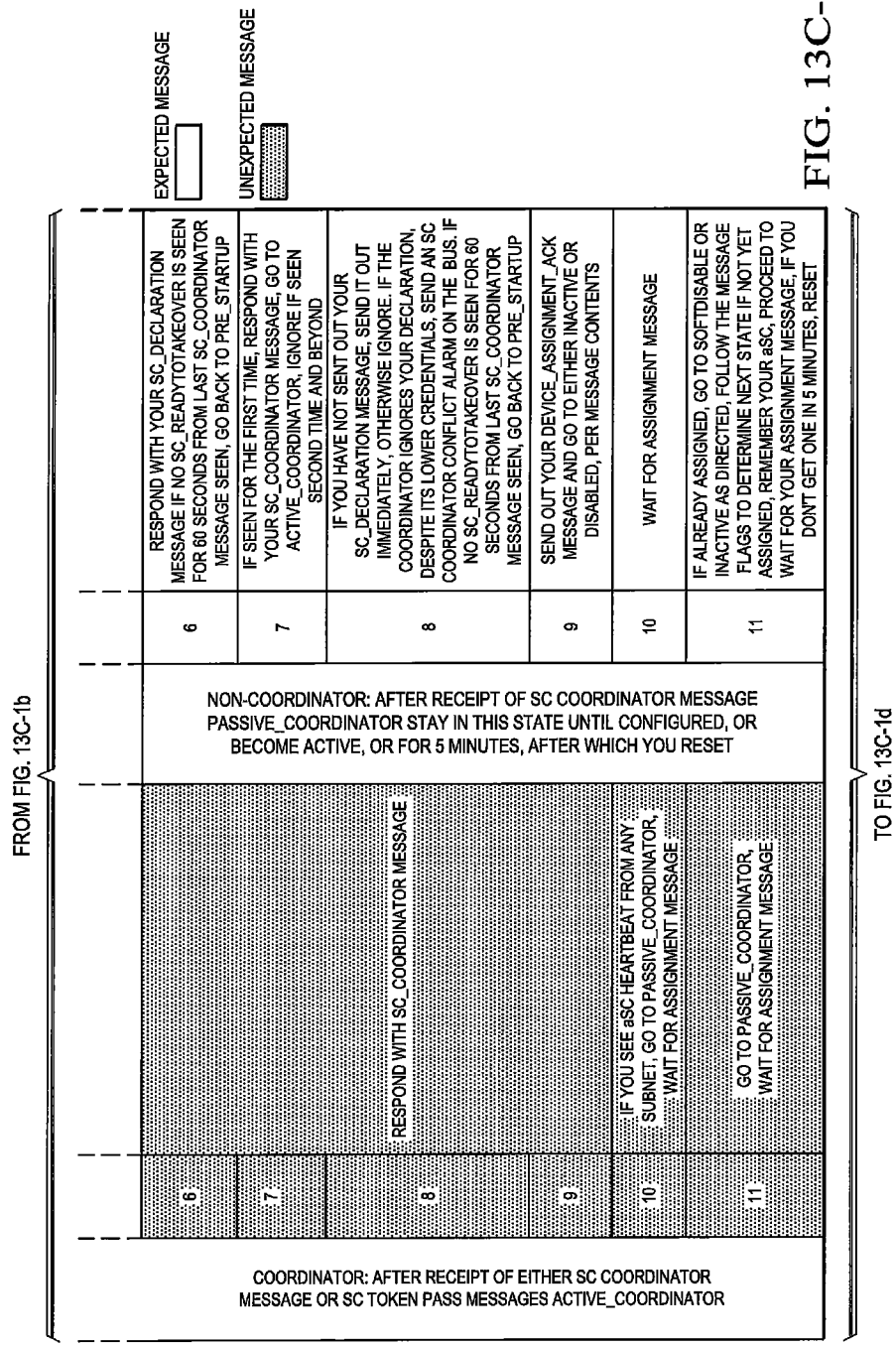
Figures 1E, 13C:
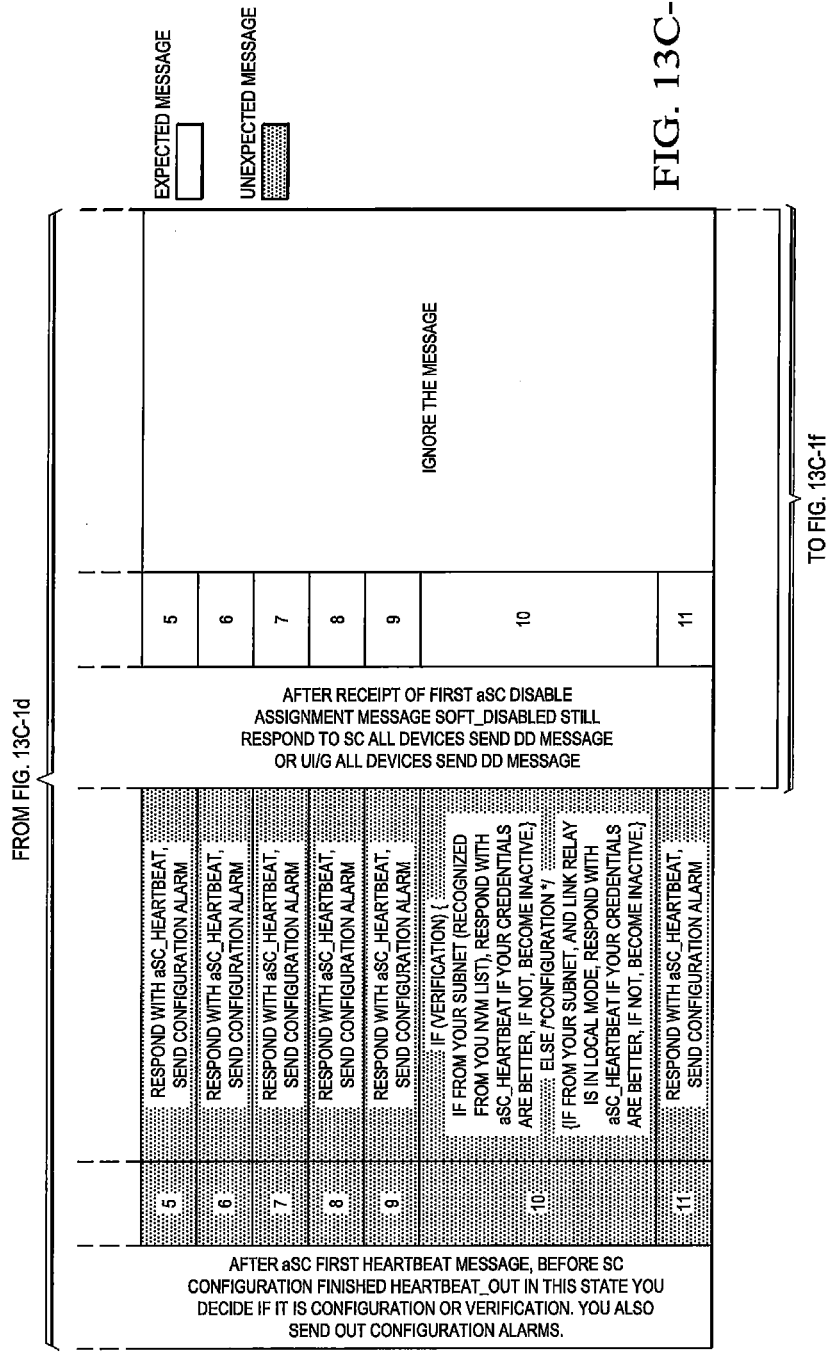

FIG. 13C presents without limitation an example embodiment of states of a state machine configured to implement a subnet controller startup process. Those skilled in the pertinent art will appreciate that the illustrated embodiment is one of many that may be used, and that such others are included in the scope of the disclosure.

In an advantageous embodiment, the controllers SC 230 do not queue inbound or outbound messages. Configuration times discussed below are presented without limitation for this case. Moreover, if a message is scheduled to be sent out at a specified time, in some embodiments only one attempt to send the message is made. The SC 230 does not automatically attempt to resend the message in such embodiments. However, the SC 230 may attempt to resend the message when a new specific time is scheduled to send the message after the send failure.

In an embodiment, the Subnet Controller startup sequence begins with the SC 230 issuing a SC_Startup message. The message may be sent at a consistent period after the SC 230 emerges from a reset state. In an example embodiment, the period is about 3000 ms plus a supplemental delay period derived from the Device Designator.

After performing a functional test of local NVM, e.g. the NVM 320, each SC 230 on the RSBus 180 listens for startup messages from other local controllers 290. The SC 230 records all Device Designators and configurations, e.g. Equipment Types and Subnet IDs, for all local controllers 290 on the network that send their startup messages.

After the supplemental delay period, e.g., about 1000 ms, the first SC 230 may attempt to send a second message, e.g., a SC_Coordinator message. In an example case in which there is no other traffic on the RSBus 180, the SC_Coordinator message appears on the RSBus 180 after about 1000 ms plus the time required to send the SC_Startup message onto the RSBus 180. Of course such timing is subject to imprecision determined by system-level design consideration. If the first SC 230 successfully broadcasts the SC_Startup message, it becomes the active coordinator, e.g., the aSC 230*a*, and proceeds to coordinate the system configuration. If the first SC 230 fails to send the SC_Startup message, or a second SC 230 successfully sends a message first, then the second SC 230 becomes the aSC 230*a* and the first SC 230 enters a PASSIVE_COORDINATOR state and becomes an inactive subnet controller, e.g. the iSC 230*i*.

The SC 230 may determine that it is a best subnet coordinator, e.g., has priority over other available instances of the SC 230 on the subnet 200, by querying such other instances to determine relative capability and features. The SC 230 may additionally take into account factors unrelated to features and capability. Such determination may include the following factors, presented by way of example without limitation:

1) Subnet Priority Level (SPL) (akin to a user selectable override)—the operator can chose to use a particular SC 230, even if it is deemed less advanced than others on the subnet 2) Device Product Level (DPL) (such as different tiers of capability based on cost)—an SC 230 with greater features or capability may be indicated by a product level number, with a greater number indicating a more capable SC 230

3) Its Protocol Revision Number (PRN)—a recent design revision of the SC 230 may be indicated by a higher revision number 4) Its Device Designator or Serial Number (DD/SN)—a greater number of the Device Designator or serial number may be generally associated with a more recently produced SC 230, which may be presumed to be more capable In some embodiments, the determination is made considering the above-listed factors in the order indicated. Thus, a first SC 230 with a greater DPL than a second SC 230 may take priority even if the second SC 230 have a greater PRN or DD/SN. In some embodiments, the SPL overrides all other factors. In some embodiments if all factors are otherwise equal, then the SC 230 with a greater Device Designator will take priority over any SC 230 with a lower Device Designator.

If the SC 230 determines that it is the most qualified SC 230 on the subnet 200, it proceeds to assume control of the subnet 200 by first issuing a SC_Ready_To_Take_Over message. After a predetermined period, e.g. about 1000 ms, the aSC 230*a* issues the aSC_Heartbeat message. Alternatively, if the aSC 230*a* determines it is not the most qualified SC 230 on the subnet 200, it will pass a token to the SC 230 that is determined to be the most qualified SC 230. The SC 230 passing the token becomes an inactive iSC 230*i*, and the SC 230 receiving the token becomes the aSC 230*a*.

When the aSC 230*a* assumes control of the subnet of the network 200, it determines if the subnet of the network 200 is in the CONFIGURATION mode or in the VERIFICATION mode and proceeds to configure the system accordingly. If the subnet of the network 200 is in the VERIFICATION mode, the aSC 230*a* issues alarms for all missing and new local controllers 290. New local controllers 290 will be excluded from the subnet of the network 200 and placed in the SOFT_DISABLED state. The aSC 230*a* may also check the validity of the configuration of the subnet of the network 200 and issue appropriate alarms if needed. If the subnet of the network 200 is configured correctly, the aSC 230*a* concludes the SUBNET_STARTUP process by issuing an aSC_Change_State message.

In some cases there may be more than one SC 230 on a single subnet of the network 200 capable of controlling the subnet. In this case, an arbitration algorithm may arbitrate among the eligible SCs 230 to determine which SC 230 will assume the role of the aSC 230*a*. The algorithm may consider various factors, including, e.g., for each eligible SC 230 the CF1 flag setting, defined below, a Subnet Priority Level, a Device Product Level, and a hardware revision number. A Subnet Priority Level may be, e.g., an identifier that allows for overwriting the priority level of an SC 230. In some embodiments the Subnet Priority Level of each SC 230 is set to 0 in the factory and can only be changed by a specific sequence of messages sent by the Interface/Gateway 250. The Device Product Level may be, e.g., a designation of a level of feature configuration, such as Signature, Elite or Merit product lines. After the system 100 is configured, all aSCs 230*a* run the normal operation of their respective network subnets.

In various embodiments each SC 230 in the system 100 stores the Device Designators of all other configured SCs 230 in the system 100. Each SC 230 may also store its last active, inactive or disabled state.

Recalling that each message includes a message ID, the ID of the DEVICE_Startup message is unique to the message being sent. The message data field of the local controller 290 may be identical to the data field of DEVICE_Device_Designator messages sent by that local controller 290. Since these messages may be Class 3 messages, as described previously, they may have RSBus Message IDs that are formed from an offset number and a 5-bit Order Number. In an example embodiment, the Order Number of a particular local controller 290 is the 5 least significant bits of the Device Designator of that local controller 290.

For example, if the DEVICE_Startup message is 0x700 and the last byte of Device Designator is 0x45 then the message ID of the DEVICE_Startup message may be 0x700+ (0x45 & 0x1F)=0x700+0x05=0x705.

For Class 5 messages that include the 5-bit Order Number, the position of the Order Number in the message ID may be shifted left by one position so as to prevent interference with the position of the Transport Protocol bit C5MID0/TP. The Order Number of the SC 230 may also be a number calculated from the number of other SCs detected on the subnet.

All startup messages, e.g., DEVICE_Device_Designator and SC_Coordinator messages, can contain seven Configuration Flags, CF0-CF6. The encoding of these flags may vary depending on the device type. For example, the flags of the SCs 230 may be encoded differently than other local controllers 290.

In some embodiments, for the local controllers 290 that are not an SC 230 the flags may be encoded as follows:
CF0: 0 if the local controller 290 has not been configured (e.g. is a new device)
  1 if Installer Test Mode tests complete successfully, or upon receipt of an aSC_Change_State message indicating transition to Normal Operation
CF1: 0 if the control is intended for permanent use
  1 if it is attached temporarily
CF2: 0 if the local controller 290 cannot be flashed over the RSBus 180
  1 otherwise
CF3: 0 if the local controller 290 is hard disabled/not-communicating
  1 if the device is hard enabled/communicating
CF4: 0 if the local controller 290 is soft disabled, or was soft disabled immediately prior to sending this message, when this message is sent in the Subnet Startup state
  1 otherwise
CF5 0 if the local controller 290 is a factory installed part
  1 if the local controller 290 is a replacement part
CF6: 0 if the local controller 290 has failed the Data CRC check
  1 otherwise In some embodiments, for the local controllers 290 that are an SC 230 the flags may be encoded as follows:
CF0: 0 if the SC 230 has not been configured, e.g. is a new device
  1 upon successful completion of Installer Test Mode tests
CF1 0 if the SC 230 does not recognize any indoor units on the subnet
  1 if the SC 230 recognizes at least one indoor unit on the subnet
CF2 0 if the SC 230 cannot be flashed over RSBus 180,
  1 otherwise
CF3 0 if the SC 230 is hard disabled/not-communicating
  1 if the SC 230 is hard enabled/communicating,
CF4 0 if the Subnet Controller is soft disabled, or was soft disabled immediately prior to sending this message
  1 otherwise As described above, the CF0 flag may be used as an indication of the whether an associated local controller 290 has been configured. The CF0 flag may be cleared (0) in all local controllers 290 under the following circumstances, e.g.:
  When all device parameters revert to default values, such as via a specific diagnostic inquiry/command.
  When the device is restored to factory defaults via a specific diagnostic inquiry/command.
  When the device loses its internal NVM settings, as described below.

At any time and regardless of the CF0 flag setting, if the local controller 290 enters the COMMISSIONING state and either the UI/G 250 or the aSC 230*a* attempt to change settings on the local controller 290, the local controller 290 complies with the changes.

In various embodiments, the system 100 enters the CONFIGURATION mode or the VERIFICATION mode described previously. In an embodiment the system 100 may only enter the CONFIGURATION mode when the CF0 flag is reset (0) for all native SCs 230 on the subnet. A non-native SC 230 may enter the CONFIGURATION mode when either its CF0 bit or the CF1 bit is reset. As used herein a native SC 230 is an SC 230 that was present in the subnet during the most recent subnet configuration. A non-native SC 230 is an SC 230 that was not present, and was this not detected and is not remembered by other instances of the SC 230 in the subnet. As described above, the CF1 flag is set when it recognizes a configured indoor unit on its subnet 200. If these conditions for entering the CONFIGURATION mode are not present, the system 100 may be placed in the VERIFICATION mode by a SC 230 on the subnet 200.

If a Bit Error is detected when sending the startup message, e.g., DEVICE_Startup, the message is resent after a predetermined delay time in various embodiments. The delay time may be computed by an algorithm that employs the Device Designator. In one embodiment, the Device Designator field is parsed into 4-bit portions, each being a contiguous subset of bits of the Device Designator. If the Device Designator field is 32 bits, e.g., eight successive portions are thereby obtained. For brevity the bits of the Device Designator field are represented as DD[0]-DD[31]. In an example, the value of each 4-bit portion is incremented by 1, with the result being multiplied by 4 ms to determine a delay time associated with that portion. In an embodiment, the eight successive portions are associated with delay times as indicated below:
  DD[0]-DD[3]: Startup Delay
  DD[4]-DD[7]: First Resend Delay
  DD[8]-DD[11]: Second Resend Delay
  DD[12]-DD[15]: Third Resend Delay
  DD[16]-DD[19]: Fourth Resend Delay
  DD[20]-DD[23]: Fifth Resend Delay
  DD[24]-DD[28]: Sixth Resend Delay
  DD[29]-DD[31]: Seventh Resend Delay If the message is not successfully sent after the eight attempts, subsequent delivery attempts may continue to be made repeating the eight resend delays. In some cases, the message may be resent up to a predetermined maximum, e.g. 255. If the message is not successfully sent within the predetermined maximum, the local controller 290 may be configured to disengage from the subnet 200, e.g. enter a passive state. The local controller 290 may further be configured to execute the message send/retry cycle again after a predetermined delay period, e.g., about 5 minutes.

As described previously with respect to FIG. 5, in some embodiments a single physical device may include multiple logical devices. In cases in which a physical device contains more than one logical device, it may be preferable to limit all logical devices to be configured to the same subnet 200.

Generally each logical device, e.g., the aSC 470, the user interface 480 and the comfort sensor 490, sends out its own DEVICE_Startup messages.

Generally, logical devices are configured separately by messages sent by the aSC 230a. In the case of a system device 410 that includes multiple logical devices, the aSC 230a assigns the same Subnet Identifier to each logical device. Taking the thermostat 590 (FIG. 5) as an example, the aSC 230a may assign the Equipment Type and the Subnet Identifier to the aSC 510. The aSC 230a may then also assign the same Subnet Identifier to the user interface 520 and the comfort sensor 530 via instances of an assignment message, e.g., aSC_DEVICE_Assignment. Each logical device may also respond with its own message acknowledging the assignment message, e.g., a DEVICE_Assignment_Acknowledge message.

As described previously, each local controller 290 may have an associated NVM, e.g., the NVM 320 (FIG. 3). In some cases, the NVM may become corrupted. In various embodiments the contents of the NVM of each local controller 290 are archived by each SC 230 on the subnet of the network 200. Each SC 230 may also archive the last active, inactive and disabled state of each local controller 290. The contents of a corrupted NVM may then be restored using archival copies of the contents stored on any SC 230. Additionally, in some cases a local controller 290 may archive application-specific data on one or more of the SCs 230. For example, a local controller 290 may have associated data values that represent special parameters. During the COMMISSIONING state, the local controller 290 may archive the parameters on the one or more SCs 230. Then, in various embodiments the SC 230 is configured to restore the contents of the NVM on a local controller 290 that has determined the contents thereof are corrupt.

In some embodiments a local controller 290 maintains a local copy of the NVM data. The local controller 290 so configured may recover its NVM data without intervention from an SC 230. The local controller 290 may be configured to restore the contents of its NVM without changing its apparent behavior to other local controllers 290 in the system 100. The local controller 290 may be further configured to verify the integrity of the NVM contents before sending a DEVICE_Startup message.

In an embodiment, when participation by an SC 230 is needed to recover NVM data, the recovery process may be performed by the device itself in conjunction with the aSC 230a. Four example failure modes are described without limitation to demonstrate various features of the embodiment.

In a first case, the data stored on the local controller 290 NVM is corrupt, but a locally archived copy is valid. In this case, the device may recover the data from its internal backup in a manner that does not affect its apparent operation as viewed by the other local controllers 290. In an advantageous embodiment, no indication is given to the other local controllers 290, and control of the affected local controller 290 is unaffected.

In a second case, the data stored on the local controller 290 NVM is corrupt, but a locally archived copy is not valid, or no copy is locally stored. However, the aSC 230a stores correct values for the device. In this case, the local controller 290 may send a message, e.g., the DEVICE_Startup message, sent on Subnet 0, using the default Equipment Type for that local controller 290, with the CF6 flag cleared. It responds to all SC_Coordinator messages using the same message until a new Equipment Type and Subnet ID are assigned to it. As long as the NVM data are not recovered the CF6 flag remains reset. Once an aSC 230a takes over, it proceeds to assign the Equipment Type and Subnet ID to the local controller 290 as usual, which the local controller 290 stores internally. The aSC 230a recognizes the local controller 290 using its Device Designator and may assign the same Equipment Type and Subnet ID as previously assigned thereto. The local controller 290 may initially restore NVM data to default values stored in the device flash. The aSC 230a may in parallel enter the COMMISSIONING state to reprogram the local controller 290 with the data from its backup. The local controller 290 will typically replace any default values it may have placed in the NVM with data provided by the aSC 230a.

In a third case, the archival data stored on the aSC 230a is corrupt. In this case, the aSC 230a may enter the VERIFICATION mode. In this state, the aSC 230a may obtain all data from associated local controller 290 as is normally obtained during verification. In some embodiments, the aSC 230a may instruct the local controller 290 to provide more data than is normally provided during the verification.

Finally, in a fourth case, the data stored on the local controller 290 and the archival data stored on the aSC 230a is corrupt. In this case the local controller 290 may restore the NVM to default values. The aSC 230a may obtain the default data as described for the third case.

Figure 14:
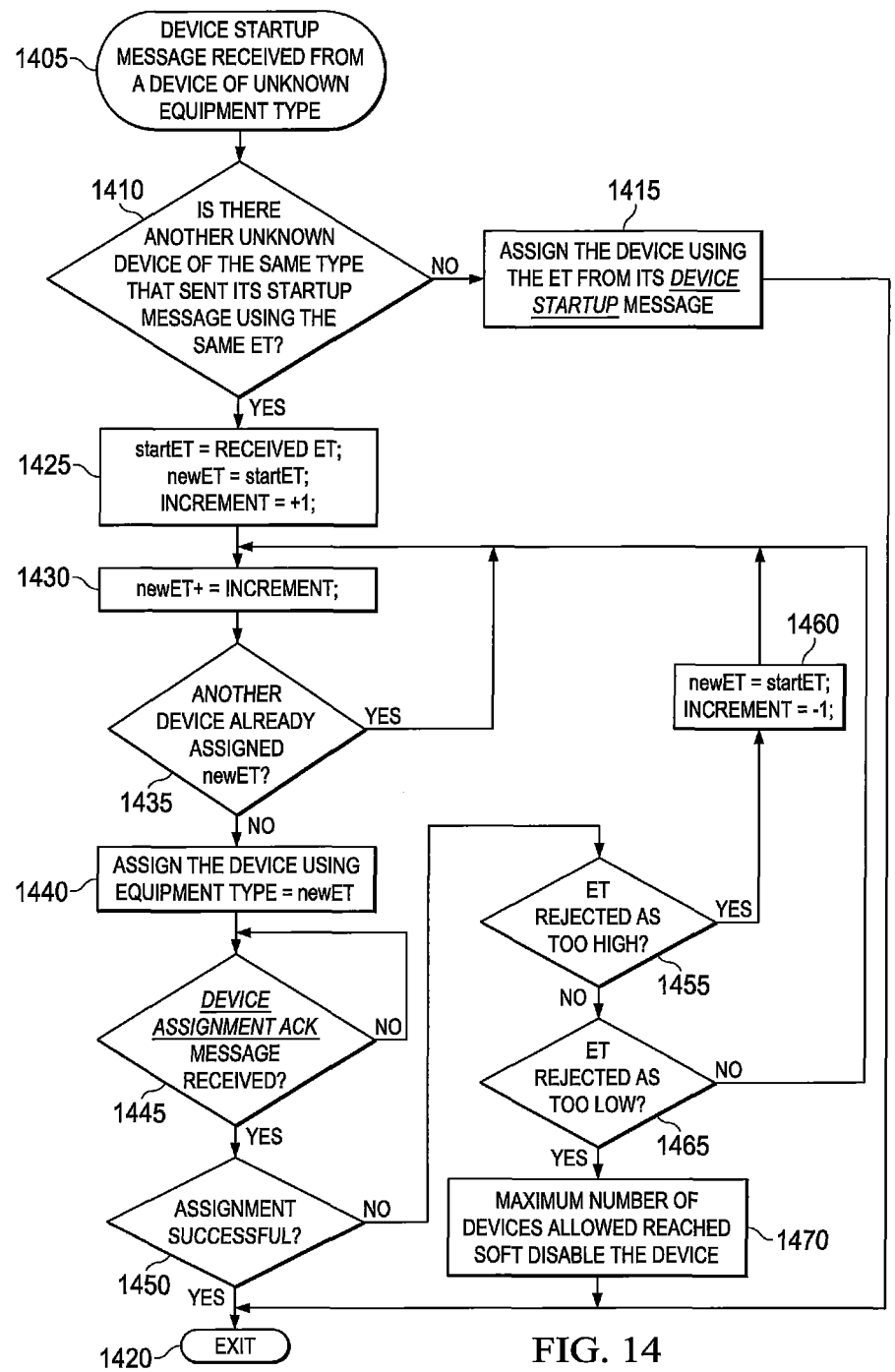
FIG. 14 is a method of the disclosure illustrating an algorithm that may be employed by a subnet controller to assign Equipment Type to a device.

Turning now to FIG. 14, illustrated is a method, generally denoted 1400, of an algorithm that may be employed by the aSC 230a to assign the Equipment Type to such a local controller 290. The method 1400 is representative of cases in which a device has an Equipment Type unknown to the aSC 230a.

In step 1405, the aSC 230a receives a startup message, e.g. DEVICE_Startup, from a local controller 290 having an unknown Equipment Type. In a branching step 1410, the aSC 230a determines if another unknown local controller 290, that has the same Equipment Type as the current unknown Equipment Type, has previously sent a startup message. If not, the method 1400 advances to a step 1415. In the step 1415, the aSC 230a assigns to the local controller 290 the Equipment Type provided by the local controller 290 in its startup message, and then ends with a step 1420.

If in the step 1410 the aSC 230a determines in the affirmative, then the method 1400 advances to a step 1425. In the step 1425, a variable startET is set equal to the value of the Equipment Type received from the unknown local controller 290 in the startup message. A variable newET is set equal to the value of startET. A variable Increment is set to +1. The method 1400 advances to a step 1430, in which the value of Increment, presently +1, is added to newET.

In a decisional step 1435, if it is determined that there is another local controller 290 that has already been assigned the Equipment Type value currently stored by newET, the method returns to the step 1430, where newET is again incremented. If instead it is determined in the step 1435 that there is not a local controller 290 with the Equipment Type held by newET, the method 1400 advances to a step 1440, in which the aSC 230a assigns the value of newET to the Equipment Type of the unknown local controller 290.

In a decisional step 1445, the aSC 230a waits for an acknowledgement from the unknown local controller 290, e.g., via a DEVICE_Assignment_Ack message. When the acknowledgement is received, the method 1400 advances to a decisional step 1450, in which it is determined whether the assignment was successful. If the assignment was successful, the method 1400 ends at the step 1420.

If in the step 1450 it is determined that the assignment was not successful, the method 1400 advances to a decisional step 1455. If it is determined that the Equipment Type was rejected as being too high, the method 1400 advances to a step 1460, in which newET is set equal to startET and the value of Increment is set to −1. The method then returns to the step 1430.

If instead in the step 1455 it is determined that the Equipment Type is not rejected as too high, the method 1400 advances to a decisional step 1465 where it is determined if the Equipment Type is rejected for being too low. If the Equipment Type is not rejected as being too low, this condition represents the case, e.g., that there is another device already assigned the Equipment Type value. The method 1400 returns to the 1430 where newET is again incremented. If, on the other hand, it is determined in the step 1465 that the Equipment Type was rejected for being too high, the method advances to a step 1470. The step 1470 establishes that the maximum number of devices is present in the system 100. The unknown local controller 290 is set to a SOFT_DISABLED state, and the method 1400 ends with the step 1420.

In one advantageous embodiment, the disclosure provides for a method of replacing controls in an HVAC system. In some circumstances, a controller, e.g., the UI/G 250, may need to be replaced in an installed and configured HVAC system, e.g., the system 100. Manual configuration and calibration of the new controller by the installer would be time consuming and expensive to the user of the system 100.

In an embodiment, settings for the SC 230 are provided by an archived copy by another SC 230 as described previously. Each subnet controller, e.g., the SC 230, stores the Device Designator and equipment serial and part numbers for each device in the network, e.g., the network 200. The Device Designator and equipment serial and part numbers of an original local controller 290 may be assigned and stored on the local controller 290 at a manufacturing or assembly facility, e.g. However, the equipment serial and part numbers may be left blank for a replacement local controller 290. The missing equipment serial and part numbers and a set CF5 flag, as describe above, identify the replacement local controller 290 as such to the SCs 230 on the network 200. The CF5 flag may be provided by the replacement local controller 290 via a DEVICE_Startup message, e.g. Thus, the aSC 230*a* may configure the replacement local controller 290 with all pertinent parameter values, as well as the equipment serial and part numbers, all previously archived from the replaced local controller 290. This approach significantly simplifies the replacement of local controllers 290 on the network 200.

In an example embodiment, the aSC 230*a* categorizes the replacement local controller 290 based on the Device Designator actually stored thereon, rather than based on the archived Device Designator of the replaced local controller 290. The aSC 230*a* determines that the replacement local controller 290 is a replacement part by the presence of the set CF5 flag, as described previously, and the lack of a local controller 290 on the subnet 200 that corresponds to the replacement local controller 290. In the VERIFICATION mode, the replacement local controller 290 is placed in a SOFT_DISABLED state. The configuration of the replacement local controller 290 with the archived data from the replaced local controller 290 is performed during the COMMISSIONING state. Optionally, an alarm may be generated by the aSC 230*a* indicating that the replaced local controller 290 is missing.

In an embodiment, during the COMMISSIONING state the aSC 230*a* may verify that the replacement local controller 290 is compatible with the replaced local controller 290 with the participation of a user or installer. For example, the aSC 230*a* may prompt the user to automatically configure the replacement local controller 290 by listing a set of equipment serial and part numbers for each of the replacement local controller 290 and the replaced local controller 290. The user may then be prompted to copy the archived values of all data, including all pertinent parameters and the equipment serial and part numbers onto the replacement local controller 290. If the user accepts, then the configuration data are automatically copied to the replacement local controller 290. In another embodiment, the user declines to automatically overwrite the configuration data of the replacement local controller 290, and may enter desired configuration data via a UI/G 250.

When a new local controller 290 is added to the subnet of the network 200, this condition may be determined by the aSC 230*a* by the presence of a reset CF5 flag, and a Device Designator that does not match a local controller 290 already present on the subnet. In such a case, the equipment serial and part numbers are undisturbed in the COMMISSIONING state. However, as before the new local controller 290 may be placed in the SOFT_DISABLED state in the VERIFICATION mode. The CF5 flag may be protected against casual change. In some cases, the CF5 flag may only be changed in a privileged mode, e.g., an OEM test.

In various embodiments of the system 100 normal operation involves the delivery of DEVICE_Status messages and service demand messages by the aSC 230*a*. A demand message may be expressed in terms of a percent of a full capacity of a demand unit 155. A staged demand unit 155 may round off a percent of demand communicated to it to a value associated with a nearest stage capacity. In some embodiment the aSC 230*a* is configured to know values associated with the stages of a particular staged demand unit 155, and may provide demand messages consistent with these values. In some embodiments a demand message targeting a demand unit 155 that includes a blower or similar device contain a blower override value. The demand unit 155 may change a blower speed from a default value associated with the requested demand level in response to the override value. An override value of 0 may indicate that the default may be used.

In some embodiments, a heating demand is mutually exclusive of a cooling demand. In cases of simultaneous demands that are not prohibited, a blower speed may default to a highest CFM value of the demands associated with the multiple demands. In one example, the configuration of the system 100 is changed from cool plus blower to blower only. A blower demand message may be sent with a desired blower level, followed by a cooling demand message that causes a compressor to cease operation.

In various embodiments, the aSC 230*a* tracks the availability of capacity of the demand units 155. If for some reason a service, e.g., cooling, provided by a demand unit 155 becomes unavailable, the aSC 230*a* may clear demand messages that request that service.

Each local controller 290 is configured to transmit its own status on the RSBus 180 using the DEVICE_Status message. In various embodiments all DEVICE_Status messages share the same first two bytes regardless of equipment type. These two bytes may contain alarm and service status information. Each bit in the service status byte (service bits) will be '1' if the service provided by the demand unit 155 associated with the local controller 290 is available, or if the local controller 290 sending the message does not know status of the service. The following device status table illustrates the principle:

| Device | Fan | Gas Heat | Electric Heat | Heat Pump Heat | Cooling | Humidification | Dehumidification |
|---|---|---|---|---|---|---|---|
| Comfort Sensor | 1 | 1 | 1 | 1 | 1 | 1 | 1 |
| Furnace | 1 | 1 | 1 | 1 | 1 | 1 | 1 |
| Heat Pump | 1 | 1 | 1 | 1 | 1 | 1 | 1 |
| Dehumidifier | 1 | 1 | 1 | 1 | 1 | 1 | 1 |
| Logical AND | 1 | 1 | 1 | 1 | 1 | 1 | 1 |

Each row of the table represents a device status vector maintained by the corresponding system device. Each column of the table represents a potential service provided by the corresponding system device. A potential service is a service that may be provided by the system 100 when the system 100 is appropriately configured. The system 100 need not actually be configured to provide the service. Also, each system device typically only provides a subset of the potential services, and may only provide a single service.

If the service is not available the bits of the service status byte are set to '0'. The aSC 230a receives the service bytes from all the various system devices 410 on the subnet 200 and performs a logical AND (any device sending a '0' will result in the service being unavailable). In an embodiment, each alarm associated with a status bit modifies the status bit when the alarm is active. Thus, for example, an alarm condition of the furnace 120 may result in the associated status bit of the furnace 120 being set to "0" to indicate the furnace is unavailable. The following device status table illustrates the principle:

| Device | Fan | Gas Heat | Electric Heat | Heat Pump Heat | Cooling | Humidification | Dehumidification |
|---|---|---|---|---|---|---|---|
| Comfort Sensor | 1 | 1 | 1 | 1 | 1 | 1 | 1 |
| Furnace | 1 | 0 | 1 | 1 | 1 | 1 | 1 |
| Heat Pump | 1 | 1 | 1 | 1 | 1 | 1 | 1 |
| Dehumidifier | 1 | 1 | 1 | 1 | 1 | 1 | 1 |
| Logical AND | 1 | 0 | 1 | 1 | 1 | 1 | 1 |

Each bit that indicates the unavailability of a service, e.g. "0", may be reset to a state indicating the service is available, e.g., "1" when an alarm condition related the unavailable service clears. The alarm may clear after the expiration of a predetermined interval, e.g. an "alarm timeout", or the alarm may clear if reset by intervention of an operator, e.g., via the UI 240.

This method advantageously simplifies maintenance of the system 100 by rendering it unnecessary to modify the device status in many cases when a system device is replaced. The method also eases system expansion by the manufacturer.

Each alarm may be an event-type alarm or a continuous-type alarm. An event-type alarm has a timeout associated with it, while a continuous alarm is active as long as the alarm condition persists.

The aSC 230a may then transmit its DEVICE_Status message including the combined results of all other local controllers 290 and the service byte of the aSC 230a. The aSC 230a may then stop the demand corresponding to the service bit set to '0'. The demand may not be restarted until all devices restore the service bit and the resulting AND is equal to '1'. The demands from the same demand group (e.g. heating) can be substituted. In an embodiment if a heat pump service is not available and the system requires heating, gas heating or auxiliary electric heating may be used instead. In such a case, the aSC 230a may issue appropriate gas heating or electric heating demands.

The service bits may be set in all DEVICE_Status messages in all possible device states. In an embodiment of a routine VERIFICATION mode startup, the service bits are published by a particular local controller 290 on the RSbus 180 upon receipt by that local controller 290 of the first aSC_Change_State message after reset. Alternatively, the service bits may be published upon receipt by the publishing local controller 290 of an aSC_Assignment message after an asynchronous device reset. The service bits may be continuously updated to match the state of the service as determined by the local controller 290.

Figure 15:
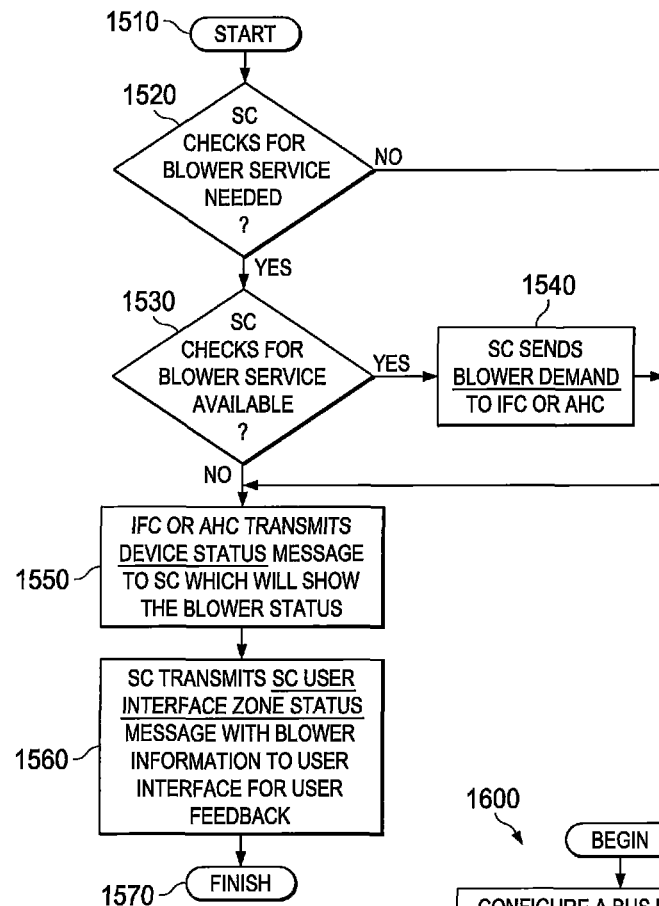
FIG. 15 is a method of the disclosure of conducting a dialog between a subnet controller and a demand unit according to the disclosure.

FIG. 15 illustrates without limitation a method generally designated 1500 that is illustrative of a dialog between the aSC 230a and a demand unit 155, e.g., an Integrated Furnace Control (IFC) or an Air Handler Control (AHC). Command messages are represented by underlined text. The method 1500 should not be considered a programming model or all-inclusive, but only as example to illustrate various principles of the disclosure.

The method 1500 begins with a step 1510. In a step 1520 the aSC 230a determines if blower service is needed. If yes, the method advances to a step 1530, in which the aSC 230a determines if blower service is available. If the blower service is available, the method advances to a step 1540. In the step 1540 the aSC 230a sends a Blower_Demand message to the IFC or AHC, as appropriate. The method 1500 then advances to a step 1550. In the step 1550, the IFC or AHC transmits a DEVICE_Status message to the aSC 230a that includes the status of the blower. In a step 1560 the aSC 230a then sends a SC_UI_Zone_Status message to the UI 240 to provide feedback to the user/operator. If in the step 1530 the aSC 230a determines that blower service is not available, the method 1500 advances directly to the step 1550 without issuing a Blower_Demand message. The method 1500 ends with a step 1570.

Messages between any UI 240 and the aSC 230a may be sent as a Class 1 message. In various embodiments Class 1 messages have priority over other messages, thus potentially reducing message latency. In most cases a display screen of the UI 240 is not updated with data directly from user input, but with data returned from the aSC 230a in response to the messages generated by the UI 240 in response to the user input. Exceptions to this general rule include cases in which a user selection results in altered equipment operation, such as a mode change. In that case, the user input may be buffered at the UI 240 until the selection is finalized, which may be either explicit or by timeout. Once the user selection is finalized, the UI 240 may send a message to the aSC 230a in response to the selection.

Local controllers 290 may be configured to promptly reply to a demand message. In an example embodiment, the local controller 290 acknowledges receipt of the demand message within about 100 ms by broadcasting a DEVICE_Status message. The DEVICE_Status message may have the Acknowledge bits set to 01b (ACK) if the message is positively acknowledged. Other aspects of the message may be otherwise unchanged from the case that no acknowledgment is made. A 0% demand is typically acknowledged in the same manner as non-zero demands. For a staged demand unit 155, a demand below its minimum range may be treated as a 0% demand. In general, a demand message above 100% may be treated as a 100% demand.

Figure 16:
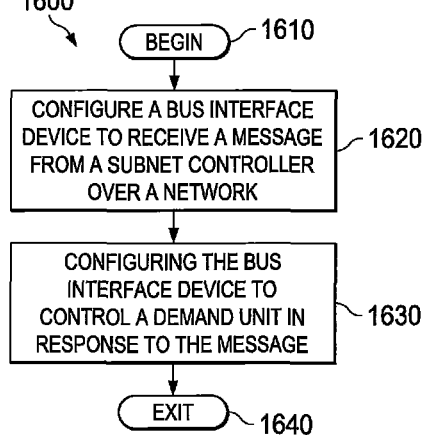
FIGS. 16-24 illustrate various methods of the disclosure.

Turning now to FIG. 16, illustrated is a method of the disclosure generally designated 1600 of manufacturing a subnet controller of an HVAC data processing and communication network. The method 1600 begins with an entry state 1610. In a step 1620, a bus interface device, e.g., the local controller 290, is configured to receive a message from a subnet controller over the network. The subnet controller may be, e.g., the aSC 230a. In a step 1630, the bus interface device is configured to control a demand unit in response to the message. The method 1600 ends with an exit state 1640.

Figure 17:
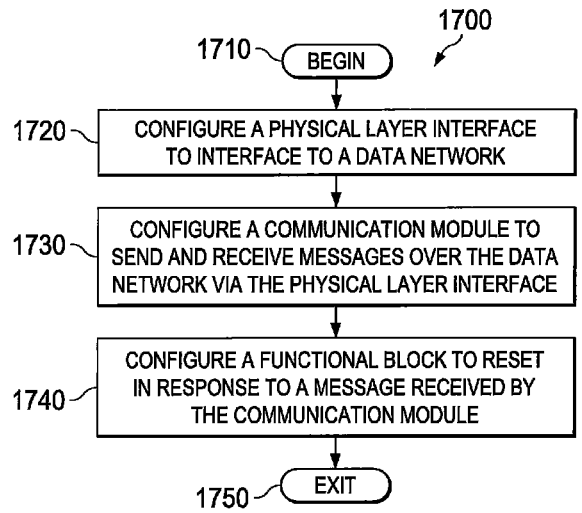

FIG. 17 illustrates another method of the disclosure generally designated 1700 of a method of manufacturing a bus interface device networkable in an HVAC data processing and communication network. The method 1700 begins with an entry state 1710. In a step 1720, a physical layer interface, e.g., the PLI 310, is configured to interface to a data network, e.g., the RSBus 180. The physical layer interface may be located, e.g., on an active subnet controller such as the aSC 230a. In a step 1730 a communication module, e.g. the communication module 340, is configured to send and receive messages over the data network via the physical layer interface. The communication module may be located, e.g., on a bus interface local controller 290. In a step 1740 a functional block, e.g., the functional block 350, is configured to reset in response to a message received by the communication module. The functional block may be located on the same bus interface device as the communication module. The method 1700 ends with an exit state 1750.

Figure 18:
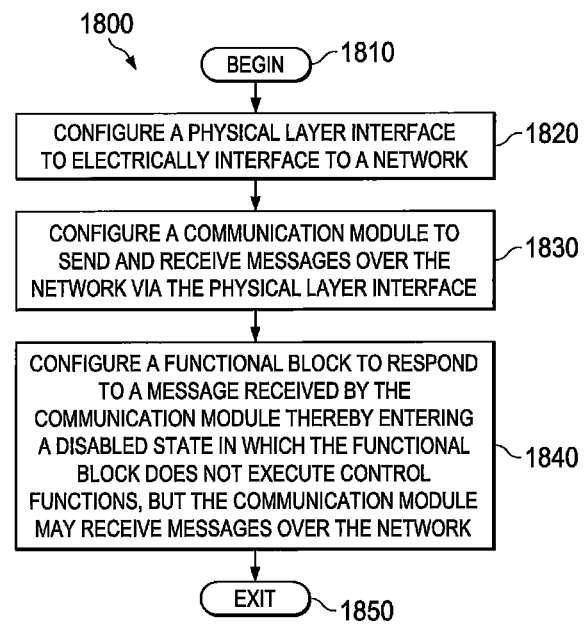

FIG. 18 illustrates another method of the disclosure generally designated 1800 of a method of manufacturing a subnet controller of an HVAC data processing and communication network. The method 1800 begins with an entry state 1810. In a step 1820, a physical layer interface, e.g., the PLI 310, is configured to electrically interface to the network. In a step 1830, a communication module, e.g., the communication module 340, is configured to send and receive messages over the network via the physical layer interface. In a step 1840, a functional block, e.g., the functional block 350, is configured to respond to a message received by the communication module. The functional block thereby enters a disabled state in which the functional block does not execute control functions, but the communication module may receive messages over the network. The method 1800 ends with an exit state 1850.

Figure 19:
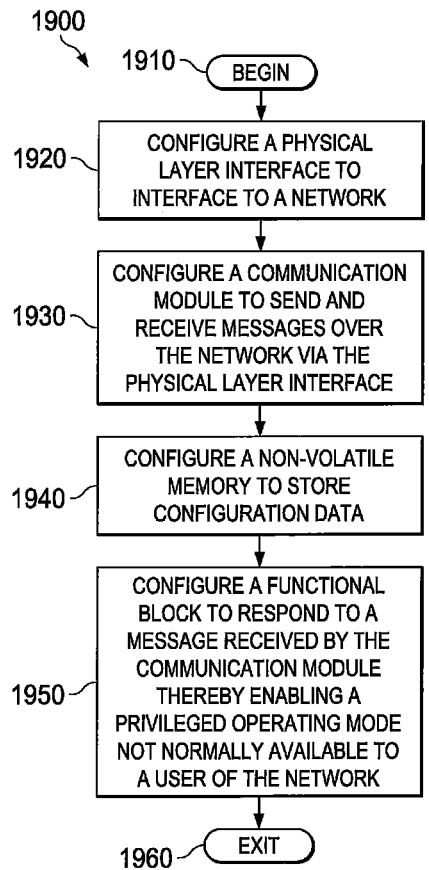

FIG. 19 illustrates a method generally designated 1900 of manufacturing a device networkable in an HVAC data processing and communication network. The method 1900 begins with an entry state 1910. In a step 1920, a physical layer interface is configured to interface to a network. The physical layer interface may be, e.g., the PLI 310. In a step 1930, a communication module, e.g. the communication module 340, is configured to send and receive messages over the network via the physical layer interface. In a step 1940, a non-volatile memory is configured to store configuration data. The non-volatile memory may be, e.g., the NVM 320. In a step 1950, a functional block, e.g., the functional block 350, is configured to respond to a message received by the communication module thereby enabling a privileged operating mode not normally available to a user of the network. The method 1900 ends with an exit state 1960.

Figure 20:
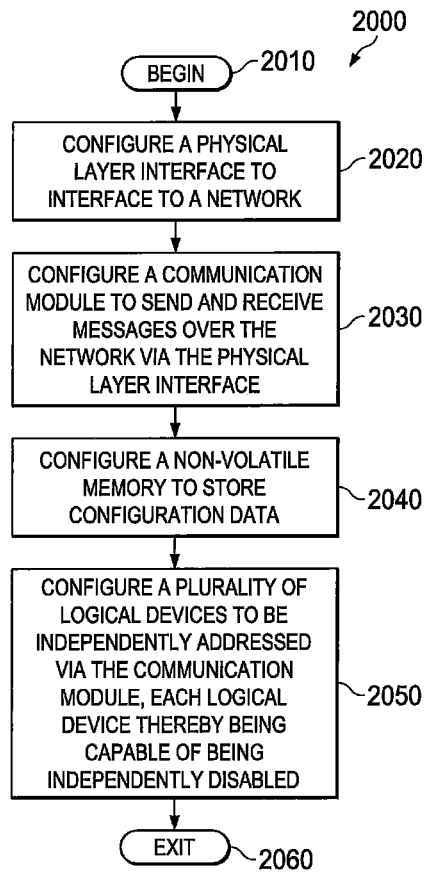

FIG. 20 illustrates a method generally designated 2000 of manufacturing a device networkable in an HVAC data processing and communication network. The method 2000 begins with an entry state 2010. In a step 2020, a physical layer interface is configured to interface to the network. The physical layer interface may be, e.g., the PLI 310. In a step 2030, a communication module, e.g. the communication module 340, is configured to send and receive messages over the network via the physical layer interface. In a step 2040, a non-volatile memory, e.g., the NVM 320, is configured to store configuration data. In a step 2050, a plurality of logical devices is configured to be addressable via the communication module. Each logical device is thereby capable of being independently disabled. The method 2000 ends with an exit state 2060.

Figure 21:
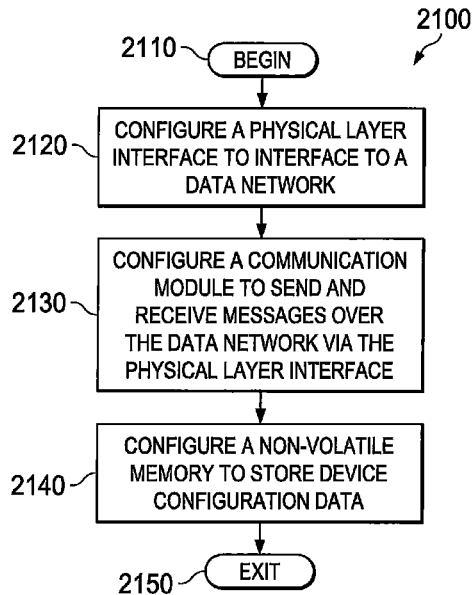

FIG. 21 illustrates a method of manufacturing a device networkable in an HVAC data processing and communication network. The method 2100 begins with an entry state 2110. In a step 2120, a physical layer interface is configured to interface to a data network. The physical layer interface may be, e.g., the PLI 310. In a step 2130, a communication module, e.g., the communication module 340, is configured to send and receive messages over the data network via the physical layer interface. In a step 2140, a non-volatile memory, e.g., the NVM 320, is configured to store device configuration data. The messages include a first class of messages that address the device using only a Device Designator of the device, and a second class of messages that address the device using a message ID formed from a portion of the Device Designator and an offset. The method 2100 ends with an exit state 2150.

Figure 22:
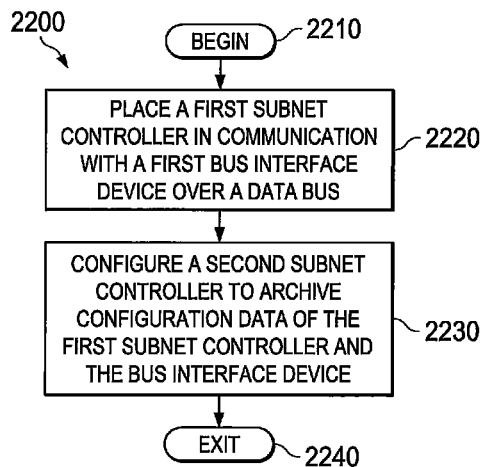

FIG. 22 illustrates a method of manufacturing an HVAC data processing and communication network. The method 2200 begins with an entry state 2210. In a step 2220, a first subnet controller, e.g., a first aSC 230a, is placed in communication with a first bus interface device over a data bus. The bus interface device may be, e.g., the local controller 290. In a step 2230, a second subnet controller, e.g., a second aSC 230a or an iSC 230i, is configured to archive configuration data of the first subnet controller and the bus interface device. The method 2200 ends with an exit state 2240.

Figure 23:
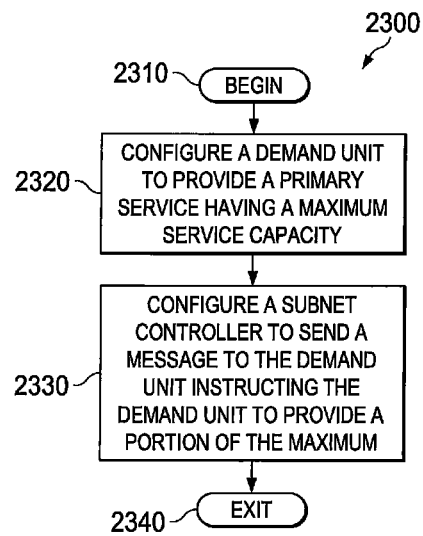

FIG. 23 illustrates a method of manufacturing an HVAC data processing and communication network. The method 2300 begins with an entry state 2310. In a step 2320, a demand unit is configured to provide a service having a maximum service capacity. In a step 2330, a subnet controller is configured to send a message to the demand unit instructing the demand unit to provide a portion of the maximum. The method 2300 ends with an exit state 2340.

Figure 24:
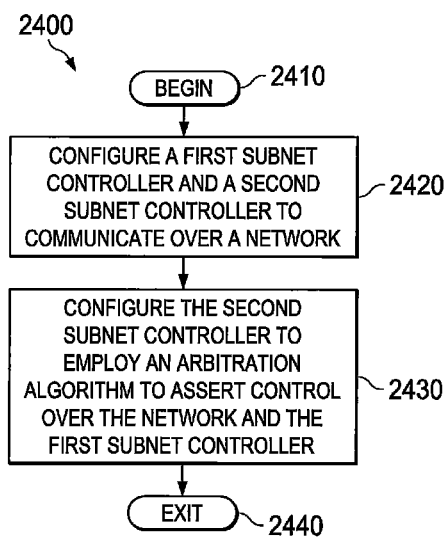

FIG. 24 illustrates a method of manufacturing an HVAC data processing and communication network. The method 2400 begins with an entry state 2410. In a step 2420, a first subnet controller and a second subnet controller are configured to communicate over the network. In a step 2430, the second subnet controller is configured to employ an arbitration algorithm to assert control over the network and the first subnet controller. The method 2400 ends with an exit state 2440.

Those skilled in the art to which this application relates will appreciate that other and further additions, deletions, substitutions and modifications may be made to the described embodiments.

What is claimed is:

1. An HVAC data processing and communication network, comprising:
    a first system device adapted to provide a first service and publish a message including a first device status vector representing an availability of said first system device to provide said first service; and
    a subnet controller adapted to receive said message from said first system device including said first device status vector via a data bus,
    wherein said subnet controller is further adapted to receive, via messages from a plurality of system devices including said first system device, a corresponding plurality of device status vectors that includes said first device status vector, wherein each device status vector includes a plurality of bits, each bit having within said device status vector a bit position that corresponds to one of a plurality of potential services provided by said system devices, said plurality of services including said first service, said subnet controller further adapted to perform a logical operation on a bit corresponding to said first service from each of said plurality of device status vectors to determine if said first service is available.

2. The network as recited in claim 1, further comprising said plurality of second system devices.

3. The network as recited in claim 1, wherein said subnet controller is adapted to determine an availability of said first service from said plurality of device status vectors.

4. The network as recited in claim 1, wherein said logical operation is a logical AND.

5. The network as recited in claim 1, further comprising a user interface, wherein said subnet controller is adapted to generate a status message configured to display an alert on said user interface when said subnet controller determines from said first device status vector that said first service is unavailable.

6. The network as recited in claim 1, wherein said first system device generates an alarm message in the event that said first service is unavailable.

7. A method of manufacturing a HVAC data processing and communication network, comprising:
    configuring a first system device to provide a first service and publish a message including a first device status vector representing an availability of said first system device to provide said first service;
    configuring a subnet controller to receive said message from said first system device including said first device status vector,
    further configuring said subnet controller to receive, via messages from a plurality of system devices including said first system device, a corresponding plurality of device status vectors that includes said first device status vector, wherein each device status vector includes a plurality of bits, each bit having within said device status vector a bit position that corresponds to one of a plurality of potential services provided by said system devices, said plurality of services including said first service; and
    configuring said subnet controller to perform a logical operation on a bit corresponding to said first service from each of said plurality of device status vectors to determine if said first service is available.

8. The method as recited in claim 7, further comprising adapting said subnet controller to determine an availability of said first service from said plurality of device status vectors.

9. The method as recited in claim 7, wherein said logical operation is a logical AND.

10. The method as recited in claim 7, further comprising configuring a user interface to receive a status message generated by said subnet controller when said subnet controller determines from said first device status vector that said first service is unavailable, and configuring the user interface to display an alert in response to said status message.

11. The method as recited in claim 7, further comprising configuring said system device to generate an alarm message in the event that said first service is unavailable.

12. A system device for use in an HVAC data processing and communication network having a plurality of system devices, wherein each of said plurality of system devices is configured to send a corresponding device status vector, comprising:
    a physical layer interface adapted to couple said system device to a data bus;
    a first demand unit configured to provide a first HVAC service; and
    a local controller adapted to publish a message including a first device status vector representing an availability of said first demand unit to provide said first HVAC service,
    wherein said first local controller is further adapted to publish, via messages sent via said data bus, said first device status vector having a plurality of bits, each bit having within said first device status vector a bit position that corresponds to one of a plurality of potential services provided by said system devices, said plurality of services including said first HVAC service, wherein said first local controller indicates an availability of said first demand unit to provide said first HVAC service with a single bit having a first polarity, and said first local controller fills each remaining bit position of said first device status vector with a bit having a second polarity, wherein a subnet controller of said HVAC data processing and communication network is adapted to perform a logical operation on a bit corresponding to said first HVAC service from each of said plurality of device status vectors to determine if said first HVAC service is available.

13. The system device as recited in claim 12, wherein said local controller is further configured to publish an alarm message to said data bus in the event that said first HVAC service is unavailable.

14. The system device as recited in claim 12, wherein said local controller is configured to modify an alarm status bit of said first device status vector when an alarm corresponding to said status bit is active.

15. The system device as recited in claim 14, wherein said alarm is cleared after the expiration of a predetermined interval.

16. The system device as recited in claim 14, wherein said alarm is cleared by a message published to said data bus.

* * * * *